US012269274B2

(12) United States Patent
Nagumo et al.

(10) Patent No.: US 12,269,274 B2
(45) Date of Patent: Apr. 8, 2025

(54) RECORDING APPARATUS

(71) Applicant: SEIKO EPSON CORPORATION, Tokyo (JP)

(72) Inventors: Takaho Nagumo, Shiojiri (JP); Kazuaki Takahashi, Shiojiri (JP); Ichiro Yoshioka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 145 days.

(21) Appl. No.: 17/805,225

(22) Filed: Jun. 2, 2022

(65) Prior Publication Data

US 2022/0388311 A1 Dec. 8, 2022

(30) Foreign Application Priority Data

Jun. 8, 2021 (JP) ................................ 2021-095670
Jun. 8, 2021 (JP) ................................ 2021-095671

(51) Int. Cl.
*B41J 2/175* (2006.01)
*B41J 2/165* (2006.01)
*B41J 29/13* (2006.01)

(52) U.S. Cl.
CPC ....... *B41J 2/17566* (2013.01); *B41J 2/17509* (2013.01); *B41J 29/13* (2013.01); *B41J 2002/17573* (2013.01)

(58) Field of Classification Search
CPC ............................................. B41J 2002/17573
See application file for complete search history.

(56) References Cited

U.S. PATENT DOCUMENTS

| | | | | |
|---|---|---|---|---|
| 7,055,926 | B2 | 6/2006 | Kojima et al. | |
| 2004/0109039 | A1 | 6/2004 | Kojima et al. | |
| 2009/0109252 | A1 | 4/2009 | Ogle et al. | |
| 2011/0228312 | A1* | 9/2011 | Nakamura | B41J 2/17546 358/1.14 |
| 2011/0234716 | A1* | 9/2011 | Kubo | B41J 2/1752 347/86 |
| 2013/0201261 | A1* | 8/2013 | Inoue | B41J 2/17566 347/86 |
| 2014/0104347 | A1 | 4/2014 | Iizawa | |
| 2018/0272731 | A1* | 9/2018 | Kimura | B41J 29/13 |

(Continued)

FOREIGN PATENT DOCUMENTS

| | | |
|---|---|---|
| JP | H06106730 A | 4/1994 |
| JP | H11227983 A | 8/1999 |

(Continued)

OTHER PUBLICATIONS

Office Action for JP Patent Application No. JP2021095670, issued on Dec. 17, 2024, 10 pages.

*Primary Examiner* — Shelby L Fidler
(74) *Attorney, Agent, or Firm* — CHIP LAW GROUP

(57) ABSTRACT

A recording apparatus 101 includes a carriage 21 mounted with a liquid storage portion 46 and a recording head 22, the carriage 21 being movable to a visual check position, where liquid in the liquid storage portion 46 is visually checkable through a front surface 43F, and to a recording position, where the recording head 22 ejects the liquid to a medium, and light emitting units 81 and capable of illuminating the inside of the liquid storage portion 46 at least when the carriage 21 is positioned at the visual check position.

11 Claims, 31 Drawing Sheets

(56) References Cited

U.S. PATENT DOCUMENTS

| | | | | |
|---|---|---|---|---|
| 2020/0247135 | A1 | 8/2020 | Higuchi et al. | |
| 2020/0298574 | A1 | 9/2020 | Takabayashi et al. | |
| 2020/0369038 | A1 * | 11/2020 | Miyazawa | B41J 29/13 |
| 2022/0371328 | A1 * | 11/2022 | Nagumo | B41J 29/13 |

FOREIGN PATENT DOCUMENTS

| | | | |
|---|---|---|---|
| JP | 2004074618 | A | 3/2004 |
| JP | 2004142325 | A | 5/2004 |
| JP | 2014079933 | A | 5/2014 |
| JP | 2016182834 | A | 10/2016 |
| JP | 2017081124 | A | 5/2017 |
| JP | 2019142116 | A | 8/2019 |
| JP | 2020124878 | A | 8/2020 |
| JP | 2020152043 | A | 9/2020 |
| JP | 2021006378 | A | 1/2021 |

* cited by examiner

RECORDING APPARATUS

The present application is based on, and claims priority from JP Application Serial Number 2021-095671, filed Jun. 8, 2021, and JP Application Serial Number 2021-095670, filed Jun. 8, 2021, the disclosures of which are hereby incorporated by reference herein in their entirety.

BACKGROUND

1. Technical Field

The present disclosure relates to a recording apparatus.

2. Related Art

JP-A-2021-6378 discloses an inkjet printer as an example of a recording apparatus that performs recording by ejecting ink, as an example of a liquid, onto a print sheet. This printer includes a recording head that ejects liquid, a liquid storage portion that stores liquid supplied to the recording head, and a carriage on which the recording head and the liquid storage portion are mounted. Further, at least a part of the liquid storage portion is formed of a transparent material that enables a visual check of the liquid in the liquid storage portion.

JP-A-2016-182834 discloses another ink jet printer. This printer includes a recording head that ejects ink, and a liquid accommodation body that has a liquid storage portion that stores the ink supplied to the recording head. Further, the printer includes a light emitting unit that illuminates the inside of the liquid storage portion.

However, in the printer described in JP-A-2021-6378, the liquid storage portion is mounted on the carriage, and there is a concern that it is difficult to visually check the liquid in the liquid storage portion.

In addition, in the printer and the liquid accommodation body described in JP-A-2016-182834, the light emitting unit is provided outside the liquid storage portion, and there is a concern that it may be difficult to illuminate the inside of the liquid storage portion.

SUMMARY

A recording apparatus includes a liquid storage portion configured to store a liquid, and having a visual check surface through which the stored liquid is visually checkable from outside, a recording head that ejects liquid supplied from the liquid storage portion onto a medium, a carriage on which the liquid storage portion and the recording head are mounted, the carriage being movable between a visual check position at which the liquid in the liquid storage portion is visually checkable through the visual check surface and a recording position at which the recording head ejects the liquid onto the medium, and a light emitting unit configured to illuminate an inside of the liquid storage portion at least when the carriage is positioned at the visual check position.

DESCRIPTION OF EMBODIMENTS

Figure 1:
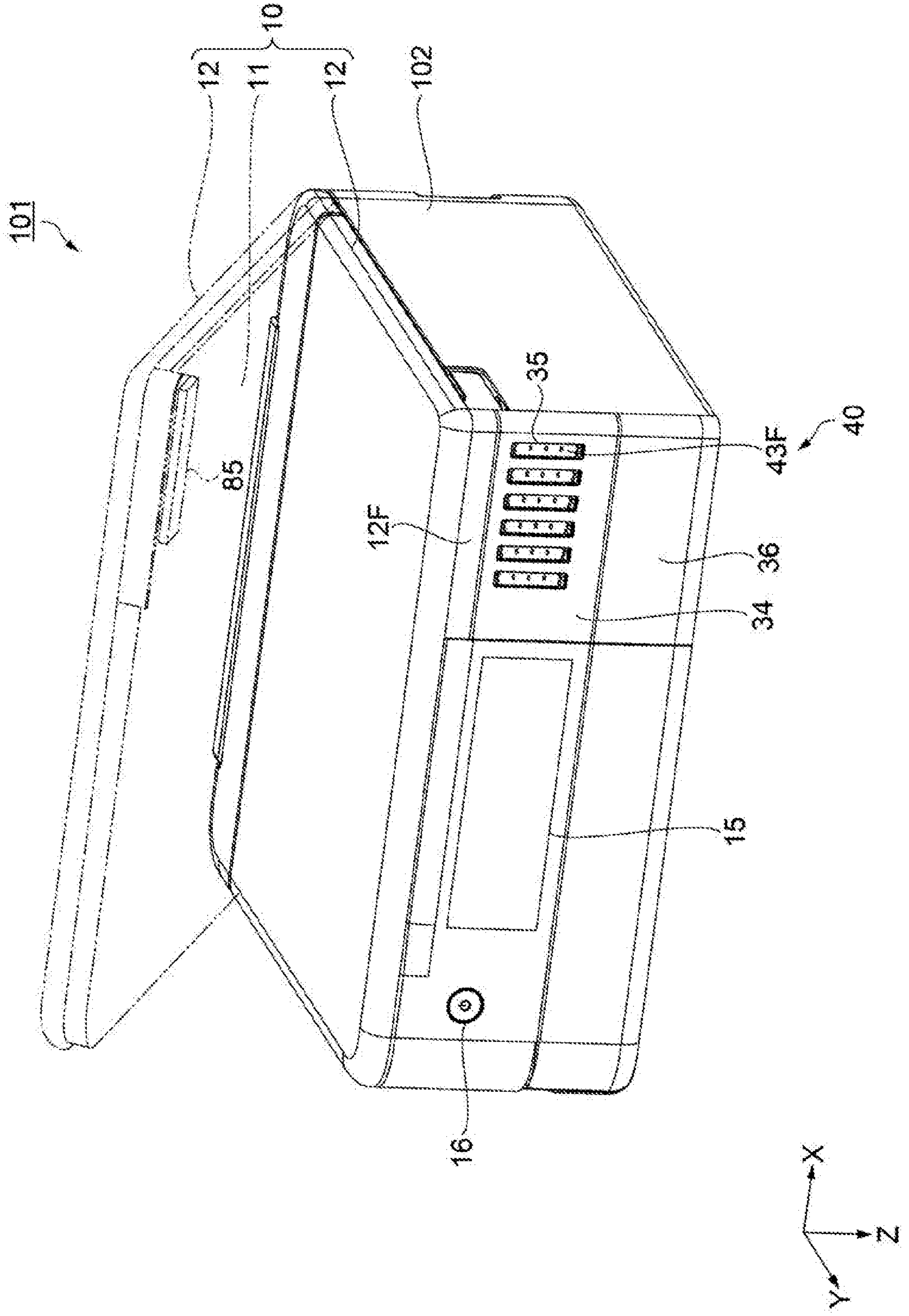
FIG. 1 is a perspective view of a recording apparatus according to a first embodiment of the present disclosure.

Hereinafter, the present disclosure will be described based on embodiments. In each figure, the same members are denoted by the same reference numerals, and a repetitive description will be omitted.

In each figure, X, Y, and Z represents three spatial axes orthogonal to each other. In this specification, directions extending along these axes are referred to as an X-axis direction, a Y-axis direction, and a Z-axis direction. In a case where the direction is specified, a positive direction is set as "+", a negative direction is set as "−", positive and negative signs are used together for direction notation, a direction in which an arrow in each drawing is directed is set as a + direction, and a direction opposite to the arrow is set as a − direction. The Z-axis direction indicates the direction of gravity, the +Z direction indicates a vertically downward direction, and the −Z direction indicates a vertically upward direction. In addition, a plane including the X-axis and the Y-axis will be described as an X-Y plane, a plane including the X-axis and the Z-axis will be described as an X-Z plane, and a plane including the Y-axis and the Z-axis will be described as a Y-Z plane. Further, the X-Y plane is a horizontal plane. Further, the three spatial-axes of X, Y, and Z, when not limited to positive or negative directions, describe the X-axis, the Y-axis, and the Z-axis.

1. First Embodiment

Schematic configuration of a recording apparatus 101 according to a first embodiment will be described with reference to FIGS. 1 to 3. The recording apparatus 101 according to the present embodiment includes an apparatus main body 102 having a rectangular parallelepiped shape, a scanner unit 10 attached to an upper portion of the apparatus main body 102, and an illumination unit 80, and is placed on a horizontal surface. The width direction of the medium intersecting the transport direction in which the medium is transported is the +X direction or the −X direction extending along the X-axis, and the transport direction in which the medium is transported is the +Y direction extending along the Y-axis.

Figure 2:
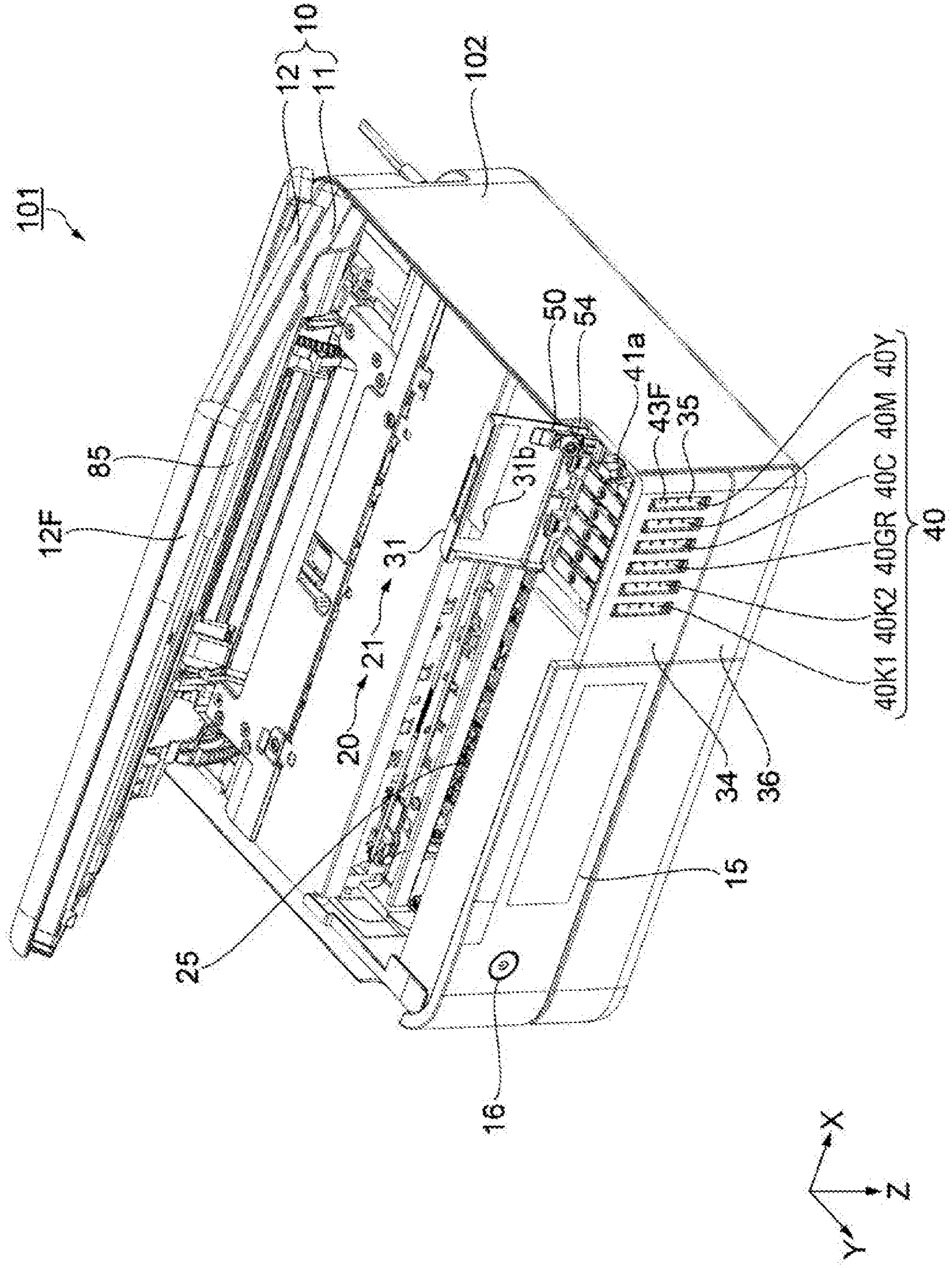
FIG. 2 is a perspective view of the recording apparatus with a scanner unit opened.

As shown in FIG. 2, the apparatus main body 102 has an opening that exposes the inside of the apparatus main body 102. The opening of the apparatus main body 102 is provided, for example, on the −Z direction side of a carriage 21 of a recording unit 20, to be described later, and exposes the −Z direction side, which is the upper side of the carriage 21. As shown in FIGS. 1 and 2, the scanner unit 10 is disposed in an upper portion of the apparatus main body 102 and is pivotably attached to the apparatus main body 102. The scanner unit 10 is movable between a closed state, in which the opening of the apparatus main body 102 is covered, and an opened state, in which the inside of the apparatus main body 102 is exposed. The scanner unit 10 is an example of a cover portion that covers the opening of the apparatus main body 102.

In the scanner unit 10, a scanner housing 11 on which a document is placed and which reads the document and a document cover 12 are stacked in this order. The document cover 12 is a cover that protects the scanner housing 11 and is pivotable with respect to the scanner housing 11. Therefore, it can be said that least the scanner housing 11 of the scanner unit 10 is an example of a cover portion that covers the opening of the apparatus main body 102. Further, a front wall 12F is provided at an end of the document cover 12 in the +Y direction. As shown in FIGS. 1 to 3, a light emitting unit 85 of the illumination unit 80 is provided on a surface of the scanner housing 11 opposite to the surface on which the document is placed. The light emitting unit 85 is capable of emitting visible light. The light emitting unit 85 is provided in the X-axis direction on the +X direction side from the center of the scanner housing 11. More specifically, the light emitting unit 85 is provided at a position in the X-axis direction corresponding to the carriage 21 of the recording unit 20 located at a visual check position, to be described later.

Figure 3:
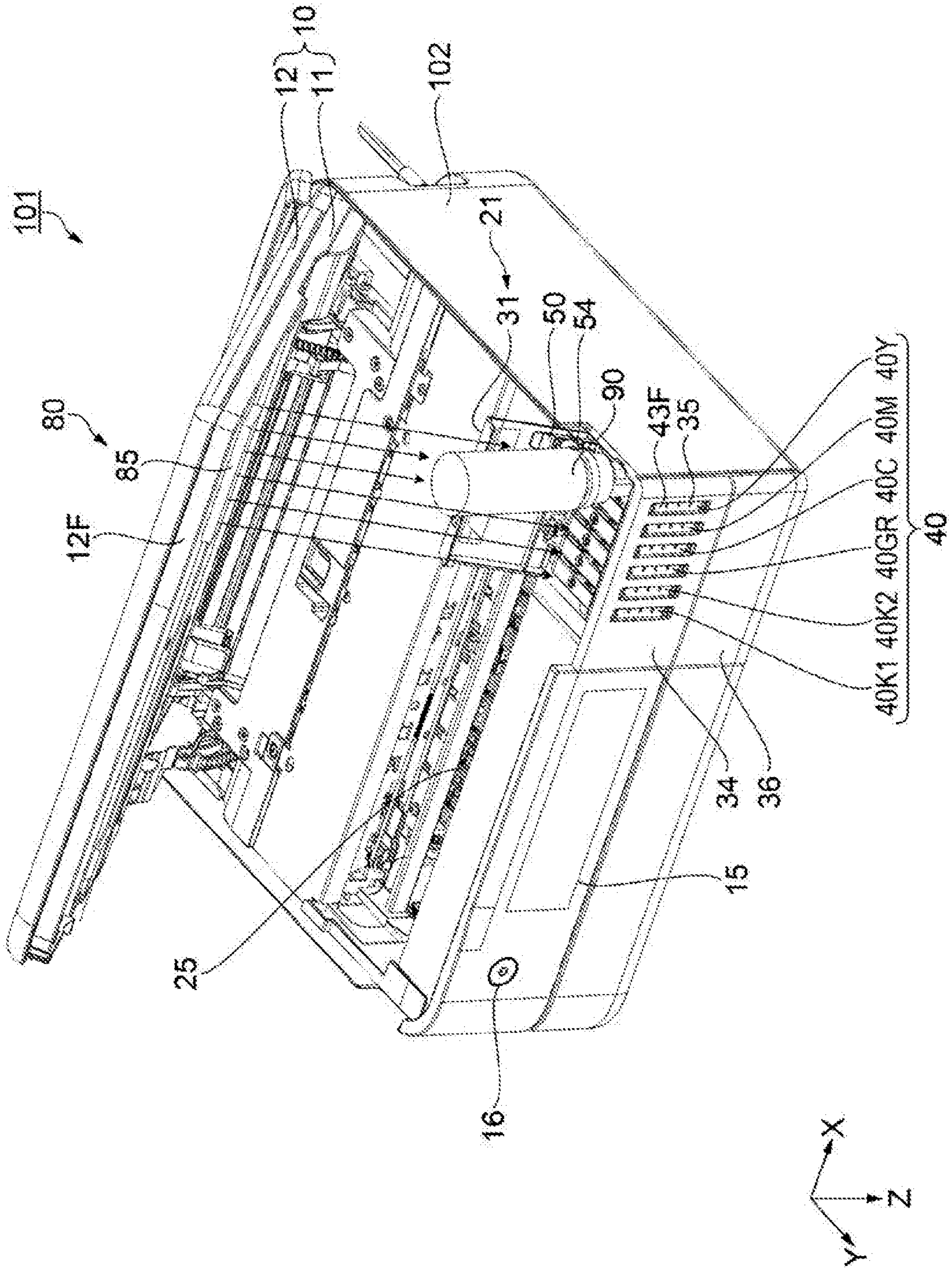
FIG. 3 is another perspective view of the recording apparatus with a scanner unit opened.

As shown in FIG. 3, by placing the scanner unit 10 in the opened state, liquid in a liquid container 40, to be described later, can be replenished from a refill container 90. At this time, by the light emitting unit 85 emitting light, the upper side of the carriage 21 can be illuminated as indicated by solid line arrows in FIG. 3.

As shown in FIG. 1, the recording apparatus 101 includes a display unit 15 and a power supply operation unit 16 on a front surface of an apparatus main body 102. The display unit 15 is configured by a liquid crystal display module with a touch panel function. The display unit 15 has a function as a notification unit that reports a guidance display for the operation of the recording apparatus 101 and information related to the recording apparatus 101, and a function as an operation unit that performs various settings for the recording apparatus 101. By an operation of the user, the power supply operation unit can switch between an energized state, in which the power supply of the recording apparatus 101 is turned on, and a power-off state, in which the power supply of the recording apparatus 101 is turned off.

As shown in FIGS. 1 to 5, the recording apparatus 101 includes a visual check portion 34 and a wall portion 36 on a front surface of the apparatus main body 102. The visual check portion 34 is disposed on the −Z direction side with respect to the wall portion 36. The visual check portion 34 is provided with a through-hole 35 exposing the front surface 43F of a liquid storage portion 46, to be described later. The user can grasp the storage amount of the liquid stored in the liquid storage portion 46 from the through-hole 35 of the visual check portion 34 through the front surface 43F. If it is possible to expose the front surface 43F of the liquid storage portion 46, instead of the through-hole 35, a notch shape in which a part of the visual check portion 34 is removed may be provided in the visual check portion 34.

Note that, as shown in FIGS. 10 to 14, a visual check member 34*a* made of a translucent or transparent material may be provided in the through-hole 35 of the visual check portion 34. If the material constituting the visual check member 34*a* is a resin material, polypropylene (PP), polyethylene (PE), polyamide (PA), acrylonitrile-butadiene-styrene (ABS), polycarbonate (PC), polyethylene-terephthalate (PET), polymethylmethacrylate (PMMA), or the like can be adopted.

Figure 6:
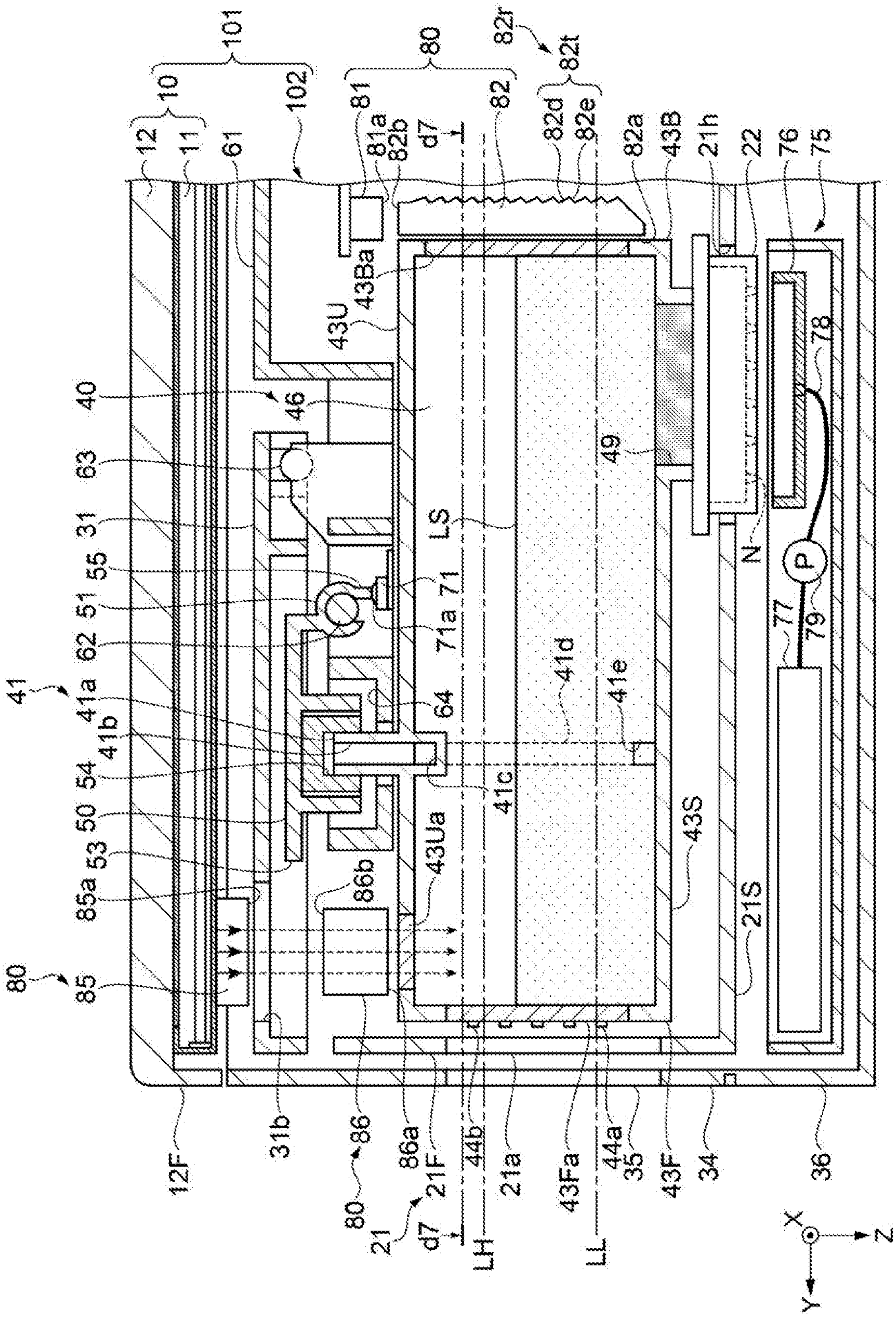
FIG. 6 is a main-part cross-sectional view showing a d6-d6 cross section of the recording apparatus shown in FIG. 5, when a scanner unit is closed and an opening and closing cover and a cap lever are in a closed state.

As shown in FIGS. 2 and 6, the recording apparatus 101 includes a transport unit 25 that transports a medium in the apparatus main body 102, a recording unit 20, and a maintenance unit 75. The transport unit 25 transports the medium in the transport direction which is the +Y direction. The recording unit 20 is configured to be able to record an image on a medium using a liquid. As shown in FIGS. 2 to 4 and 6 to 8, the recording unit includes a carriage 21. The carriage 21 is provided with a recording head 22 that ejects liquid onto a medium, a liquid container 40, an upper wall portion 61, an opening and closing cover 31, a cap lever 50, an opening and closing detection unit 71, a lock mechanism 72, and an illumination unit 80. The liquid supplied to the recording head 22 is stored in the liquid storage portion 46 of the liquid container 40. The liquid container 40 is an example of a liquid accommodation body. Note that in FIG. 4, the cap lever 50 is not shown.

Figure 7:
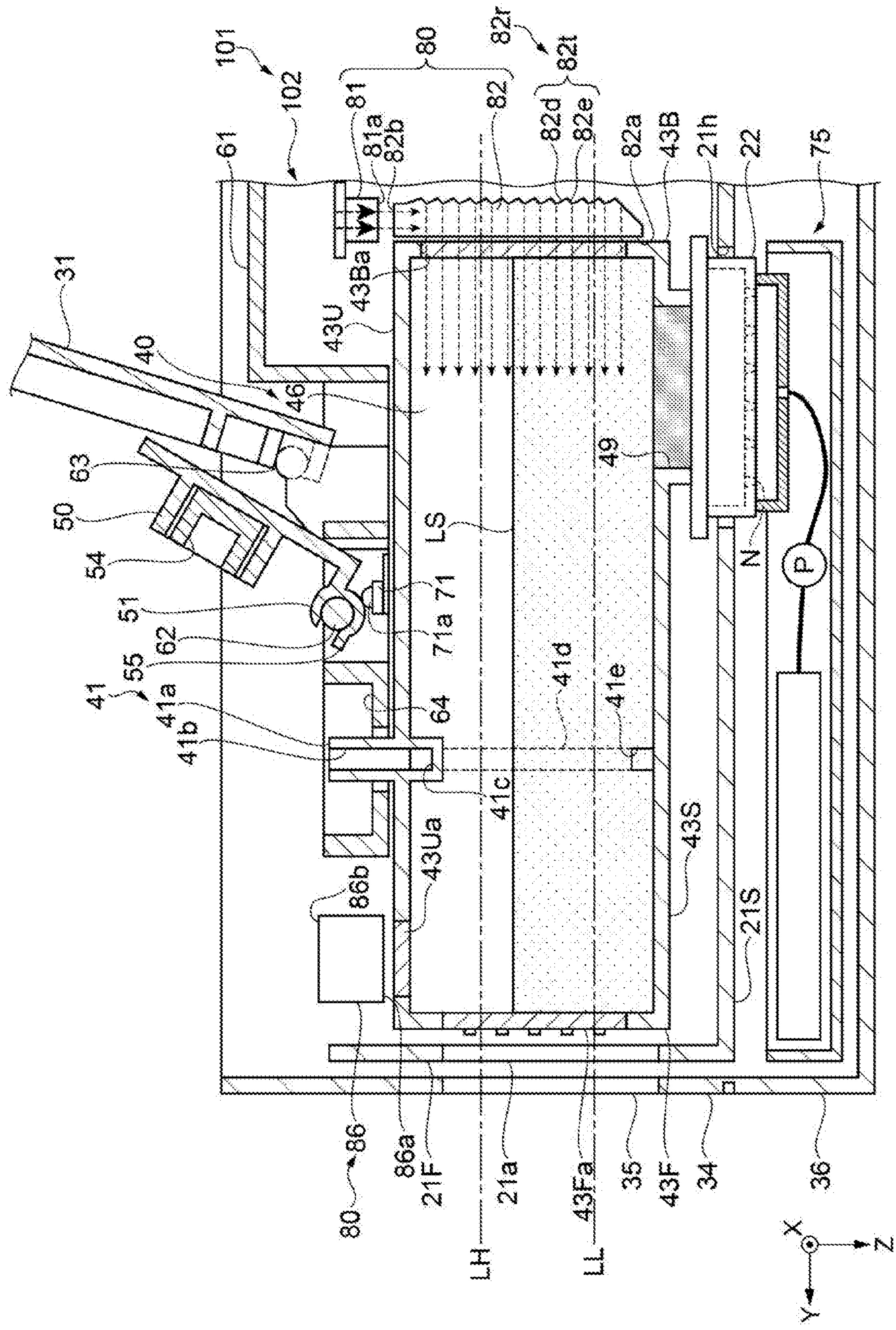
FIG. 7 is a main-part cross-sectional view showing a d6-d6 cross section of the recording apparatus shown in FIG. 5, when the scanner unit is open and the opening and closing cover and the cap lever are in an opened state.
Figure 8:
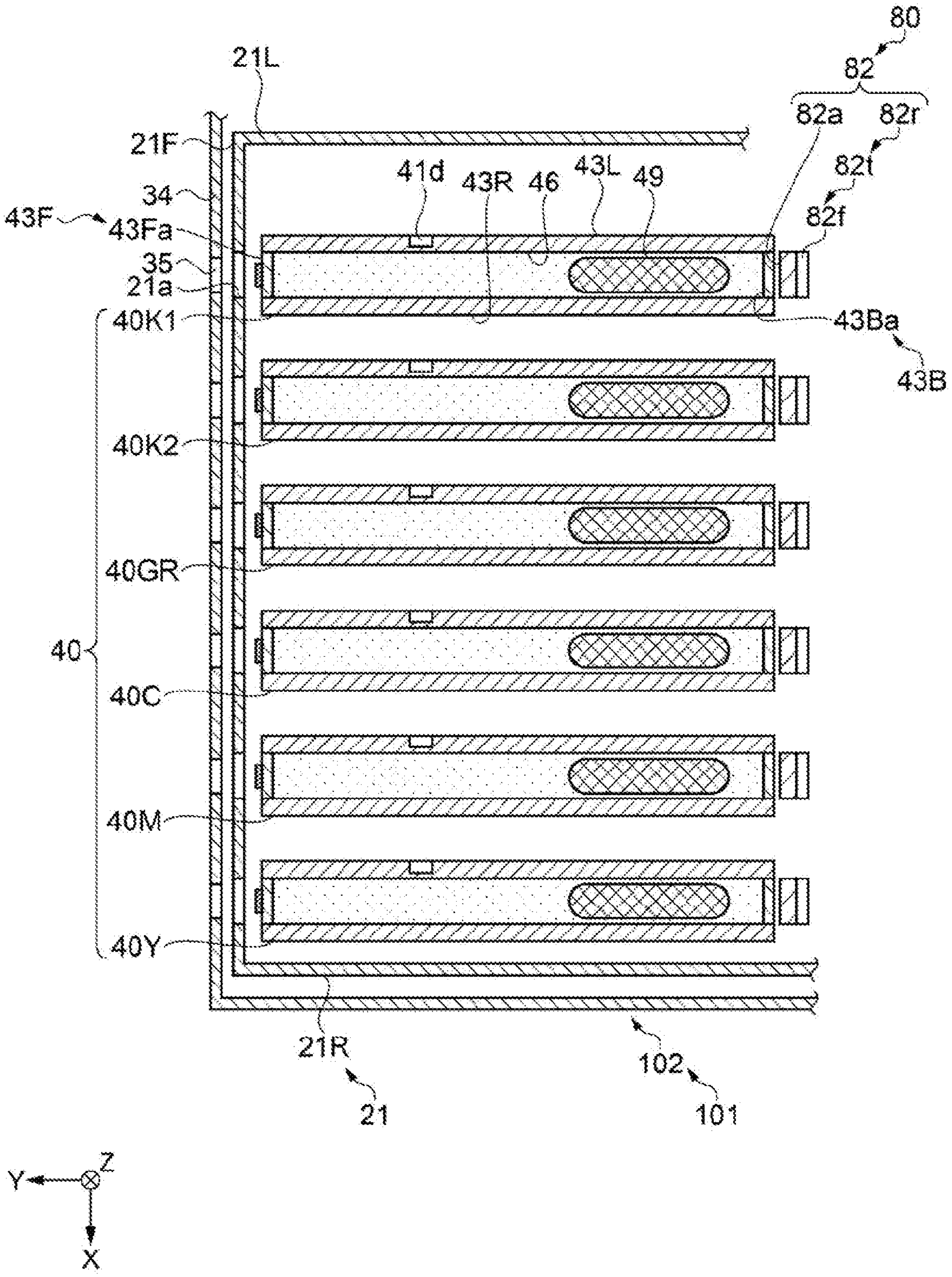
FIG. 8 is a main-part cross-sectional view showing a d7 to d7 cross section of the recording apparatus shown in FIG. 6.

As shown in FIGS. 6 to 8, the carriage 21 has a front wall 21F, a bottom wall 21S, a right side wall 21R, a left side wall 21L, and a rear wall (not shown). The front wall 21F is a side wall at the +Y direction side of the carriage 21. The bottom wall 21S is a side wall at the +Z direction side of the carriage 21. The right side wall 21R is a side wall at the +X direction side of the carriage 21. The left side wall 21L is a side wall at the −X direction side of the carriage 21. The rear wall is a side wall at the −Y direction side of the carriage 21.

The carriage 21 is supported at the rear wall by a guide shaft and is movable in a width direction of the medium, which intersects with a transport direction in which the medium is transported. The recording head 22 is movable in the width direction of the medium together with the carriage 21. The recording head 22 includes nozzles N and, although not shown, a common liquid chamber, individual liquid chambers, and ejection elements. The recording head 22 is mounted on the carriage 21 such that the nozzles N are exposed from a through-hole 21*h* provided in a bottom wall 21S of the carriage 21. The nozzles N are located further to the +Z direction side than is the bottom wall 21S. The recording head 22, in a recording position located in the −Z direction from the medium transported in the transport direction by the transport unit 25, ejects liquid onto the medium. The recording apparatus 101 according to the present embodiment records a desired image on a medium by alternately repeating a recording operation, in which the recording head 22 ejects liquid onto the medium while moving in the width direction of the medium, and a transport operation, in which the medium is transported in the transport direction by the transport unit 25.

While the recording head 22 is not performing the recording operation, as shown in FIGS. 1 to 5, the carriage 21 moves to a standby position located in the X-axis direction in the +X direction from the recording position and stands by. The through-hole 35 of the visual check portion 34 is provided at a position where the front surface 43F of the liquid storage portion 46 can be visually checked from the +Y direction side via the through-hole 35 when the carriage 21 is at the standby position. Therefore, the standby position of the carriage 21 can also be referred to as a visual check position at which the front surface 43F of the liquid storage portion 46 can be viewed from the +Y direction side. In other words, the carriage 21 is movable between a visual check position, where the liquid in the liquid storage portion 46 can be visually checked through the front surface 43F, and a recording position, where the recording head 22 ejects the liquid to the medium.

The maintenance unit 75 performs maintenance of the recording head 22 by discharging liquid from the nozzles N of the recording head 22. As shown in FIGS. 6 and 7, the maintenance unit 75 includes a cap 76 capable of, by coming into contact with the recording head 22, forming a capping space that includes the nozzles N, a pump 79 connected to the cap 76 by a waste liquid tube 78 and capable of sucking liquid from the nozzles N through the capping space, and a waste liquid tank 77 that is connected to the waste liquid tube 78 and that collects liquid discharged from the nozzles N. The maintenance unit 75 is provided on the +Z direction side of the carriage 21 in the Z axis direction. The maintenance unit 75 is provided on the +X direction side of the recording position in the X axis direction. The maintenance unit 75 is provided at a position where the cap 76 can come into contact with the recording head 22 when the carriage 21 is at the standby position.

Figure 4:
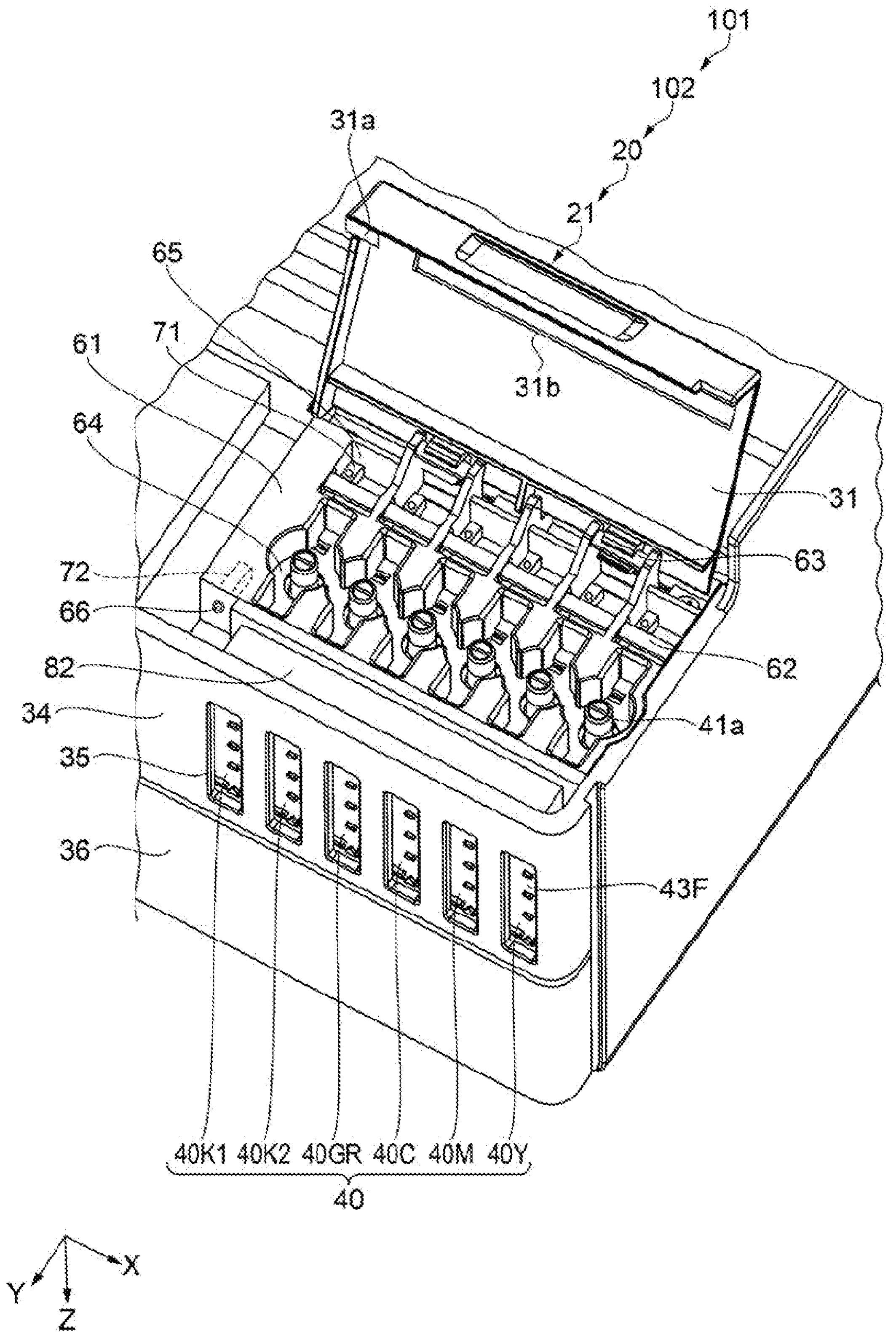
FIG. 4 is a perspective view of the recording apparatus with an opening and closing cover opened.

As shown in FIGS. 4 and 8, six liquid containers 40 are housed in the carriage 21. The six liquid containers 40 include a liquid container 40K1 containing black liquid containing black pigment as a color material, a liquid container 40K2 containing black liquid containing black dye as a color material, a liquid container 40GR containing gray liquid containing gray dye as a color material, a liquid container 40C containing cyan liquid containing cyan pigment as a color material, a liquid container 40M containing magenta liquid containing magenta pigment as a color material, and a liquid container 40Y containing yellow liquid containing yellow pigment as a color material. The liquid container 40K1, the liquid container 40K2, the liquid container 40GR, the liquid container 40C, the liquid container 40M, and the liquid container 40Y are arranged in this order in the +X direction.

The number of liquid containers 40 mounted on the carriage 21 is not limited to six, and may be fewer than six, one, or more than six. The color material contained in the liquid stored in the liquid container 40 may be a pigment or a dye. Further, the liquid contained in the liquid container 40 may be a liquid that does not contain a coloring material.

As shown in FIG. 4, the liquid container 40 is provided with an injection port 41*a* through which liquid can be injected from the refill container 90 into the liquid storage portion 46. As shown in FIGS. 6 and 8, the liquid storage portion 46 has a front surface 43F, a rear surface 43B, a bottom surface 43S, an upper surface 43U, a right side surface 43R, and a left side surface 43L. The front surface 43F is a wall surface defining an outer shape of the liquid storage portion 46 on the +Y direction side. The rear surface 43B is a wall surface defining an outer shape of the liquid storage portion 46 on the −Y direction side. The bottom surface 43S is a wall surface defining an outer shape of the liquid storage portion 46 on the +Z direction side. The upper surface 43U is a wall surface defining an outer shape of the liquid storage portion 46 on the −Z direction side. The right side surface 43R is a wall surface defining an outer shape of the liquid storage portion 46 on the +X direction side. The left side surface 43L is a wall surface defining an outer shape of the liquid storage portion 46 on the −X direction side. The front surface 43F, the rear surface 43B, the bottom surface 43S, the upper surface 43U, the right side surface 43R, and the left side surface 43L can also be referred to as side walls that define the inside of the liquid storage portion 46.

A liquid can be injected into the liquid storage portion 46 via an injection portion 41, which includes the injection port

41*a*. As shown in FIG. 6, the injection portion 41 includes the injection port 41*a*, a first flow path 41*b*, a second flow path 41*c*, a third flow path 41*d*, and an outlet 41*e*. The first flow path 41*b* extends in the Z-axis direction and connects the injection port 41*a* and the second flow path 41*c*. The second flow path 41*c* extends in the X-axis direction and connects the first flow path 41*b* and the third flow path 41*d*. As shown in FIGS. 6 and 8, the third flow path 41*d* is provided on the left side surface 43L of the liquid storage portion 46, has an outlet 41*e* opened on the left side surface 43L of the liquid storage portion 46, and brings the second flow path 41*c* and the liquid storage portion 46 into communication with each other.

Note that, as shown in FIG. 6, the outlet 41*e* opens at a position in the +Z direction from a lower limit liquid level LL when the amount of liquid in the liquid storage portion 46 is a lower limit amount, to be described later. Accordingly, by injecting the liquid into the liquid storage portion 46 via the injection portion 41, it is possible to reduce the frequency at which the liquid adheres to the region on the inner surface of the front surface 43F that is in the −Z direction from the liquid surface LS.

An outlet 49 connected to the recording head 22 is provided in the bottom surface 43S of the liquid storage portion 46. The liquid in the liquid storage portion 46 is supplied to the recording head 22 via the outlet 49. The recording head 22 ejects liquid supplied from the liquid storage portion 46 onto a medium. It should be noted that when the liquid container 40 is detachably mounted on the carriage 21, a seal member or a filter that suppresses leakage of the liquid of the liquid storage portion 46 from the outlet 49 when the liquid container 40 is detached from the carriage 21 may be provided in the outlet 49.

As shown in FIGS. 6 and 8, a window member 43Fa is provided on the front surface 43F of the liquid storage portion 46. A window member 43Ba is provided on the rear surface 43B. Further, a window member 43Ua is provided on the upper surface 43U. The window members 43Fa, 43Ba, 43Ua are made of a translucent or transparent material. The window member 43Fa enables a visual check of the liquid stored in the liquid storage portion 46 and of the liquid surface LS from outside the liquid storage portion 46. The window member 43Fa is an example of a visual check surface. Further, six through-holes 21*a* are provided in the front wall 21F of the carriage 21 positioned on the +Y direction side of the window member 43Fa, so that the window member 43Fa can be visually checked from the +Y direction side. The through-hole 21*a* is formed larger than the outer shape of the window member 43Fa so that the outer shape of the window member 43Fa can be seen when the window member 43Fa is viewed from the +Y direction side. One through-hole 21*a* may be provided so that the six window members 43Fa can be visually checked from the +Y direction side. If the material constituting the window members 43Fa, 43Ba, 43Ua is a resin material, polypropylene (PP), polyethylene (PE), polyamide (PA), polyethylene terephthalate (PET), or the like can be adopted.

Figure 5:
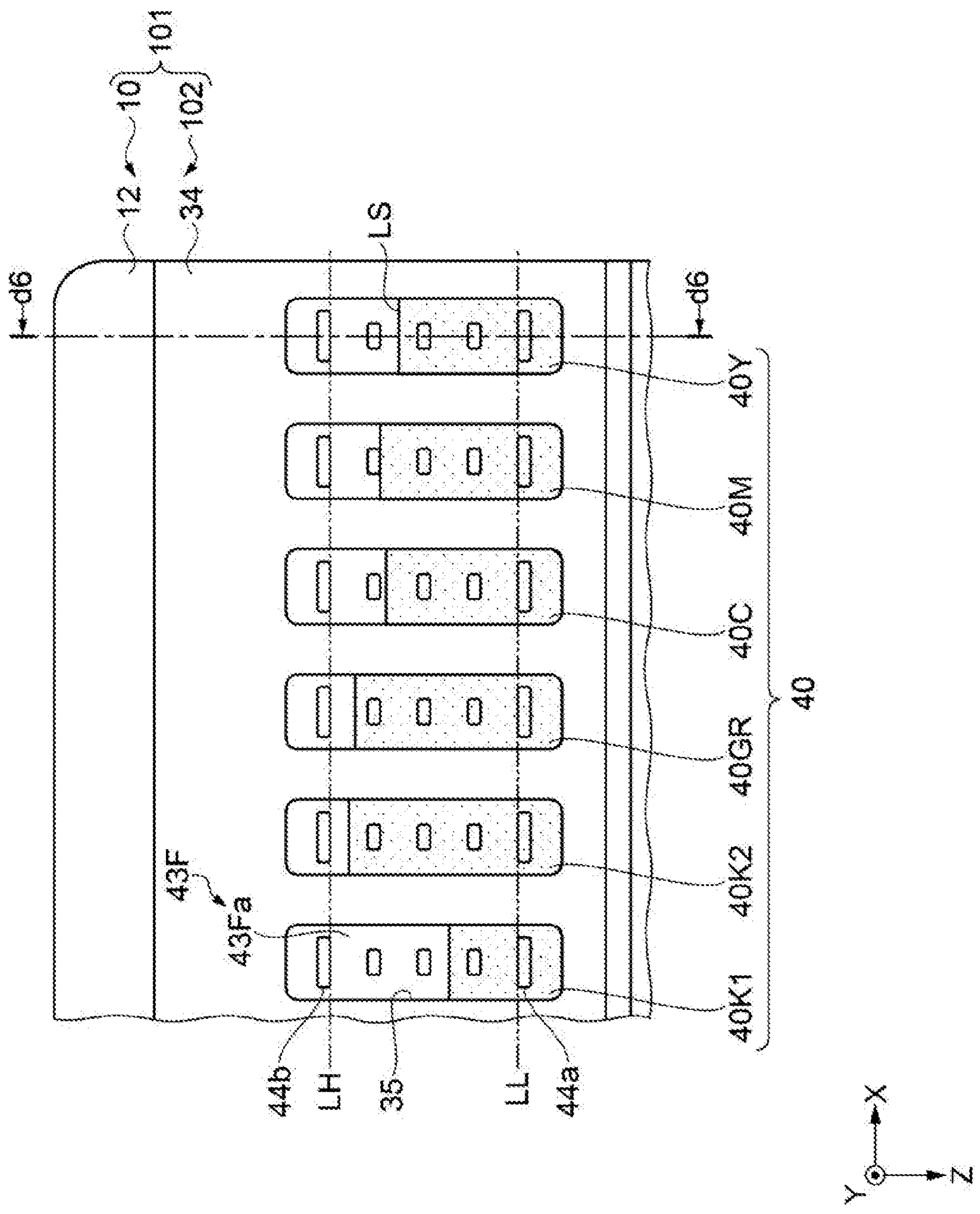
FIG. 5 is a side view of the recording apparatus viewing the inside of a liquid storage portion from a direction facing a visual check surface.

The visual check surface in the present embodiment is a surface extending along the X-Z plane. The window member 43Fa is provided with a scale portion including a mark 44*a* which indicates the lower limit amount of the liquid and a mark 44*b* which indicates the upper limit amount of the liquid. The lower limit amount of the present embodiment is a liquid amount when the liquid in the liquid storage portion 46 becomes very small, and is a liquid amount for which replenishment of the liquid to the liquid container 40 is desirable. The upper limit amount in the present embodiment is an amount of liquid that does not require refilling the liquid container 40, and there is some air in the liquid storage portion 46. The lower limit amount and the upper limit amount are examples of a predetermined amount. In FIGS. 5 to 7, a lower limit liquid level LL, which is the liquid surface LS when the liquid amount of the liquid is the lower limit amount, and an upper limit liquid level LH, which is the liquid surface LS when the liquid amount of the liquid is the upper limit amount, are indicated by two-dot chain lines.

When the liquid storage portion 46 is formed of a translucent or transparent material, the window member 43Fa may not be provided. In this case also, the user can check the liquid stored in the liquid storage portion 46 and the liquid surface LS of the liquid, from the outside of the liquid storage portion 46 through the front surface 43F. Thus, the front surface 43F is an example of a visual check surface. In other words, the liquid storage portion 46 has the front surface 43F that allows the liquid in the liquid storage portion 46 to be visually checked from outside the liquid storage portion 46.

As shown in FIG. 4, the upper wall portion 61 includes, corresponding to the six liquid containers 40, six cap lever mounting sections 62, opening and closing cover mounting sections 63, guides 64 as first recesses, second recesses 65, and a lock pin protrusion hole 66. The cap lever attachment portion 62 is a columnar shaft extending along the X-axis. The opening and closing cover attachment portion 63 is a columnar shaft extending along the X-axis. One end of the opening and closing cover 31 is engaged with the opening and closing cover attachment portion 63, so that the opening and closing cover 31 is pivotable about the opening and closing cover attachment portion 63.

As shown in FIGS. 6 and 7, the cap lever 50 has an end 53, an engagement portion 51, a cap 54 capable of closing the injection port 41*a*, and a protrusion 55 provided on the engagement portion 51. By engaging the engagement portion 51 with the cap lever attachment portion 62 of the upper wall portion 61, the cap lever 50 is pivotable about the cap lever mounting section 62.

In FIG. 2, cap levers 50 are disposed at a position that seals the injection port 41*a* of the liquid containers 40K1, 40K2, 40GR, 40C, 40M, and a cap lever 50 is disposed at a position that opens the injection port 41*a* of the liquid container 40Y. As shown in FIGS. 2, 6, and 7, the cap lever 50 is pivotable between a closed state, in which the injection port 41*a* of the liquid container 40 is sealed, and an opened state, in which the injection port 41*a* of the liquid container 40 is opened. In this case, it can also be said that the cap lever 50 is provided on the carriage so as to be pivotable between a closed state, covering the upper side of the liquid storage portion 46, and an opened state, in which the upper side of the liquid storage portion 46 is exposed. The cap lever 50 is an example of a lid portion. As shown in FIG. 3, when the cap lever 50 is in the opened state, the injection port 41*a* of the liquid container 40 is opened, and the liquid can be replenished from the refill container 90 to the liquid storage portion 46 of the liquid container 40.

As shown in FIGS. 4 and 6, the opening and closing cover 31 protects the cap lever 50 and the upper wall portion 61. The opening and closing cover 31 pivots about the opening and closing cover attachment portion 63, and can take a closed state in which it covers the six cap levers 50 and an opened state in which it exposes the six cap levers 50. In other words, the opening and closing cover 31 is provided on the carriage 21 so as to be rotatable between a closed state, in which the upper sides of the six liquid storage portions 46 are covered, and an opened state, in which the upper sides of the six liquid storage portions 46 are exposed. The opening and closing cover 31 is an example of a lid portion. As shown in FIG. 4, the opening and closing cover 31 has a restricted portion 31*a*. As shown in FIGS. 2, 4, and 6, the opening and closing cover 31 has a through-hole 31*b*.

When the storage amount of the liquid stored in the liquid storage portion 46 becomes small and the liquid is refilled from the refill container 90 to the liquid container 40, the user changes the opening and closing cover 31 from the closed state shown in FIG. 6 to the opened state shown in FIG. 7. Next, by the user hooking his finger on the end 53 of the cap lever 50 and moving the cap lever 50 from the closed state to the opened state, the user changes the injection port 41*a* of the liquid container 40 from the sealed state to the opened state as shown in FIG. 7. Then, the user inserts the tip end of the refill container 90 into the injection port 41*a* of the liquid container 40, and refills liquid from the refill container 90 to the liquid storage portion 46 of the liquid container 40.

As shown in FIGS. 4, 6, and 7, an injection port 41*a* is disposed in the guide 64. Therefore, as shown in FIG. 6, in the closed state of the cap lever 50, the cap 54 is inserted into the recessed portion of the guide 64. As shown in FIG. 3, when the liquid is replenished from the refill container 90 to the liquid storage portion 46 of the liquid container 40, the tip end of the refill container 90 is inserted into the concave portion of the guide 64. At this time, the concave portion of the guide 64 guides the position of the leading end of the refill container 90.

As shown in FIGS. 4, 6, and 7, the cap lever attachment portion 62 and the opening and closing detection unit 71 are disposed in the second recess 65. The opening and closing detection unit 71 is provided so as to be able to detect either a closed state or an opened state of the cap lever 50. Six opening and closing detection units 71 are provided corresponding to the six cap levers 50. The protrusion 55 of the cap lever 50 functions as a detected portion for detecting either the closed state or the opened state of the cap lever 50.

The opening and closing detection unit 71 in the present embodiment is a contact type sensor having a movable detector 71*a*. The detector 71*a* is biased in a projecting direction and can be displaced between projecting and retracting. The opening and closing detection unit 71 is not limited to the contact type sensor, and may be a limit switch, a pressure sensor, or an angle sensor that detects the rotation angle of the cap lever 50. In addition, the opening and closing detection unit 71 is not limited to the contact type sensor and may be a non-contact type sensor such as a transmissive photosensor or an ultrasonic sensor as long as the opening and closing detection unit 71 can detect any one of the closed state and the opened state of the cap lever 50.

In the present embodiment, as shown in FIG. 6, the detector 71*a* is pushed by the protrusion 55 to retract in a direction that reduces the projection amount of the detector 71*a*, and the opening and closing detection unit 71 detects the closed state of the cap lever 50 by detecting the protrusion 55. Further, as shown in FIG. 7, since the detector 71*a* is not pushed by the protrusion 55 and protrudes, and does not detect the protrusion 55, the opening and closing detection unit 71 is in a state of detecting the opened state of the cap lever 50.

As shown in FIG. 4, the lock mechanism 72 is provided at a position on the +Z direction side of the upper wall portion 61. In addition, the lock mechanism 72 is provided at a position in the X axis direction that is adjacent to the guide 64 in which the injection port 41*a* of the liquid container 40K1 is disposed and that is on the −X direction side. The lock mechanism 72 is provided so as to be switchable between a locked state, in which the opening and closing cover 31 cannot shift from the closed state to the opened state, and an unlocked state, in which the opening and closing cover 31 can shift from the closed state to the opened state.

The lock mechanism 72 of the present embodiment is a solenoid that linearly moves a lock pin (not shown) by a magnetic force generated by passing a current through an electromagnetic coil. The lock pin is a movable iron core in the solenoid. The lock pin is provided so that the tip of the lock pin can move between a retracted position located in the lock pin protrusion hole 66 and a protruding position protruding in the +Y direction from the retracted position.

In the present embodiment, the lock pin at the protruding position restricts the upward movement of the restricted portion 31*a* of the opening and closing cover 31 in the closed state. At this time, the opening and closing cover 31 enters a locked state in which the opening and closing cover 31 cannot be shifted from the closed state to the opened state. Further, the lock pin located at the retracted position does not restrict the upward movement of the opening and closing cover 31 in the closed state. At this time, the opening and closing cover 31 is in an unlocked state in which the opening and closing cover 31 can be shifted from the closed state to the opened state.

In the lock mechanism 72 according to the present embodiment, the lock pin moves from the protruding position to the retracted position by energizing the lock mechanism 72. That is, the opening and closing cover 31 is brought into an unlocked state by energizing the lock mechanism 72, and is brought into a locked state by stopping energization of the lock mechanism 72. Therefore, the opening and closing cover 31 in the present embodiment is in a locked state in a state in which the power of the recording apparatus 101 is shut off.

As shown in FIG. 6, the illumination unit 80 of the present embodiment is provided outside the liquid storage portion 46. The illumination unit 80 includes in the carriage 21 a light emitting unit 81 that emits light, a light guide 82, and a light guide 86. The illumination unit 80 of the present embodiment has six light emitting units 81, six light guides 82, and one light guide 86 so as to correspond to the six liquid storage portions 46. The light emitting unit 81 emits visible light. The light emitting unit 81 is provided at a position on the −Z direction side with respect to the upper surface 43U of the liquid storage portion 46. The light emitting unit 81 is provided at a position in the Y-axis direction between the rear surface 43B of the liquid storage portion 46 and the rear wall of the carriage 21. According to this configuration, when the light emitting unit 81 is provided in the carriage 21, the dimension of the carriage 21 in the X-axis direction is less likely to increase. The light emitting unit 81 is provided so that light emitted from the front surface 81*a* of the light emitting unit 81 is directed in the +Z direction. The light emitting unit 81 and the light guide 82 of the present embodiment are directly attached to the carriage 21, but may be attached to the liquid storage portion 46.

The light guide 82 is configured from a translucent or transparent material. As shown in FIGS. 6 and 7, the light guide 82 is provided to the −Y direction side of the rear surface 43B of the liquid storage portion 46. The light guide 82 includes a light entry surface 82*b*, an irradiation surface 82*a*, and a rear surface 82*r*. The light guide 82 of the present embodiment is a light guiding member for guiding light entering from the light entry surface 82*b* toward the irradiation surface 82*a*. For example, if the material constituting the light guide 82 is a resin material, polypropylene (PP), polyethylene (PE), polyamide (PA), acrylonitrile-butadiene-styrene (ABS), polycarbonate (PC), polyethylene terephthalate (PET), polymethylmethacrylate (PMMA), or the like can be adopted.

The light entry surface 82*b* is a side surface of the light guide 82 on the −Z direction side, and is provided at a position facing the front surface 81*a* of the light emitting unit 81. The light entry surface 82*b* is located on the −Y direction side of the rear surface 43B of the liquid storage portion 46.

The irradiation surface 82*a* is a side surface on the +Y direction side of the light guide 82. Therefore, compared to the light emitting unit 81, the irradiation surface 82*a* is closer to the front surface 43F. According to this, it is easy to guide light from the light emitting unit 81 to the front surface 43F side of the liquid storage portion 46. The irradiation surface 82*a* extends from a position in the −Z direction from the upper limit liquid level LH to a position in the +Z direction from the lower limit liquid level LL. The irradiation surface 82*a* of the present embodiment extends in the Z-axis direction from the same position as the upper surface 43U of the liquid storage portion 46 to a position further in the +Z direction than the +Z direction-side end of the window member 43Ba. When the liquid storage portion 46 is formed of a translucent or transparent material, the window member 43Ba may not be provided.

The rear surface 82*r* is a side surface of the light guide 82 on the −Y direction side. The rear surface 82*r* is formed by arranging a plurality of reflection sections 82*t* in the Z-axis direction, and has a serrated shape extending in the Z-axis direction. The reflection section 82*t* has a convex shape formed by a reflection surface 82*d* and a reflection surface 82*e* arranged in the Z-axis direction.

As shown in FIG. 7, the light emitted from the front surface 81*a* of the light emitting unit 81 enters the light guide 82 from the light entry surface 82*b* of the light guide 82. In FIG. 7, a path of light emitted from the light emitting unit 81 is indicated by dashed arrows. The light from the light emitting unit 81 that entered the light guide 82 from the light entry surface 82*b* is guided toward the irradiation surface 82*a* in the light guide 82 by the plurality of reflecting sections 82*t* constituting the rear surface 82*r*, the +X direction side surface, the −X direction side surface, and the +Z direction side surface of the light guide 82.

The light from the light emitting unit 81 guided to the irradiation surface 82*a* passes through the window member 43Ba, enters the liquid storage portion 46 from the −Y direction side of the rear surface 43B, and illuminates the inside of the liquid storage portion 46, including the liquid. In other words, the light emitting unit 81 is provided outside the liquid storage portion 46, and is capable of illuminating the inside of the liquid storage portion 46, including the liquid, from the rear surface 43B side via the light guide 82, at least when the carriage 21 is positioned at the visual check position. In addition, in the recording apparatus 101 of the present embodiment, the inside of the six liquid storage portions 46 is illuminated by six light emitting units 81 through six light guides 82.

The light guide 86 is configured from a translucent or transparent material. As shown in FIGS. 6 and 7, the light guide 86 is provided to the −Z direction side of the upper surface 43U of the liquid storage portion 46. The light guide 86 is provided in the Y-axis direction in between the front surface 43F and the injection port 41*a* of the liquid storage portion 46. The light guide 86 includes a light entry surface 86*b* and an irradiation surface 86*a*. The light guide 86 of the present embodiment is a light guiding member for guiding light entering from the light entry surface 86*b* toward the irradiation surface 86*a*. If the material configuring light guide 86 is a resin material, the same resin material as that of the light guide 82 can be used.

The light entry surface 86*b* is a side surface of the light guide 86 on the −Z direction side. The irradiation surface 86*a* is a side surface of the light guide 86 on the +Z direction side. The irradiation surface 86*a* is located in the −Z direction of the window member 43Ua and faces the window member 43Ua. When the liquid storage portion 46 is formed of a translucent or transparent material, the window member 43Ua may not be provided.

As shown in FIG. 6, when the carriage 21 is at the visual check position and at least the scanner housing 11 of the scanner unit 10 is in the closed state, the front surface 85*a* of the light emitting unit 85 of the scanner housing 11 is positioned in the −Z direction of the light entry surface 86*b* of the light guide 86. In other words, the light emitting unit 85 is provided at a position in the −Z direction of the liquid storage portion 46 in the scanner housing 11 that is in the closed state. Further, a through-hole 31*b* is provided in the opening and closing cover 31 positioned in the Z-axis direction between the front surface 85*a* of the light emitting unit 85 and the light entry surface 86*b* of the light guide 86. By this, the front surface 85*a* of the light emitting unit 85 faces the light entry surface 86*b*. The front surface 85*a* of the light emitting unit 85 of the present embodiment faces the six light entry surfaces 86*b* of the light guide 86.

Therefore, when the carriage 21 is at the visual check position and at least the scanner housing 11 of the scanner unit 10 is in the closed state, the light emitted from the front surface 85*a* of the light emitting unit 85 enters the light guide 86 from the light entry surface 86*b* of the light guide 86. In FIG. 6, a path of light emitted from the light emitting unit 85 is indicated by dashed arrows. The light from the light emitting unit 85 that entered the light guide 86 from the light entry surface 86*b* is guided toward the irradiation surface 86*a* in the light guide 86 by the side surface on the +X direction side, the side surface on the −X direction side, the side surface on the +Y direction side, and the side surface on the −Y direction side of the light guide 86.

The light from the light emitting unit 85 guided to the irradiation surface 86*a* passes through the window member 43Ua, enters the liquid storage portion 46 from the −Z direction side of the upper surface 43U, and illuminates the inside of the liquid storage portion 46, including the liquid. Therefore, the light emitting unit 85 is provided outside the carriage 21 and, when the carriage 21 is positioned at the visual check position, can illuminate the inside of the liquid storage portion 46, including the liquid, from the upper surface 43U side and through the light guide 86. In addition, the light emitting unit 85 illuminates, from the upper surface 43U side and through the light guide 86, a region in the liquid storage portion 46 to the front surface 43F side from the center. In addition, in the recording apparatus 101 of the present embodiment, the inside of the six liquid storage portions 46 is illuminated by one light emitting unit 85 through one light guide 86.

In the present embodiment, the light emitting unit 81 and the light emitting unit 85 emit visible light to illuminate the inside of the liquid storage portion 46, including the liquid. According to this, in the recording apparatus 101 of the present embodiment, it is easy to check the liquid stored in the liquid storage portion 46 and the liquid surface LS of the liquid, compared to a case where the illumination unit 80 is not provided.

Figure 9:
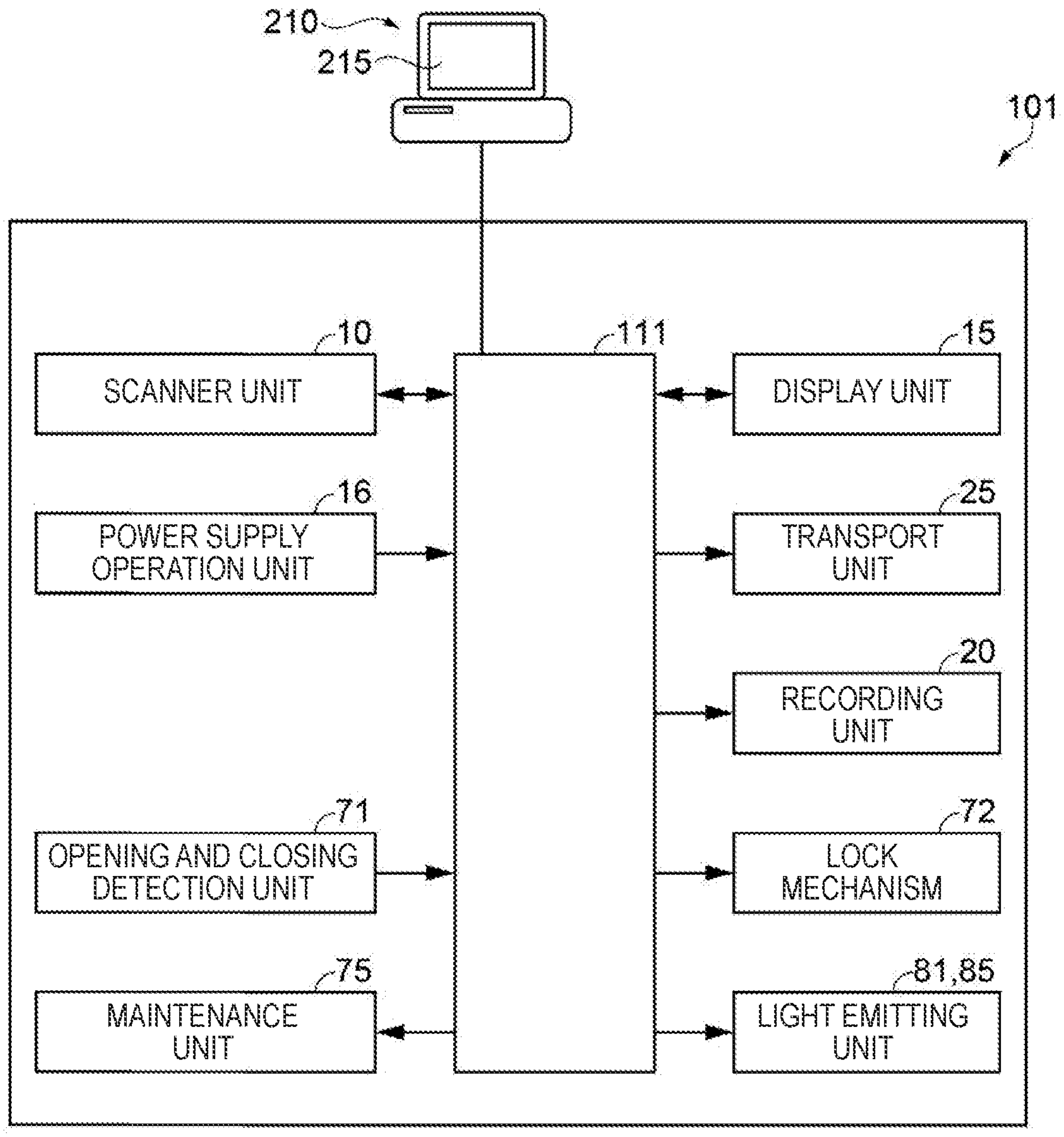
FIG. 9 is a block diagram showing electrical configuration of the recording apparatus.

Next, an electrical configuration of the recording apparatus 101 will be described. As shown in FIG. 9, the recording apparatus 101 includes a controller 111. The scanner unit 10, the power supply operation unit 16, the display unit 15, and the opening and closing detection unit 71 are coupled to the controller 111 via an input interface (not shown). In addition, the display unit 15, the transport unit 25, the recording unit 20, the lock mechanism 72, the maintenance unit 75, and the light emitting units 81 and 85 of the illumination unit 80 are connected to the controller 111 via an output interface (not illustrated). As a notification unit, the display unit 15 and a display unit 215 have a function of displaying and notifying information received together with a display instruction in accordance with the instruction.

Here, the controller 111 is coupled to the display unit 215 of a host device 210, which is an external device, through a communication interface, a communication cable, a wireless communication line, or the like (not shown) in the apparatus main body 102. The controller 111 transmits a signal requesting display of information based on the data together with the data to at least one of the display unit 15 and the host device 210, and performs notification processing for displaying and notifying the information based on the data on the display unit 15 and the display unit 215. Examples of the host device 210 include a personal computer, a smartphone, a mobile phone, and a portable information terminal.

The controller 111 includes, for example, a CPU and a memory (not shown), and performs various controls by the CPU executing a program stored in the memory. The CPU is an arithmetic processing unit. The controller 111 has a function of displaying information on either the display unit 15 or the display unit 215 so that the information is notified by the display.

The controller 111 causes one of the display unit 15 and the display unit 215 to notify information related to one of the closed state and the opened state of the cap lever 50 based on a detection result obtained by the opening and closing detection unit 71 detecting one of the closed state and the opened state of the cap lever 50. In addition, when the opening and closing detection unit 71 detects the opened state of the cap lever 50 when there is an operation of cutting off the power supply of the recording apparatus 101, the controller 111 causes one of the display unit 15 or the display unit 215 to notify information requesting the cap lever 50 to be brought into the closed state.

The controller 111 manages the liquid amount in the liquid storage portion 46 of each liquid container 40. When the user has finished injecting the liquid into the liquid storage portion 46 of the liquid container 40, information on the amount of liquid in the liquid storage portion 46 is input to the recording apparatus 101 by an operation at the display unit 15 or the host device 210. The controller 111 acquires the current liquid amount in the liquid storage portion 46 after liquid injection based on the input information related to amount of liquid. In addition, the controller 111 measures the consumption amount of the liquid ejected by the recording unit 20, and subtracts the consumption amount this time from the previous liquid amount for each liquid container 40, thereby managing the current liquid amount in the liquid storage portion 46 for each liquid container 40.

The controller 111 controls the recording unit 20 to perform a recording operation for ejecting liquid toward a medium transported by the transport unit 25 and a flushing operation that is for ejecting liquid and that is unrelated to recording. In addition, the controller 111 controls a maintenance unit 75 to perform a cleaning operation in which liquid is forcibly discharged from the nozzles of the recording head 22. The recording apparatus 101 includes a carriage motor (not shown) as a driving source that moves the carriage 21 in the width direction of the medium, and the controller 111 performs a recording operation of ejecting liquid from the moving recording head 22 mounted on the carriage 21 by liquid ejection control of the recording head 22 and drive control of the carriage motor.

The controller 111 controls the transport unit 25 to feed a medium from a medium containing cassette (not shown) and to transport the fed medium along a predetermined transport path. The transport unit 25 includes, for example, a roller-type or belt-type transport mechanism and a transport motor (not shown) serving as a drive source thereof. The controller 111 performs transport control of a medium by controlling a transport motor.

The controller 111 controls the lock mechanism 72 by controlling energization to the lock mechanism 72 to switch between a locked state in which the opening and closing cover 31 cannot be shifted from the closed state to the opened state and an unlocked state in which the opening and closing cover 31 can be shifted from the closed state to the opened state. For example, when there is a liquid container 40 in which the amount of liquid in the liquid storage portion 46 has reached the lower limit amount, the controller 111 causes the lock mechanism 72 to transition from the locked state to the unlocked state.

The controller 111 notifies the user of the operating state of the recording apparatus 101 by controlling the light emission state of the light emitting units 81, 85. Further, the controller 111 controls the light emission state of the light emitting units 81, 85, thereby reducing power consumption of the recording apparatus 101. For example, the controller 111 turns off the light emitting unit 81 when the carriage 21 is at the recording position, and turns on the light emitting unit 81 when the carriage 21 is at the visual check position. In addition, for example, the controller 111 may turn on the light emitting unit 81 every time a series of recording operations is completed, and turn off the light emitting unit 81 when the recording operation is started. In addition, for example, the controller 111 turns on the light emitting unit 81 when the user operates the power supply operation unit 16 and the power source of the recording apparatus 101 turns on, and turns off the light emitting unit 81 when the carriage 21 is at the recording position. In addition, for example, the controller 111 turns on the light emitting unit 81 when operations of the power supply operation unit 16, the display unit 15, the scanner unit 10, the opening and closing cover 31, and the like are performed, and turns off the light emitting unit 81 when no operation is performed for a certain period.

In addition, for example, the controller 111 turns on the light emitting unit 81 when the opening and closing cover 31 is in the opened state, and turns off the light emitting unit 81 when a predetermined time has elapsed after the opening and closing cover 31 is in the closed state. In addition, for example, when the liquid amount in the liquid storage portion 46 becomes close to the lower limit amount, the controller 111 turns on or blinks the light emitting unit 81. Accordingly, it is possible to notify the user that the liquid container 40 needs to be refilled. Further, for example, when the lock mechanism 72 is in the unlocked state, the controller 111 turns on or blinks the light emitting unit 81. In addition, for example, when there is the liquid container 40 in which the liquid amount in the liquid storage portion 46 becomes the lower limit amount, the controller 111 displays the fact on the display unit 15 or the display unit 215, and turns on or blinks the light emitting unit 81 corresponding to the liquid storage portion 46 in which the liquid amount became the lower limit amount until the opening and closing cover 31 changes from the opened state to the closed state.

Further, for example, the controller 111 may turn on the light emitting unit 85 when at least the scanner housing 11 of the scanner unit 10 is in the opened state. According to this, when the user replenishes liquid from the refill container 90 to the liquid container 40, it is possible to illuminate the upper side of the carriage 21. In addition, for example, when the carriage 21 is at the visual check position and at least the scanner housing 11 of the scanner unit 10 is in the closed state, the controller 111 may illuminate the inside of the liquid storage portion 46, including the liquid, by turning on the light emitting unit 85.

As described above, the recording apparatus 101 according to the first embodiment, the following effects can be obtained.

The recording apparatus 101 includes the liquid storage portion 46 capable of storing liquid, the liquid storage portion having a front surface 43F by which the stored liquid is visually checkable from the outside, the recording head 22 that ejects liquid supplied from the liquid storage portion 46 to a medium, the carriage 21 mounted with the liquid storage portion 46 and the recording head 22, the carriage 21 being movable to the visual check position, where the liquid in the liquid storage portion 46 is visually checkable through the front surface 43F, and to the recording position, where the recording head 22 ejects the liquid to the medium, and the light emitting units 81 and 85 capable of illuminating the inside of the liquid storage portion 46 at least when the carriage 21 is positioned at the visual check position. According to this, in a case where the liquid storage portion 46 is mounted on the carriage 21, it is easy to visually check the liquid in the liquid storage portion 46.

The recording apparatus 101 includes the apparatus main body 102 that accommodates the carriage 21 and a scanner housing 11 provided in the apparatus main body 102. The scanner housing 11 is movable between a closed state covering the apparatus main body 102 and an opened state exposing the inside of the apparatus main body 102. The light emitting unit 85 is provided at a position to the −Z direction side of the liquid storage portion 46 when the carriage 21 is positioned at the visual check position while the scanner housing 11 is in the closed state. According to this configuration, the inside of the liquid storage portion 46 can be illuminated from above by light emitted by the light emitting unit 85 provided outside the carriage 21. In addition, compared to a case in which the light emitting unit 85 is provided in the carriage 21, the size of the carriage 21 is less likely to increase.

The light emitting unit 81 is coupled on the carriage 21. According to this configuration, for example, compared to the light emitting unit 85 provided in the scanner unit 10, even when the scanner unit 10 is in the opened state, the inside of the liquid storage portion 46 can be illuminated by the light emitted by the light emitting unit 81.

The light emitting unit 81 is directly attached to the carriage 21. According to this configuration, it is easy to mount the liquid container 40 on the carriage 21 as a detachable cartridge.

The recording apparatus 101 further includes a light guide 86 that guides light from the light emitting unit 85 toward the inside of the liquid storage portion 46. According to this, it is possible to reduce restrictions on the position where the light emitting unit 85 is provided.

The light guide 86 has the light entry surface 86*b* that faces the light emitting unit 85 and into which light from the light emitting unit 85 enters. According to this, the light from the light emitting unit 85 can efficiently enter the light guide 86, and the inside of the liquid storage portion 46 can be illuminated by the light from the light emitting unit 85 via the light guide 86.

The light guide 82 has the irradiation surface 82*a* for irradiating light from the light emitting unit 81 toward the inside of the liquid storage portion 46, and at least a portion of the irradiation surface 82*a* is located closer to the front surface 43F compared to the light emitting unit 81. According to this, it is easy to guide light from the light emitting unit 81 to the front surface 43F side of the liquid storage portion 46.

The apparatus main body 102 has the visual check member 34*a* at a position facing the front surface 43F when the carriage 21 is at the visual check position, and the visual check member 34*a* is translucent or transparent. According to this, in addition to being easy to visually check the liquid in the liquid storage portion 46, it is possible to suppress entry of foreign matter such as dust into the apparatus main body 102.

The recording apparatus 101 further includes a controller 111 that controls turning on and off of the light emitting unit 81 or the light emitting unit 85. According to this configuration, the controller 111 can notify the user of the operation state of the recording apparatus 101 by controlling turning on and off of the light emitting unit 81 or the light emitting unit 85.

The recording apparatus 101 further includes the injection portion 41 that enables injection of the liquid into the liquid storage portion 46. According to this configuration, the liquid storage portion 46 can also be employed in the refill-type recording apparatus 101 that is used by refilling with liquid.

2. Second Embodiment

Next, a recording apparatus 101 of a second embodiment as an embodiment of the present disclosure will be described. In the present embodiment, configurations different from those of the recording apparatus 101 according to the first embodiment will be mainly described, and description of common portions will be omitted. In addition, the description of actions and effects similar to those of the first embodiment will also be omitted.

Figure 10:
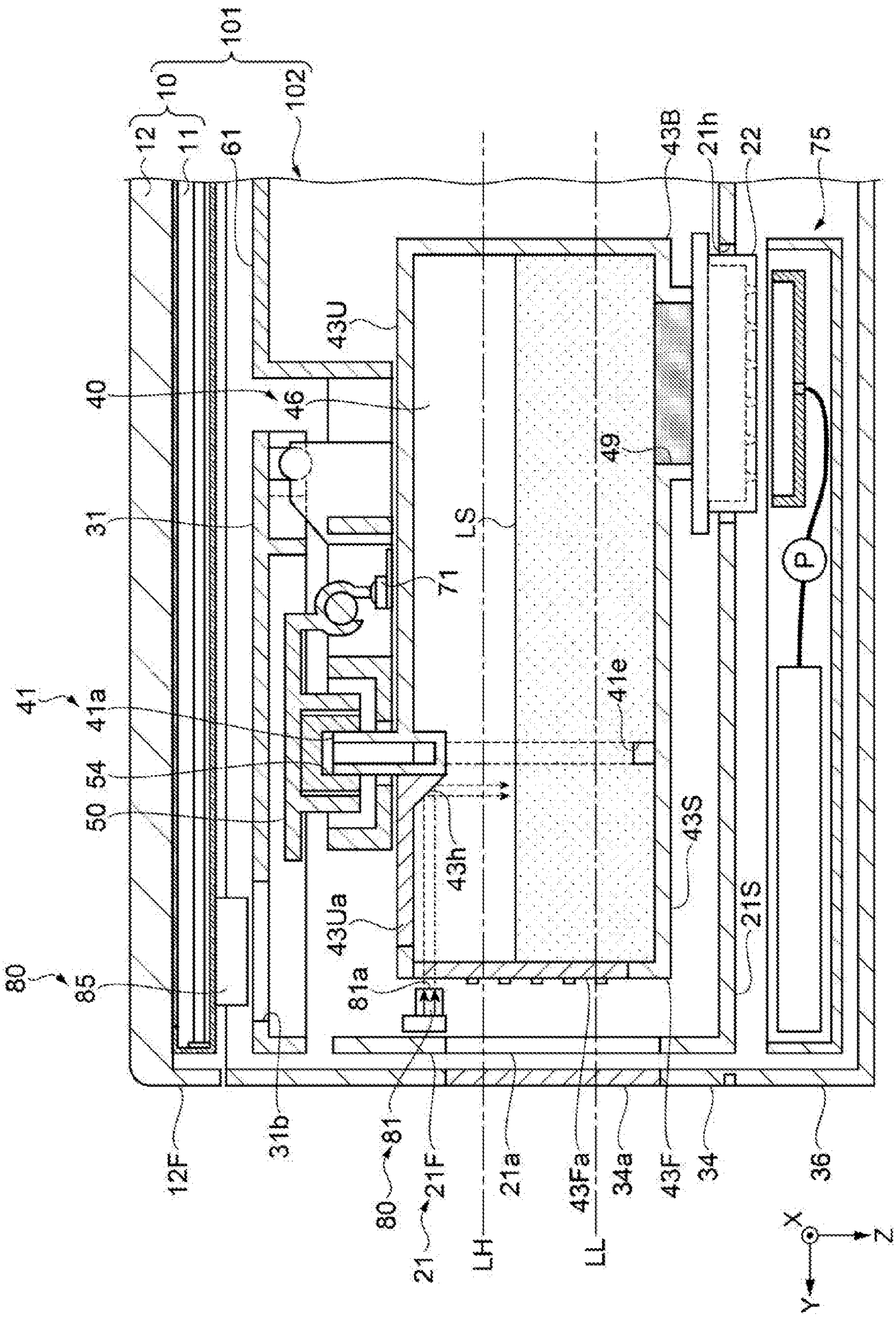
FIG. 10 is a main-part cross-sectional view of a recording apparatus according to a second embodiment.

The recording apparatus 101 of the second embodiment is the same as the recording apparatus 101 of the first embodiment except for the configuration of the carriage 21. As shown in FIG. 10, the carriage 21 of the second embodiment is different from the carriage 21 of the first embodiment in that the illumination unit 80 provided in the carriage 21 does not include the light guide 82 and the light guide 86, the placement of the light emitting unit 81 is different, and the liquid storage portion 46 of the liquid container 40 does not include the window member 43Ba.

In the present embodiment, the illumination unit 80 provided in the carriage 21 includes six light emitting units 81 so as to correspond to the six liquid storage portions 46. As shown in FIG. 10, the light emitting unit 81 is provided at a position on the +Z direction side with respect to the upper surface 43U of the liquid storage portion 46. The light emitting unit 81 is provided at a position in the −Z direction with respect to the through-hole 21*a* of the carriage 21. The light emitting unit 81 is provided at a position in the −Z direction with respect to the visual check member 34*a* of the visual check portion 34. In addition, the light emitting unit 81 is provided at a position in the Y axis direction in between the front surface 43F of the liquid storage portion 46 and the front wall 21F of the carriage 21. According to this configuration, when the light emitting unit 81 is provided in the carriage 21, the dimension of the carriage 21 in the X-axis direction is less likely to increase. The light emitting unit 81 is provided so that light emitted from the front surface 81*a* of the light emitting unit 81 is directed in the −Y direction. The light emitting unit 81 of the present embodiment is directly attached to the carriage 21, but may be attached to the liquid storage portion 46.

An end on the −Z direction side of the window member 43Fa provided in the liquid storage portion 46 of the present embodiment is positioned on the −Z direction side in the Z axis direction of the front surface 81*a* of the light emitting unit 81. Therefore, the front surface 81*a* of the light emitting unit 81 is provided at a position facing the window member 43Fa. In addition, a reflection surface 43*h* that slants in the +Z direction with distance in the −Y direction is provided at the −Y direction side end of the window member 43Ua provided in the liquid storage portion 46 of the present embodiment. When the liquid storage portion 46 is formed of a translucent or transparent material, the window member 43Ua including the reflection surface 43*h* may not be provided. In this case, the window member 43Ua including the reflection surface 43*h* is provided integrally with the upper surface 43U.

In FIG. 10, a path of light emitted from the light emitting unit 81 is indicated by dashed arrows. The light emitted from the front surface 81*a* of the light emitting unit 81 enters the liquid storage portion 46 from the +Y direction side of the front surface 43F through the window member 43Fa, and travels in the liquid storage portion 46 in the −Y direction. The light traveling in the −Y direction inside the liquid storage portion 46 is reflected by the reflection surface 43*h* of the window member 43Ua and travels toward the liquid surface LS of the liquid located in the +Z direction. In this case, the reflection surface 43*h* of the window member 43Ua can also be referred to as a light guide provided in the liquid storage portion 46.

The light from the light emitting unit 81 enters the liquid storage portion 46 from the +Y direction side of the front surface 43F through the window member 43Fa, and illuminates the inside of the liquid storage portion 46, including the liquid. In addition, the light emitting unit 81 illuminates, from the upper surface 43U side, a region in the liquid storage portion 46 to the front surface 43F side from the center. In addition, in the recording apparatus 101 of the present embodiment, the inside of the six liquid storage portions 46 is illuminated by six light emitting units 81.

As described above, according to the recording apparatus 101 according to the second embodiment, the following effects can be obtained.

The light emitting unit 81 is positioned between the carriage 21 and the liquid storage portion 46. According to this, the light emitting unit 81 provided in the carriage 21 can be disposed outside the liquid storage portion 46.

3. Third Embodiment

Next, a recording apparatus 101 of a third embodiment as an embodiment of the present disclosure will be described. In the present embodiment, configurations different from those of the recording apparatus 101 according to the first embodiment will be mainly described, and description of common portions will be omitted. In addition, the description of actions and effects similar to those of the first embodiment will also be omitted.

Figure 11:
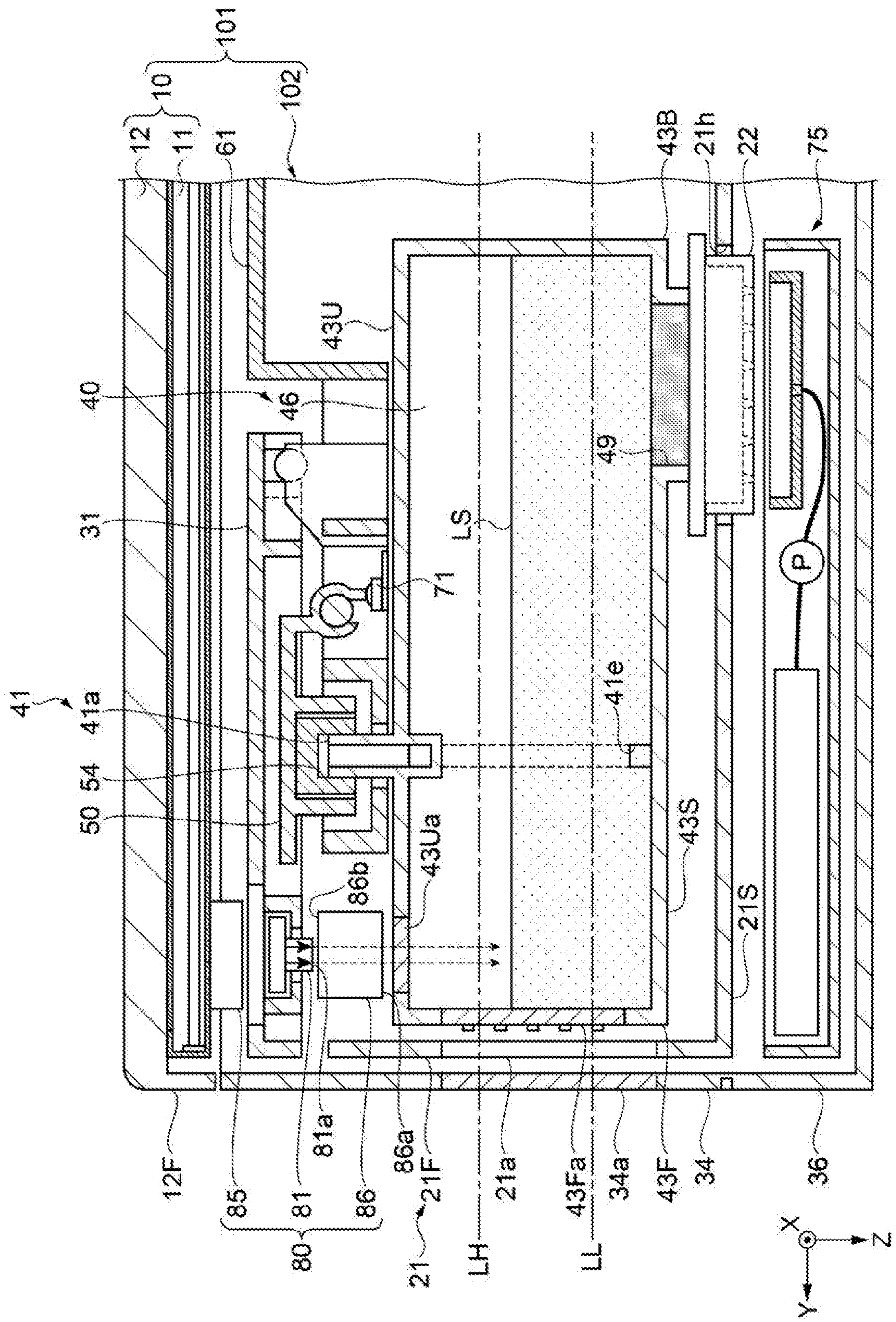
FIG. 11 is a main-part cross-sectional view of a recording apparatus according to a third embodiment.

The recording apparatus 101 of the third embodiment is the same as the recording apparatus 101 of the first embodiment except for the configuration of the carriage 21. As shown in FIG. 11, the carriage 21 of the third embodiment is different from the carriage 21 of the first embodiment in that the illumination unit 80 provided in the carriage 21 does not include the light guide 82, the light emitting unit 81 is provided in the opening and closing cover 31, the liquid storage portion 46 of the liquid container 40 does not include the window member 43Ba, and the opening and closing cover 31 does not include the through-hole 31*b*.

In the present embodiment, the illumination unit 80 provided in the carriage 21 includes six light emitting units 81 and one light guide 86 so as to correspond to the six liquid storage portions 46. The light guide 86 is the same as that of the first embodiment. As shown in FIG. 11, the light emitting unit 81 of the present embodiment is provided on the opening and closing cover 31. Therefore, the light emitting unit 81 is positioned in the −Z direction with respect to the upper surface 43U of the liquid storage portion 46. In addition, the light emitting unit 81 is provided at a position in the −Z direction of the light entry surface 86*b* of the light guide 86 and at a position facing the light entry surface 86*b* when the opening and closing cover 31 is in the closed state. The light emitting unit 81 is provided so that when the opening and closing cover 31 is in the closed state, light emitted from the front surface 81*a* of the light emitting unit 81 is directed in the +Z direction.

In addition, the light emitting unit 81 is provided at a position in the Y axis direction in between the front surface 43F of the liquid storage portion 46 and the cap lever 50 when the opening and closing cover 31 is in the closed state. According to this, when the light emitting unit 81 is provided in the carriage 21, the dimension of the carriage 21 in the Y-axis direction is less likely to increase. In addition, the light emitting unit 81 is provided at a position in the Y axis direction in between the front surface 43F of the liquid storage portion 46 and the injection portion 41 when the opening and closing cover 31 is in the closed state. According to this configuration, when the light emitting unit 81 is provided in the carriage 21, the dimension of the carriage 21 in the X-axis direction is less likely to increase. In addition, each light emitting unit 81 is provided at a position in the X-axis direction at the center of the corresponding liquid storage portion 46.

In FIG. 11, a path of light emitted from the light emitting unit 81 is indicated by dashed arrows. When the opening and closing cover 31 is in the closed state, light emitted from the front surface 81*a* of the light emitting unit 81 enters the light guide 86 from the light entry surface 86*b* of the light guide 86. The light from the light emitting unit 81 that entered the light guide 86 from the light entry surface 86*b* is guided toward the irradiation surface 86*a* in the light guide 86 by the side surface on the +X direction side, the side surface on the −X direction side, the side surface on the +Y direction side, and the side surface on the −Y direction side of the light guide 86.

The light from the light emitting unit 81 guided to the irradiation surface 86*a* enters the liquid storage portion 46 through the window member 43Ua from the −Z direction side of the upper surface 43U, and illuminates the inside of the liquid storage portion 46, including the liquid. Therefore, when the opening and closing cover 31 is in the closed state, the light emitting unit 81 can illuminate the inside of the liquid storage portion 46, including the liquid, via the light guide 86. In addition, the light emitting unit 81 illuminates, from the upper surface 43U side, a region in the liquid storage portion 46 to the front surface 43F side from the center. In addition, in the recording apparatus 101 of the present embodiment, the inside of the six liquid storage portions 46 is illuminated by six light emitting units 81 through one light guide 86.

The controller 111 of the present embodiment turns off the light emitting unit 81 when the carriage 21 is at the recording position, and turns on the light emitting unit 81 when the carriage 21 is at the visual check position and also the opening and closing cover 31 is in the closed state. In addition, since the opening and closing cover 31 of the present embodiment does not include the through-hole 31*b*, the controller 111 turns off the light emitting unit 85 when the carriage 21 is at the recording position and turns on the light emitting unit 85 when the carriage 21 is at the visual check position and also the scanner unit 10 is in the opened state.

As described above, according to the recording apparatus 101 according to the third embodiment, the following effects can be obtained.

The carriage 21 has the opening and closing cover 31 pivotable between the closed state covering the upper part of the liquid storage portion 46 and the opened state exposing the upper part, and the light emitting unit 81 is provided on the opening and closing cover 31. According to this, the light emitting unit 81 provided in the carriage 21 can be disposed outside the liquid storage portion 46.

4. Fourth Embodiment

Next, a recording apparatus 101 of a fourth embodiment as an embodiment of the present disclosure will be described. In the present embodiment, configurations different from those of the recording apparatus 101 according to the first embodiment will be mainly described, and description of common portions will be omitted. In addition, the description of actions and effects similar to those of the first embodiment will also be omitted.

Figure 12:
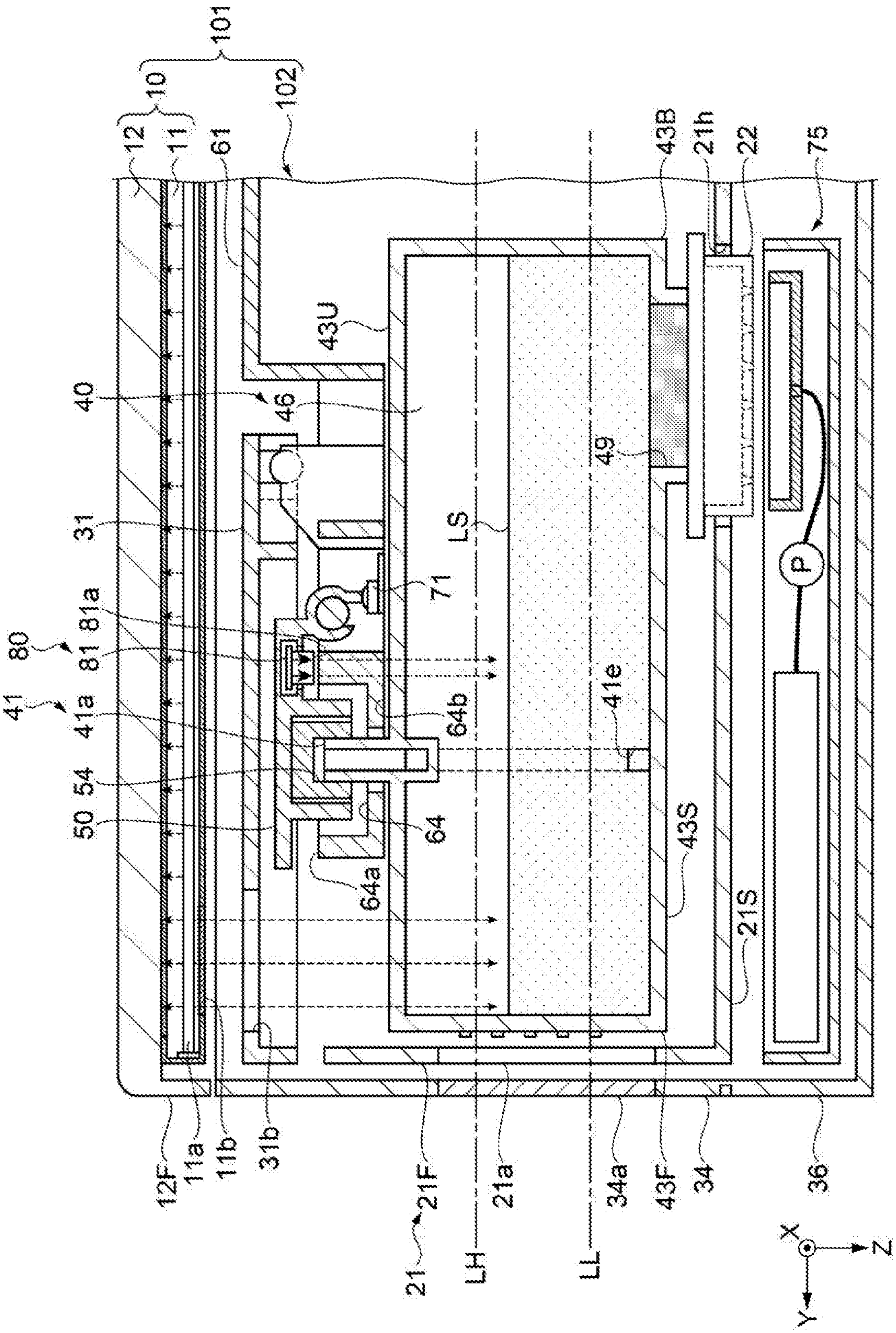
FIG. 12 is a main-part cross-sectional view of a recording apparatus according to a fourth embodiment.

The recording apparatus 101 of the fourth embodiment is different from the recording apparatus 101 of the first embodiment in the configurations of the scanner unit 10 and the carriage 21. As shown in FIG. 12, the scanner unit 10 of the present embodiment is different from the scanner unit 10 of the first embodiment in that the scanner housing 11 does not include the light emitting unit 85 and includes an illumination window 11*b*. The illumination window 11*b* is provided at a position in the −Z direction of the through-hole 31*b* of the opening and closing cover 31.

Figure 13:
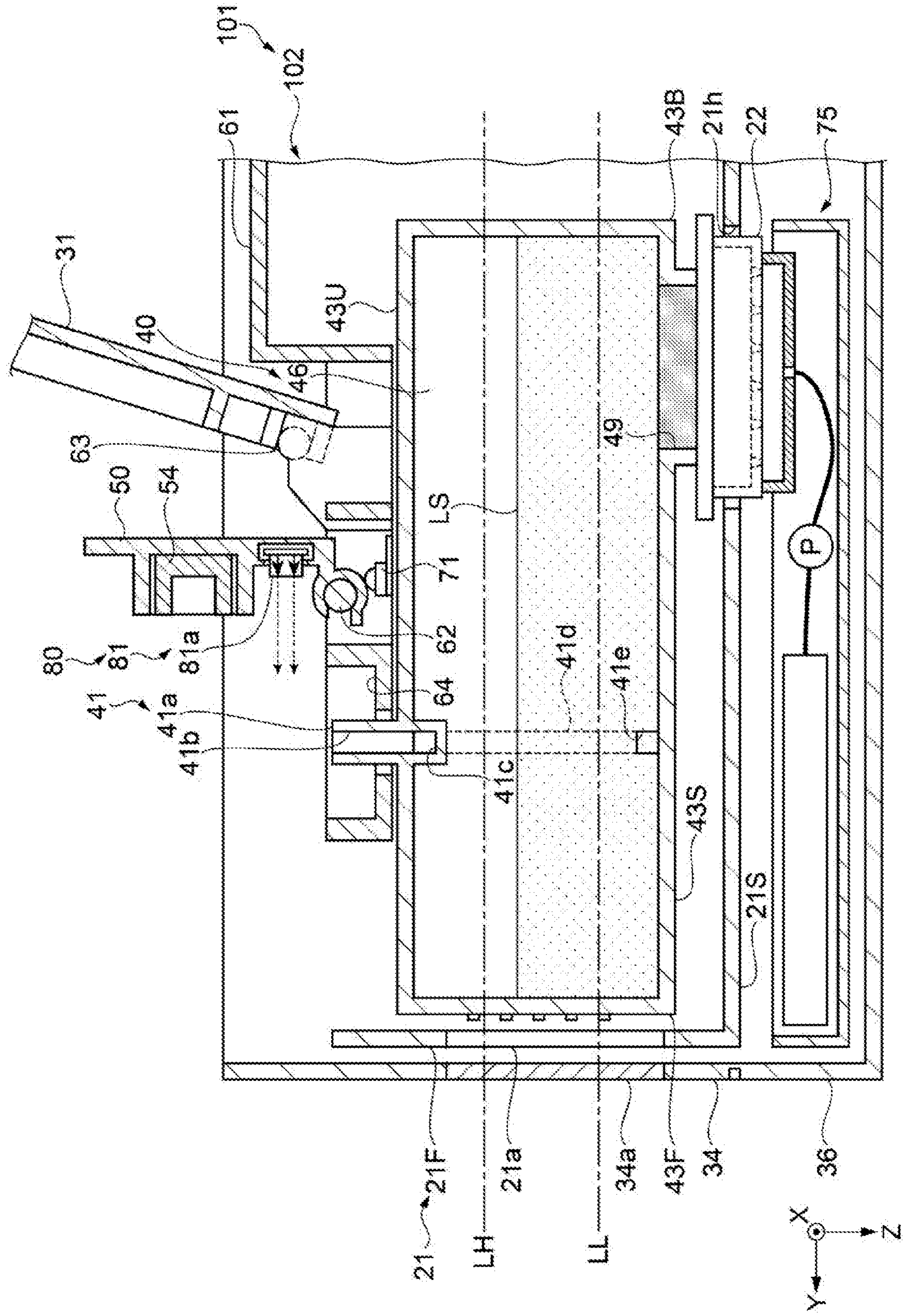
FIG. 13 is a main-part cross-sectional view showing the recording apparatus according to the fourth embodiment, when the scanner unit is open and the opening and closing cover and the cap lever are in an opened state.

As shown in FIGS. 12 and 13, the carriage 21 of the fourth embodiment is different from the carriage 21 of the first embodiment in that the illumination unit 80 provided in the carriage 21 does not include the light guide 82 or the light guide 86, the light emitting unit 81 is provided in the cap lever 50, the liquid storage portion 46 of the liquid container 40 does not include the window members 43Fa, 43Ua, 43Ba, and the liquid storage portion 46 and the upper wall portion 61 are formed of a translucent or transparent material.

In the present embodiment, the illumination unit 80 provided in the carriage 21 includes six light emitting units 81 so as to correspond to the six liquid storage portions 46. As shown in FIG. 12, the light emitting unit 81 of the present embodiment is provided in the cap lever 50. Therefore, the light emitting unit 81 is positioned in the −Z direction with respect to the upper surface 43U of the liquid storage portion 46. Further, when the cap lever 50 is in the closed state, the light emitting unit 81 is provided at a position in the −Z direction of an upper surface 64*a* of the guide 64 at the upper wall portion 61 and at a position facing the upper surface 64*a*. The light emitting unit 81 is provided so that when the cap lever 50 is in the closed state, light emitted from the front surface 81*a* of the light emitting unit 81 is directed in the +Z direction.

The light emitting unit 81 is provided at a position in the Y axis direction in between the rear surface 43B of the liquid storage portion 46 and the injection port 41*a* when the cap lever is in the closed state. According to this, when the light emitting unit 81 is provided in the carriage 21, the dimension of the carriage 21 in the Y-axis direction is less likely to increase. As shown in FIG. 13, when the cap lever 50 is in the opened state, the light emitting unit 81 is provided at a position in the Y-axis direction in between the guide 64 and the rear surface 43B of the liquid storage portion 46. When the cap lever 50 is in the opened state, the light emitting unit 81 is provided at a position in the Z-axis direction in between the injection port 41*a* and the uppermost surface of the apparatus main body 102. The light emitting unit 81 is provided such that, when the cap lever 50 is in the opened state, light emitted from the front surface 81*a* of the light emitting unit 81 is directed in the +Y direction.

In FIGS. 12 and 13, a path of light emitted from the light emitting unit 81 is indicated by dashed arrows. As shown in FIG. 12, when the cap lever 50 is in the closed state, light emitted from the front surface 81*a* of the light emitting unit 81 enters the guide 64 from the upper surface 64*a* of the guide 64. Note that the guide 64 of the present embodiment is translucent or transparent because the upper wall portion 61 is configured from a translucent or transparent material. The light from the light emitting unit 81 that entered the guide 64 from the upper surface 64*a* is guided in the guide 64 toward the bottom surface 64*b* of the guide 64.

The light from the light emitting unit 81 guided to the bottom surface 64*b* enters the liquid storage portion 46 from the −Z direction side of the upper surface 43U through the upper surface 43U, and illuminates the inside of the liquid storage portion 46, including the liquid. Note that the upper surface 43U of the present embodiment is translucent or transparent because the liquid storage portion 46 is configured from a translucent or transparent material. Therefore, when the cap lever 50 is in the closed state, the light emitting unit 81 can illuminate the inside of the liquid storage portion 46, including the liquid, via the guide 64. At this time, the light emitting unit 81 illuminates a central region in the liquid storage portion 46 from the upper surface 43U side. In addition, in the recording apparatus 101 of the present embodiment, the inside of the six liquid storage portions 46 is illuminated by six light emitting units 81.

The controller 111 of the present embodiment turns off the light emitting unit 81 when the carriage 21 is at the recording position, and turns on the light emitting unit 81 when the scanner unit 10 is in the opened state, the carriage 21 is at the visual check position, and the cap lever 50 is in the closed state. Accordingly, the user can visually check, through the front surface 43F from the +Y direction side of the apparatus main body 102, the liquid in the liquid storage portion 46 illuminated by the light emitting unit 81. The controller 111 may turn on the light emitting source 11*a* of the scanner housing 11 when the scanner unit 10 is in the closed state, the carriage 21 is in the visual check position, and the cap lever 50 is in the closed state. Accordingly, the user can visually check, through the front surface 43F from the +Y direction side of the apparatus main body 102, the liquid in the liquid storage portion 46 illuminated by the light emitting source 11*a*.

The controller 111 may turn on the light emitting unit 81 and the light emitting source 11*a* of the scanner housing 11 when the scanner unit 10 is in the closed state, the carriage 21 is in the visual check position, and the cap lever 50 is in the closed state. Accordingly, the user can visually check, through the front surface 43F from the +Y direction side of the apparatus main body 102, the liquid in the liquid storage portion 46 illuminated by the light emitting unit 81 and the light emitting source 11*a*.

Further, the controller 111 may turn on the light emitting unit 81 when the scanner unit 10 is in the opened state, the carriage 21 is in the visual check position, and the cap lever 50 is in the opened state. According to this, by the light emitting unit 81 emitting light when the user replenishes liquid in the liquid container 40 from the refill container 90, it is possible to illuminate the vicinity of the guide 64 and the injection port 41*a*. At this time, the controller 111 may turn on the light emitting source 11*a* of the scanner housing 11. According to this, the light emitted from the light emitting source 11*a* can pass through the illumination window 11*b* and illuminate the upper side of the carriage 21.

As described above, according to the recording apparatus 101 according to the fourth embodiment, the following effects can be obtained.

The carriage 21 has the cap lever 50 pivotable between the closed state covering the upper part of the liquid storage portion 46 and the opened state exposing the upper part, and the light emitting unit 81 is provided on the cap lever 50. According to this, the light emitting unit 81 provided in the carriage 21 can be disposed outside the liquid storage portion 46. In addition, by the light emitting unit 81 emitting light when the user accesses the upper side of the carriage 21, it is possible to illuminate the vicinity of the guide 64 or the injection port 41*a*.

5. Fifth Embodiment

Next, a recording apparatus 101 of a fifth embodiment as one embodiment of the present disclosure will be described. In the present embodiment, configurations different from those of the recording apparatus 101 according to the first embodiment will be mainly described, and description of common portions will be omitted. In addition, the description of actions and effects similar to those of the first embodiment will also be omitted.

Figure 14:
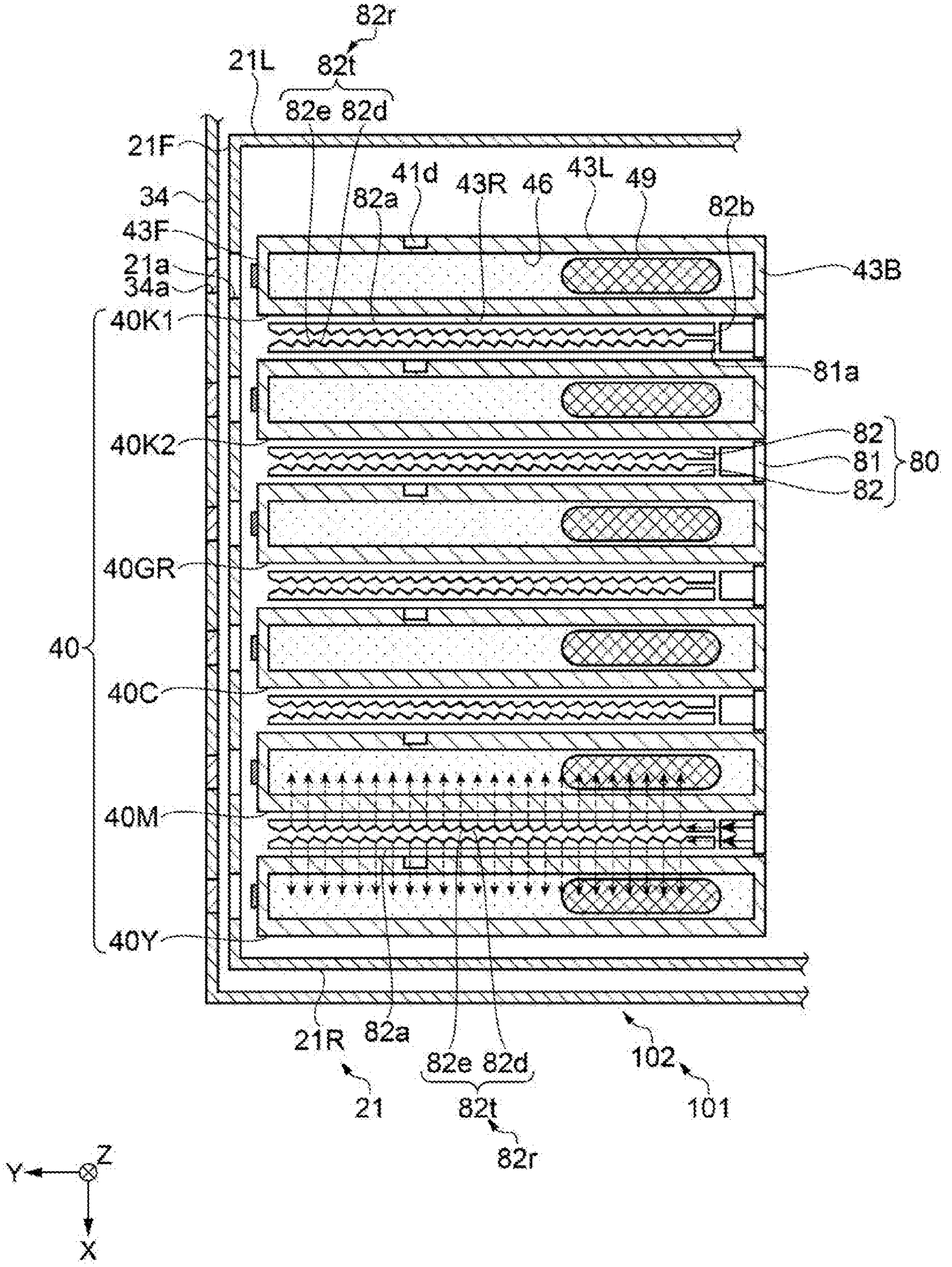
FIG. 14 is a main-part cross-sectional view of a recording apparatus according to a fifth embodiment.

The recording apparatus 101 of the fifth embodiment is the same as the recording apparatus 101 of the first embodiment except for the configuration of the carriage 21. As shown in FIG. 14, the carriage 21 of the fifth embodiment is different from the carriage 21 of the first embodiment in that the placement of the light emitting units 81 and the light guides 82 is different in the illumination unit 80 provided in the carriage 21, the liquid storage portion 46 of the liquid container 40 does not include the window members 43Fa, 43Ua, 43Ba, and the liquid storage portion 46 is formed of a translucent or transparent material.

As shown in FIG. 14, in the present embodiment, the light emitting units 81 of the illumination unit 80 provided in the carriage 21 are provided at positions in the X axis direction in between liquid storage portions 46 of the six liquid storage portions 46, which are aligned in the X axis direction. For this reason, the illumination unit 80 of the present embodiment includes five light emitting units 81. The light emitting unit 81 is provided at a position in the Y-axis direction between the front surface 43F and the rear surface 43B of the liquid storage portion 46 and at a position closer to the rear surface 43B compared to center of the liquid storage portion 46. According to this, when the light emitting unit 81 is provided in the carriage 21, the dimension of the carriage 21 in the Y-axis direction is less likely to increase.

The light emitting unit 81 is provided at a position in the Z-axis direction between the upper surface 43U and the bottom surface 43S of the liquid storage portion 46. According to this, when the light emitting unit 81 is provided in the carriage 21, the dimension of the carriage 21 in the Z-axis direction is less likely to increase. The light emitting unit 81 is provided so that light emitted from the front surface 81*a* of the light emitting unit 81 is directed in the +Y direction. The light emitting unit 81 of the present embodiment is directly attached to the carriage 21, but may be attached to the liquid storage portion 46.

Two light guides 82 of the present embodiment are provided at positions in the X-axis direction in between the liquid storage portions 46 of the six liquid storage portions 46, which are arranged in the X-axis direction. For this reason, the illumination unit 80 of the present embodiment includes ten light guides 82. Further, the light guides 82 are provided at positions where the light entry surfaces 82*b* face the front surface 81*a* of the light emitting unit 81.

Of the two light guides 82 provided at positions between two liquid storage portions 46 in the X-axis direction, one light guide 82 located on the +X direction side is provided such that the irradiation surface 82*a* faces the left side surface 43L of the liquid storage portion 46 located on the +X direction side. Further, of the two light guides 82 provided at positions between two liquid storage portions 46 in the X-axis direction, the other light guide 82 located on the −X direction side is provided such that the irradiation surface 82*a* faces the right side surface 43R of the liquid storage portion 46 located on the −X direction side.

In addition, the +Y direction side end of the irradiation surface 82*a* is positioned at substantially the same position in the Y axis direction as the +Y direction side end of the inner surface of the liquid storage portion 46. Therefore, the irradiation surface 82*a* of the light guide 82 extends along either the left side surface 43L or the right side surface 43R of the liquid storage portion 46, and is provided so as to correspond to the inner surface of the liquid storage portion 46 in the Y-axis direction. In other words, the light guide 82 has the irradiation surface 82*a* for irradiating light from the light emitting unit 81 toward the inside of the liquid storage portion 46, and at least a portion of the irradiation surface 82*a* is located in the Y-axis direction closer to the front surface 43F compared to the light emitting unit 81.

As shown in FIG. 14, the light emitted from the front surface 81*a* of the light emitting unit 81 enters the light guide 82 from the light entry surface 82*b* of the light guide 82. In FIG. 14, the path in the X-axis direction of light emitted from the light emitting unit 81 provided between the liquid storage portion 46 of the liquid container 40Y and the liquid storage portion 46 of the liquid container 40M is indicated by dashed arrows. The light from the light emitting unit 81 that entered the light guide from the light entry surface 82*b* is guided toward the irradiation surface 82*a* in the light guide 82 by the plurality of reflecting sections 82*t* constituting the rear surface 82*r*, the +Z direction side surface, the −Z direction side surface, and the +Y direction side surface of the light guide 82.

Of the two light guides 82, with respect to the light guide 82 positioned in the +X direction, the light from the light emitting unit 81 guided to the irradiation surface 82*a* passes through the left side surface 43L of the liquid storage portion 46 of the liquid container 40Y, enters the liquid storage portion 46 traveling in the +X direction, and illuminates the inside of the liquid storage portion 46, including the liquid. Of the two light guides 82, with respect to the other light guide 82 positioned in the −X direction, the light from the light emitting unit 81 guided to the irradiation surface 82*a* passes through the right side surface 43R of the liquid storage portion 46 of the liquid container 40M, enters the liquid storage portion 46 traveling in the −X direction, and illuminates the inside of the liquid storage portion 46, including the liquid. In other words, the light emitting unit 81 is provided between two liquid storage portions 46 of the plurality of liquid storage portions 46 arranged in the X-axis direction, and illuminates the inside of the liquid storage portion 46, including the liquid, via the light guide 82. The light emitting unit 81 illuminates the inside of the liquid storage portion 46, from the front surface 43F side to the rear surface 43B side, from outside the side surface of either the left side surface 43L or the right side surface 43R. In the recording apparatus 101 of the present embodiment, the inside of the six liquid storage portions 46 is illuminated by five light emitting units 81 through ten light guides 82.

As described above, according to the recording apparatus 101 according to the fifth embodiment, the following effects can be obtained.

The carriage 21 is mounted with a plurality of liquid storage portions 46, and the light emitting unit 81 is provided between liquid storage portions 46. According to this, the light emitting unit 81 provided in the carriage 21 can be disposed outside the liquid storage portion 46. When the light emitting unit 81 is provided in the carriage 21, the dimension of the carriage 21 in the Y-axis direction is less likely to increase.

The light guide 82 has the irradiation surface 82*a* for irradiating light from the light emitting unit 81 toward the inside of the liquid storage portion 46, and at least a portion of the irradiation surface 82*a* is located closer to the front surface 43F compared to the light emitting unit 81. According to this, it is easy to guide light from the light emitting unit 81 to the front surface 43F side of the liquid storage portion 46.

Although the recording apparatus 101 and the liquid container 40 according to the above embodiment of the present disclosure basically have the above-described configuration, it is of course possible to change or omit the partial configuration within the scope not departing from the gist of the present disclosure. In addition, the above-described embodiments and other embodiments described below can be implemented in combination with each other within a range that does not technically conflict. Other embodiments will be described below.

In the above-described embodiments, the liquid container 40 may not include the injection portion 41 which enables liquid to be injected into the liquid storage portion 46. In this case, the carriage 21 may not include the upper wall portion 61, the opening and closing cover 31, and the cap lever 50. The light emitting unit 85 provided in the scanner housing 11 may extend to a position in the Y-axis direction corresponding to the rear surface 43B of the liquid storage portion 46. The liquid storage portion 46 may be configured from a translucent or transparent material. When the carriage 21 is located at the visual check position, the controller 111 may turn on the light emitting unit 85 to illuminate the inside of the liquid storage portion 46.

In the above-described embodiments, the front wall 21F of the carriage 21 may be omitted.

In the above-described embodiments, the liquid container 40 may be detachably mounted on the carriage 21.

In the above-described embodiments, the apparatus main body 102 may not include the visual check portion 34. In this case, the scanner unit 10 may extend in the +Z direction so that the front wall 12F of the document cover 12 covers the +Y direction side of the carriage 21 that is at the visual check position. In this case, a through-hole that exposes the front surface 43F of the liquid storage portion 46 may be provided in the front wall 12F. According to this, even when the scanner unit 10 is in the closed state, the user can grasp the storage amount of the liquid stored in the liquid storage portion 46 from the through-hole of the front wall 12F.

In the first embodiment, the illumination unit 80 may not include one of either the light emitting unit 81 or the light emitting unit 85.

In the fifth embodiment, the liquid storage portion 46 of the liquid container 40 and the light guide 82 may be integrally formed, or at least a portion of the light guide 82 may be integrally formed with the liquid storage portion 46. In this case, for example, of the two light guides 82 provided at positions in the X-axis direction in between the liquid storage portion 46 of the liquid container 40Y and the liquid storage portion 46 of the liquid container 40M shown in FIG. 14, the light guide 82 located on the +X direction side is provided integrally with the left side surface 43L of the liquid storage portion 46 of the liquid container 40Y. Of the two light guides 82, the other light guide 82, positioned on the −X direction side, is provided integrally with the right side surface 43R of the liquid storage portion 46 of the liquid container 40M. In other words, at least a portion of the light guide 82 is provided integrally with the left side surface 43L or the right side surface 43R of the liquid storage portion 46. According to this, the inside of the liquid storage portion 46 can be efficiently illuminated from the side surface of the liquid storage portion 46 by the light from the light emitting unit 81.

In the above-described embodiments, the color of the light emitted by the light emitting unit 81 may be changeable, and the color when the controller 111 turns on or blinks the light emitting unit 81 may be changed. For example, in the first embodiment, the controller 111 may cause the light emitting unit 81 to emit green light when the liquid amount in the liquid storage portion 46 is larger than the lower limit amount, and may cause the light emitting unit 81 to blink with a yellow light when the liquid amount in the liquid storage portion 46 reaches the lower limit amount. In addition, for example, when the liquid amount of liquid in the liquid storage portion 46 becomes smaller than the lower limit amount, the controller 111 may cause the light emitting unit 81 to emit red light.

In the above-described embodiments, the color of the visible light emitted by each light emitting unit 81 provided in the carriage 21 may be different depending on the corresponding liquid container 40.

In the above-described embodiments, the color of either the light guide 82 or the light guide 86 provided in the carriage may be different depending on the corresponding liquid container 40.

In the above-described embodiments, the recording apparatus 101 may not include the scanner unit 10. In this case, the recording apparatus 101 may include a cover member that is movable between a closed state, in which the cover member covers the opening of the apparatus main body 102, and an opened state, in which the cover member exposes the opening of the apparatus main body 102. The cover member is an example of a cover portion that covers the opening of the apparatus main body 102. In this case, the light emitting unit 85 may be provided in the cover member.

6. Sixth Embodiment

Next, a recording apparatus 110 of a sixth embodiment as one embodiment of the present disclosure will be described. In the present embodiment, configurations different from those of the recording apparatus 101 according to the first embodiment will be mainly described, and description of common portions will be omitted. In addition, the description of actions and effects similar to those of the first embodiment will also be omitted.

In the recording apparatus 101 according to the first embodiment, the liquid storage portion is mounted on the carriage. Because of this, there is an issue that it may be difficult to visually check the liquid in the liquid storage portion, but this is not a limitation. Regardless of the arrangement of the liquid storage portion, the light emitting unit is provided outside the liquid storage portion, and thus there is a concern that it may be difficult to illuminate the inside of the liquid storage portion. The recording apparatus 110 of the present embodiment resolves such an issue.

A schematic configuration of the recording apparatus 110 according to the sixth embodiment will be described with reference to FIG. 15. The recording apparatus 110 according to the present embodiment includes an apparatus main body 102 having a rectangular parallelepiped shape, a scanner unit 10 attached to an upper portion of the apparatus main body 102, and a liquid accommodation unit 103, and is placed on a horizontal surface.

Figure 15:
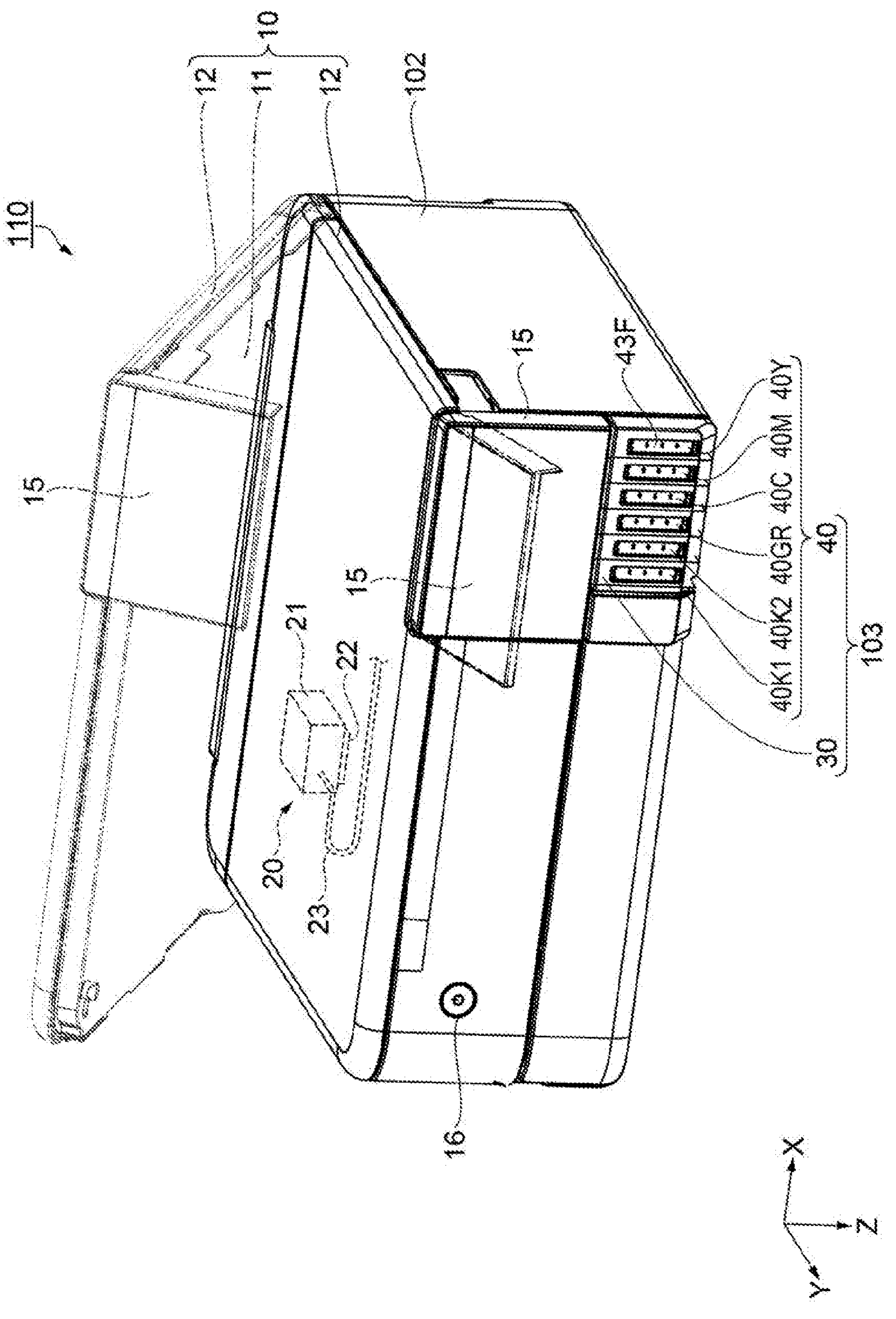
FIG. 15 is a perspective view of a recording apparatus according to a sixth embodiment.

As shown by solid line and two-dot chain line in FIG. 15, the display unit 15 can pivot together with the document cover 12 with respect to the scanner housing 11, and can tilt with respect to the document cover 12. That is, the display unit 15 is attached to an end of the scanner unit 10, is pivotable together with the scanner unit 10, and is tiltable.

As shown in FIG. 15, the recording unit 20 includes a carriage 21, a recording head 22 mounted on the carriage 21 and for ejecting liquid onto a medium, and a tube 23 for supplying liquid to the recording head 22. The liquid supplied to the recording head 22 is stored in the liquid container 40 of the liquid accommodation unit 103. The recording head 22 and the liquid container 40 are coupled by the tube 23. The tube 23 is an example of a liquid supply portion.

Figure 16:
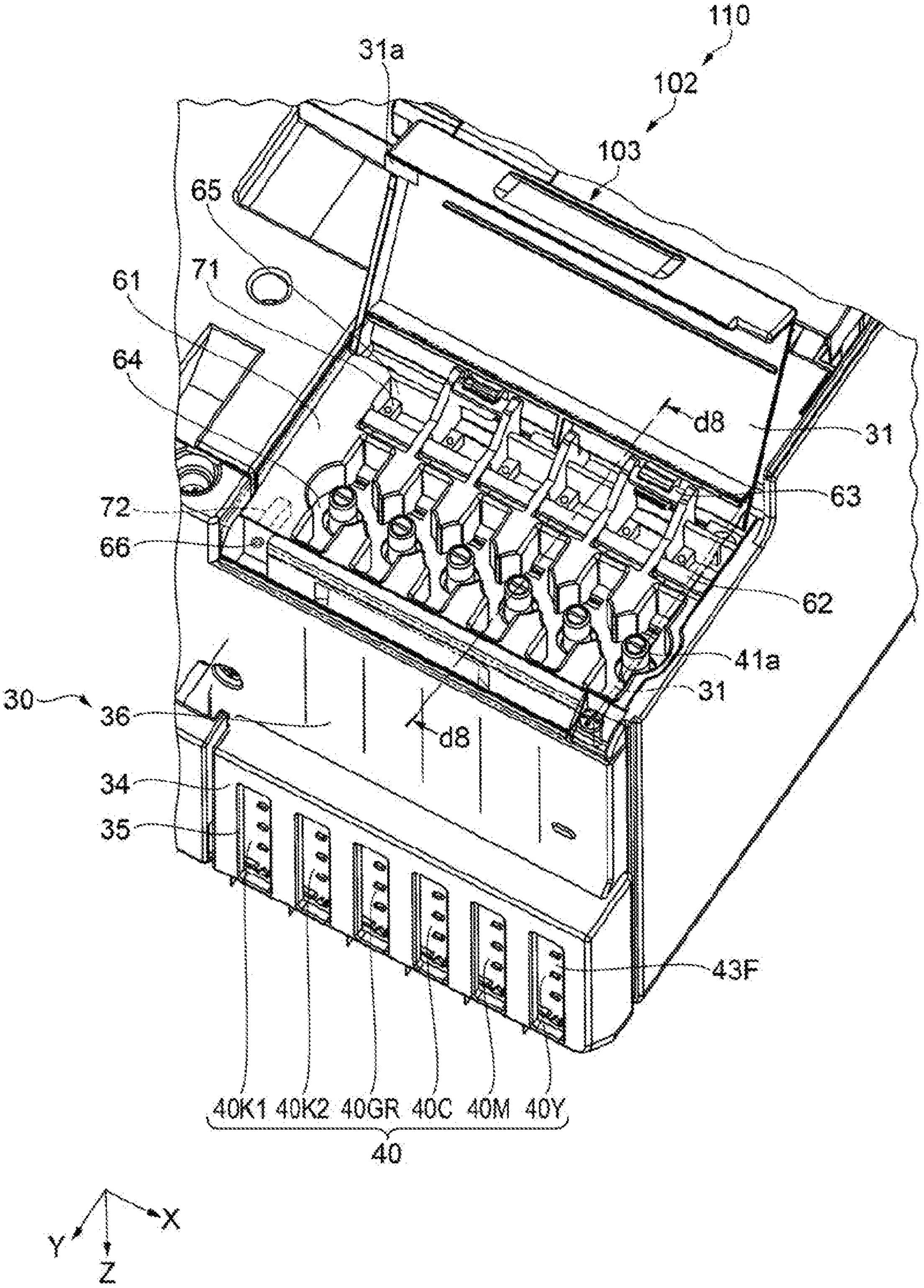
FIG. 16 is a perspective view of a liquid accommodation unit.
Figure 17:
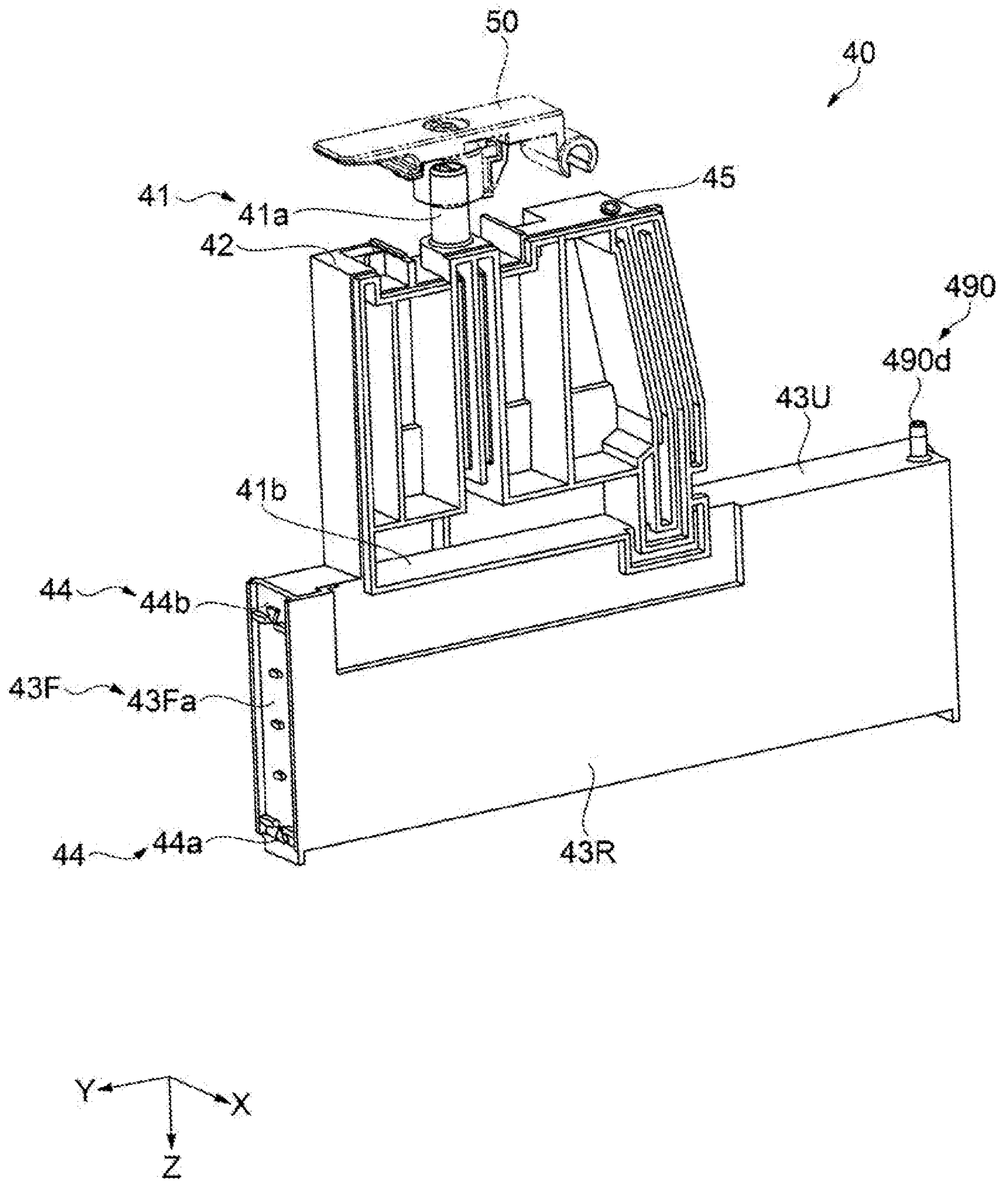
FIG. 17 is a perspective view of a liquid container.

Next, the liquid accommodation unit 103 will be described. As shown in FIGS. 16, 17, 20, and 21, the liquid accommodation unit 103 includes the liquid container 40 capable of storing liquid, a housing 30 in which the liquid container 40 is stored, an upper wall portion 61, an opening and closing cover 31, a cap lever 50, an opening and closing detection unit 71, a lock mechanism 72, and an illumination unit 80. In FIG. 16, the cap lever 50, which is a component of the liquid accommodation unit 103, is not shown. In FIG. 17, the cap lever 50 is indicated by a two-dot chain line.

As shown in FIG. 17, a top surface 42 of the liquid container 40 is provided with an injection port 41*a* through which the liquid can be injected from the refill container 90, and an atmosphere introduction port 45. The atmosphere introduction port 45 communicates with the first flow path 41*b* and can introduce atmospheric air into the first flow path 41*b*. Further, as shown in FIG. 21, the liquid container 40 includes a liquid storage portion 46 that is located in the +Z direction with respect to the top surface 42 and that is capable of storing liquid.

Figure 21:
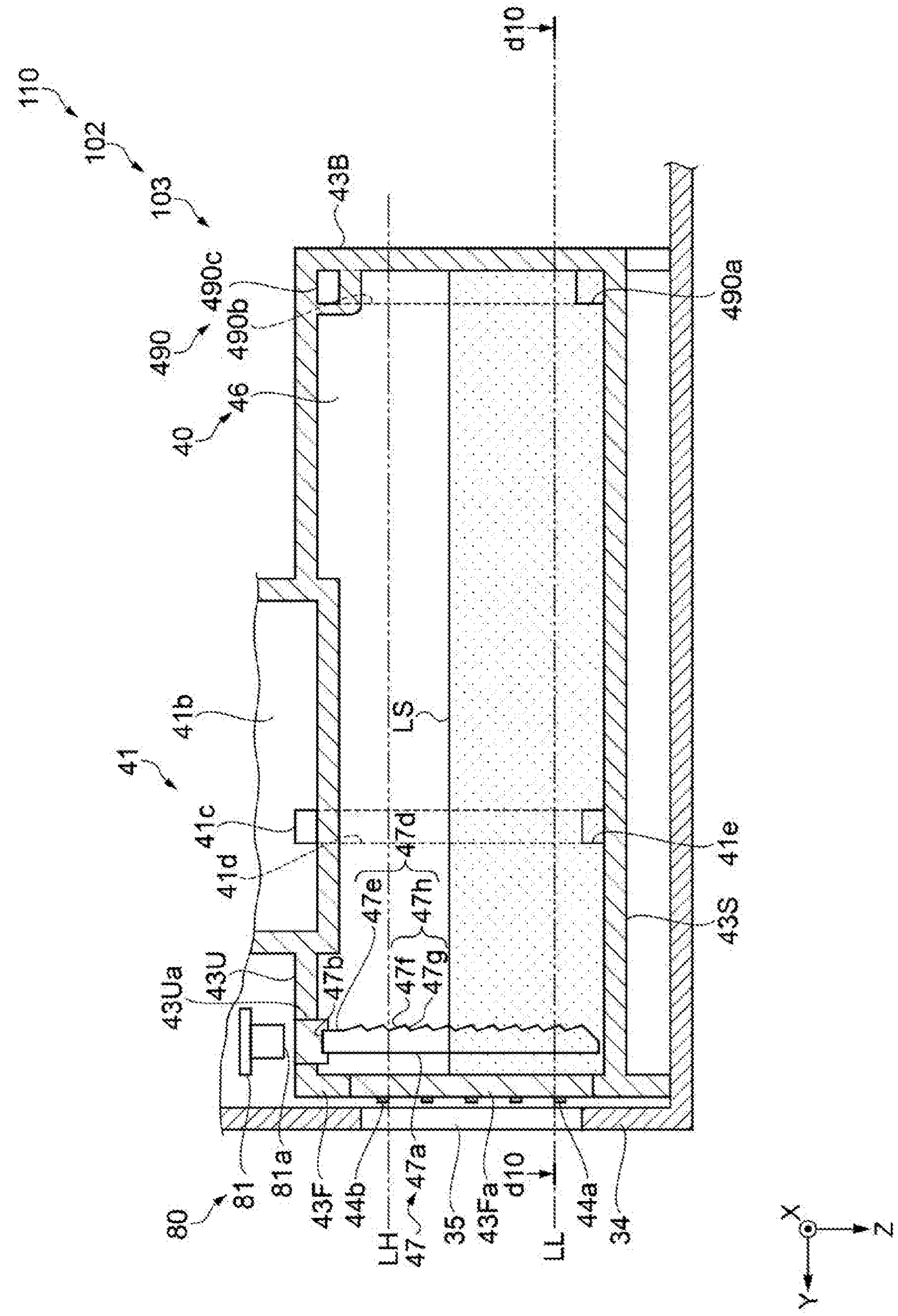
FIG. 21 is a main-part cross-sectional view showing a d9-d9 cross section of the liquid storage portion shown in FIG. 20.
Figure 22:
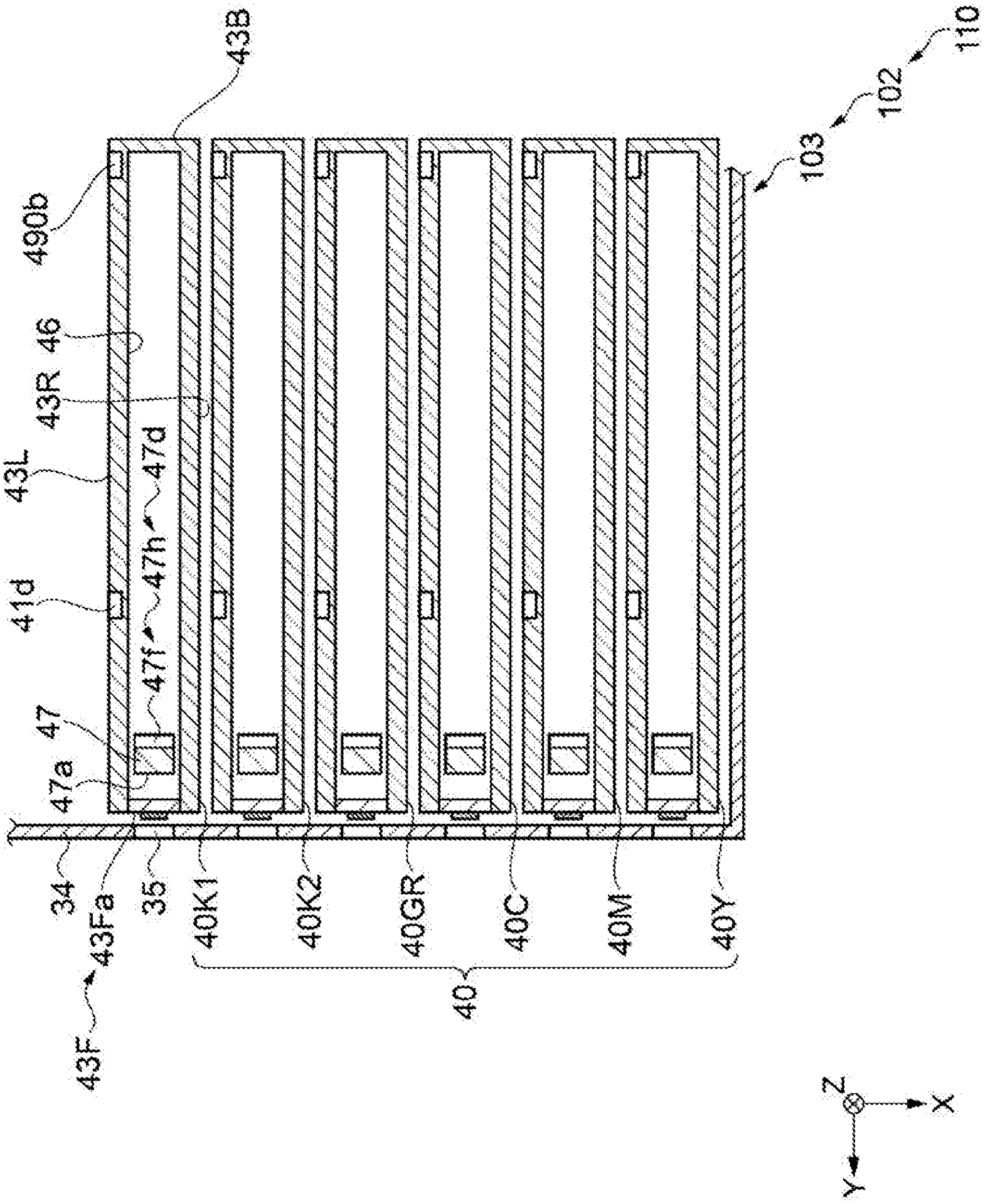
FIG. 22 is a main-part cross-sectional view showing a d10-*d*10 cross section of the liquid storage portion shown in FIG. 21.

As shown in FIGS. 21 and 22, the liquid storage portion 46 has a front surface 43F, a rear surface 43B, a bottom surface 43S, an upper surface 43U, a right side surface 43R, and a left side surface 43L. The front surface 43F is a wall surface defining an outer shape of the liquid storage portion 46 on the +Y direction side. The rear surface 43B is a wall surface defining an outer shape of the liquid storage portion 46 on the −Y direction side. The bottom surface 43S is a wall surface defining an outer shape of the liquid storage portion 46 on the +Z direction side. The upper surface 43U is a wall surface defining an outer shape of the liquid storage portion 46 on the −Z direction side. The right side surface 43R is a wall surface defining an outer shape of the liquid storage portion 46 on the +X direction side. The left side surface 43L is a wall surface defining an outer shape of the liquid storage portion 46 on the −X direction side.

As shown in FIG. 17, an outlet 490*d* coupled to the tube 23 is provided on the upper surface 43U of the liquid storage portion 46. The liquid in the liquid storage portion 46 is supplied to the recording head 22 via a lead-out flow path 490 including the outlet 490*d*, and the tube 23. Accordingly, the recording head 22 ejects the liquid supplied from the liquid storage portion 46 to the medium. As shown in FIGS. 17 and 21, the lead-out flow path 490 is constituted by a discharge port 490*a*, a first connection flow path 490*b*, a second connection flow path 490*c*, and the outlet 490*d*. As shown in FIGS. 21 and 22, the first connection flow path 490*b* is provided on the left side surface 43L of the liquid storage portion 46 and has the discharge port 490*a* which is opened on the left side surface 43L. The discharge port 490*a* discharges the liquid from the liquid storage portion 46 to the lead-out flow path 490. The second connection flow path 490*c* is provided to the +Z direction side of the upper surface 43U of the liquid storage portion 46, and connects the first connection flow path 490*b* and the outlet 490*d*.

The liquid storage portion 46 communicates with the atmosphere introduction port 45 via the first flow path 41*b*. As shown in FIG. 21, the discharge portion 490*a* opens at a position in the +Z direction from a lower limit liquid level LL which is when the amount of liquid in the liquid storage portion 46 is a lower limit amount, to be described later. Accordingly, it is possible to reduce the frequency at which the liquid adheres to the inner surface of the front surface 43F or a region to the −Z direction side of the liquid surface LS of the light guide 47, to be described later.

Figure 20:
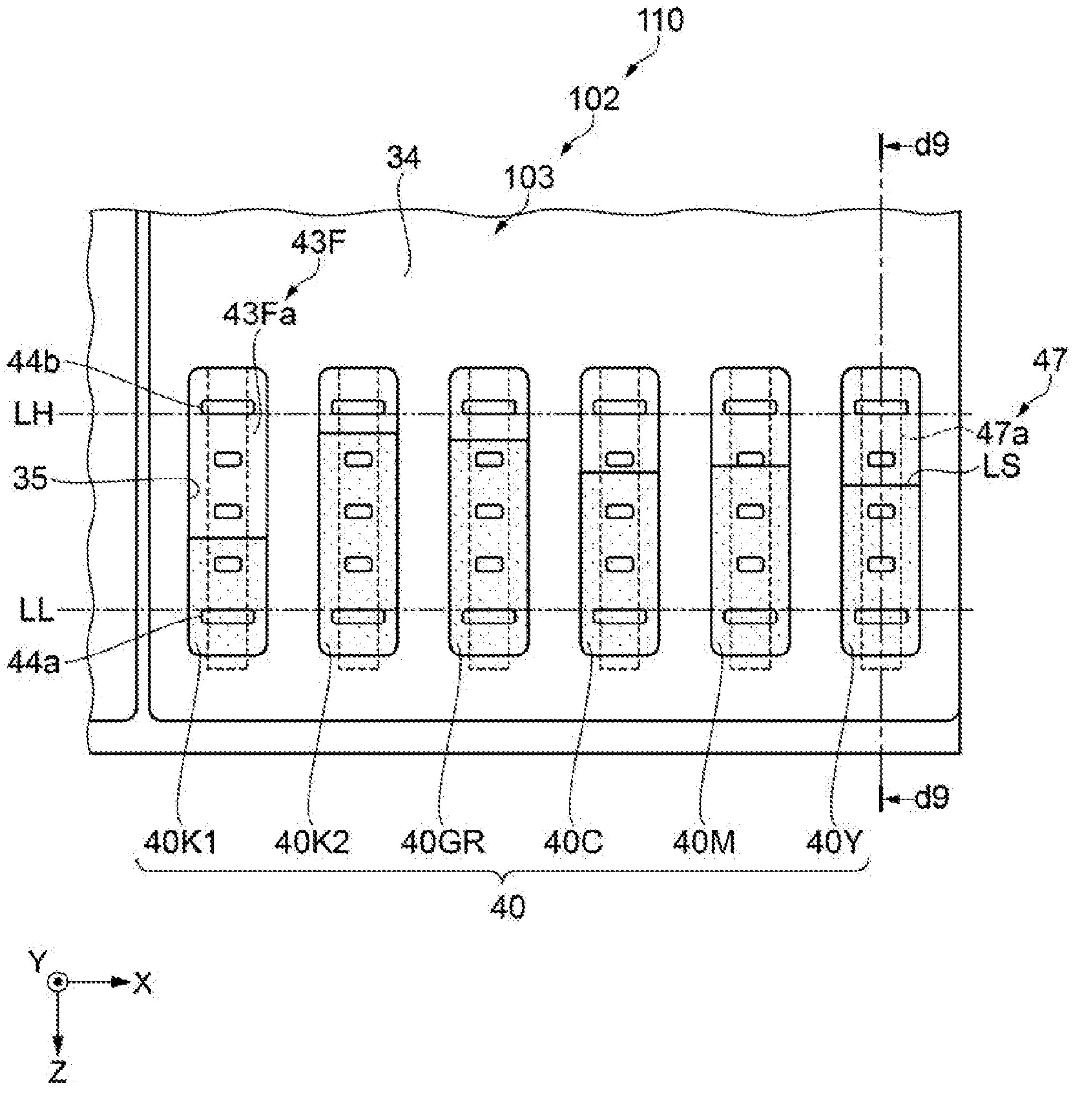
FIG. 20 is a side view showing the inside of a liquid storage portion from a direction facing a visual check surface.

As shown in FIGS. 20 to 22, the liquid storage portion 46 includes a light guide 47. The light guide 47 has a function of a so-called light guide member that guides light emitted by a light emitting unit 81, to described later, into the liquid storage portion 46. As viewed from the Y-axis direction, the light guide 47 of the present embodiment has a rectangular columnar shape in which the Z-axis direction is a longitudinal direction and the X-axis direction is a lateral direction. The light guide of the present embodiment is made of a translucent or transparent material. The refractive index of the material constituting the light guide 47 is larger than the refractive index of the atmosphere and larger than the refractive index of the liquid stored in the liquid storage portion 46. If the material constituting the light guide 47 is a resin material, polypropylene (PP), polyethylene (PE), polyamide (PA), polyethylene terephthalate (PET), or the like can be adopted.

The light guide 47 of the present embodiment can guide, for example, light entering from a light entry surface 47*b*, which is the side surface of the light guide 47 on the −Z direction side, to a front surface 47*a*, which is the side surface of the light guide 47 on the +Y direction side. The front surface 47*a* is a surface extending along the X-Z plane. In other words, the front surface 47*a* is a surface extending along the front surface 43F of the liquid storage portion 46. The front surface 47*a* is an example of a light emitting surface. In this case, it can be said that the side surface on the +X direction side, the side surface on the −X direction side, the side surface on the +Z direction side, and the rear surface 47*d*, which is the side surface on the −Y direction side, which define the outer shape of the light guide 47 are light guide surfaces which guide the light entering from the light entry surface 47*b* toward the front surface 47*a*. The refractive index of the material constituting the light guide 47 is preferably 1.4 or more, and more preferably 1.5 or more, for example.

The rear surface 47*d* includes a flat surface 47*e* that is located at the −Z direction side end of the rear surface 47*e* and a plurality of reflection sections 47*h* that are located to the +Z direction side of the flat surface 47*e* and that are arranged in the Z axis direction. As a result, the rear surface 47*d* is formed by the plurality of reflection sections 47*h* and has a serrated shape extending in the Z-axis direction. The flat surface 47*e* is a flat surface extending along the front surface 47*a*, and is an example of another surface in the rear surface 47*d*. The reflection section 47*h* has a convex shape protruding further in the −Y direction side than the flat surface 47*e*. Therefore, it can be said that the reflection section 47*h* is a convex portion of the rear surface 47*d*.

As shown in FIGS. 21 and 22, the reflection section 47*h* includes an upper reflection surface 47*f* and a lower reflection surface 47*g* that reflect light entering from the light entry surface 47*b* toward the front surface 47*a*. The upper reflection surface 47*f* is an example of an upper surface forming the convex portion, and the lower reflection surface 47*g* is an example of a lower surface forming the convex portion. The upper reflection surface 47*f* inclines downward further in the +Z direction, the more toward a tip end side, which is the −Y direction side end of the reflection section 47*h*. According to this, when liquid adheres to the rear surface 47*d*, the liquid is less likely to remain on the upper reflection surface 47*f* of the reflection section 47*h*. The lower reflection surface 47*g* inclines upward further in the −Z direction, the more toward a tip end side, which is the −Y direction side end of the reflection section 47*h*. According to this, when liquid adheres to the rear surface 47*d*, the liquid is less likely to remain on the lower reflection surface 47*g* of the reflection section 47*h*. Accordingly, when liquid adheres to the rear surface 47*d*, the liquid is less likely to remain on the reflection section 47*h*.

The light guide 47 is provided at a position in the Y-axis direction closer to the front surface 43F compared to the center of the liquid storage portion 46. In addition, the light guide 47 is provided at a position in the Y-axis direction closer to the front surface 43F compared to the outlet 41*e* of the injection portion 41. When viewed in the Z-axis direction, a gap is secured between the side surfaces of the light guide 47 and the inner surface of the liquid storage portion 46. Therefore, in the liquid storage portion 46, a region on the +Y direction side of the light guide 47 and a region on the −Y axis direction side of the light guide 47 are continuous without being blocked by the light guide 47. Therefore, as shown in FIG. 21, the Z-axis direction position of the liquid surface LS of the liquid in the liquid storage portion 46 is the same from the region on the +Y-axis direction side of the light guide 47 to the region on the −Y-axis direction side of the light guide 47.

Further, as shown in FIG. 21, the light guide 47 extends substantially in the height direction, which is the Z-axis direction, of the liquid storage portion 46. As a result, the light entry surface 47*b* of the light guide 47 is located in the −Z direction with respect to the window member 43Fa, and the side surface of the light guide 47 to the +Z direction side is located in the +Z direction with respect to the window member 43Fa. The ends in the −Z direction of the front surface 47*a*, the rear surface 47*d*, the side surface on the +X direction side, and the side surface on the −X direction side of the light guide 47 are located in the −Z direction with respect to the window member 43Fa, and the ends in the +Z direction are located in the +Z direction with respect to the window member 43Fa. That is, the end of the light guide 47 in the −Z direction is positioned in the −Z direction with respect to the window member 43Fa, and the end of the light guide 47 in the +Z direction is positioned in the +Z direction with respect to the window member 43Fa.

In other words, when a range in the liquid storage portion 46 can be seen through the window member 43Fa from the +Y direction side, which is from a direction facing the front surface 43Fa of the liquid storage portion 46, is considered as a visual check range, the light guide 47 is provided spanning the visual check range in the Z axis direction. Further, the front surface 47*a* of the light guide 47 is also provided spanning the visual check range. In this case, it can be said that in the light guide 47, the lower limit liquid level LL, which is the liquid surface LS when the liquid amount of the liquid in the liquid storage portion 46 is the lower limit amount, and the upper limit liquid level LH, which is the liquid surface LS when the liquid amount of the liquid is the upper limit amount, are provided at positions that laterally cross the light guide 47. It can also be said that the front surface 47*a* of the light guide 47 is also provided at a position where the lower limit liquid level LL and the upper limit liquid level LH laterally cross the front surface 47*a*. In other words, the light guide 47 is provided at a position in the Z-axis direction corresponding to the lower limit liquid level LL, which is the liquid surface LS when the liquid amount of the liquid in the liquid storage portion 46 is the lower limit amount, and an upper limit liquid level LH, which is the liquid surface LS when the liquid amount of the liquid is the upper limit amount. The front surface 47*a* of the light guide 47 is also provided at a position in the Z-axis direction corresponding to the lower limit liquid level LL and the upper limit liquid level LH.

In this case, when as shown in FIG. 20 the inside of the liquid storage portion 46 is viewed from the +Y direction side, which is from a direction facing the front surface 43F of the liquid storage portion 46, a region in the −Z direction from the liquid surface LS can be seen in the front surface 47*a* of the light guide 47. According to this, in the recording apparatus 110 of the present embodiment, for example, even when the liquid surface LS in the liquid storage portion 46 is difficult to see, the position of the liquid surface LS can be confirmed by seeing the front surface 47*a* of the light guide 47, and thus the liquid amount in the liquid storage portion 46 is easier to confirm compared with a case where the light guide 47 is not provided in the liquid storage portion 46. Note that the light guide 47 may extend to a position where the side surface of the light guide 47 on the +Z direction side comes into contact with the bottom surface 43S of the liquid storage portion 46. At this time, even in a case where the liquid storage portion 46 is formed of a translucent or transparent material, when a range in the liquid storage portion 46 that can be seen through the front surface 43F from the +Y direction side, which is from a direction facing the front surface 43F of the liquid storage portion 46, is considered as the visual check range, it can be said that the light guide 47 is provided spanning the visual check range in the Z-axis direction.

As shown in FIG. 21, the illumination unit 80 of the present embodiment is provided outside the liquid storage portion 46. The illumination unit 80 has a light emitting unit 81 for emitting light. The light emitting unit 81 emits visible light. The light emitting unit 81 is provided at a position on the −Z direction side with respect to the upper surface 43U of the liquid storage portion 46. Further, the light emitting unit 81 is provided at a position where the front surface 81*a* of the light emitting unit 81 faces the light entry surface 47*b* of the light guide 47. The light emitting unit 81 of the present embodiment is attached to the housing 30, but may be attached to the upper surface 43U of the liquid storage portion 46.

In the upper surface 43U of the liquid storage portion 46 of the present embodiment, a window member 43Ua is provided in a region facing the front surface 81*a* of the light emitting unit 81. The window member 43Ua of the present embodiment also functions as an attachment portion to which the light guide 47 is attached. The window member 43Ua is formed of a translucent or transparent material, and visible light emitted by the light emitting unit 81 enters the liquid storage portion 46 through the window member 43Ua. The illumination unit 80 of the present embodiment has six light emitting units 81 provided side by side in the X-axis direction corresponding to the respective liquid storage portions 46 of the six liquid containers 40. When the liquid storage portion 46 is formed of a translucent or transparent material, or when the window member 43Ua and the light guide 47 are integrally formed, the window member 43Ua may be omitted.

The light emitting unit 81 emits visible light to illuminate the inside of the liquid storage portion 46, including the liquid and the light guide 47, from outside the liquid storage portion 46 through the window member 43Ua. By this, the recording apparatus 110 of the present embodiment is easier to check the liquid stored in the liquid storage portion 46 and the liquid surface LS of the liquid from the outside of the liquid storage portion 46 compared to a case where the illumination unit 80 is not provided.

Further, light emitted from the front surface 81*a* of the light emitting unit 81 enters the light guide 47 from the light entry surface 47*b* of the light guide 47. For example, of the light from the light emitting unit 81 that entered the light guide 47 from the light entry surface 47*b* of the light guide 47, the light incident on the reflection section 47*h* at the rear surface 47*d* is reflected by the reflection section 47*h* and guided toward the front surface 47*a*.

For example, in a case where no liquid is held in the liquid storage portion 46, the light guided to the front surface 47*a* of the light guide 47 passes through the front surface 47*a*, passes through the window member 43Fa of the liquid storage portion 46, and reaches the +Y direction side of the liquid storage portion 46, which is outside of the liquid storage portion 46. As a result, when the inside of the liquid storage portion 46 is viewed from the +Y direction side, which is from a direction facing the front surface 43F of the liquid storage portion 46, the front surface 47*a* of the light guide 47 appears bright. In other words, the light guide 47 has a front surface 43F that, by the light guide 47 transmitting the light from the light emitting unit 81 which entered from the light entry surface 47*b*, appears bright when the inside of the liquid storage portion 46 is viewed from the +Y direction side, which is from a direction facing the front surface 47*a* of the liquid storage portion 46. The front surface 47*a* of the light guide 47 is an example of a light emitting surface.

Figure 23:
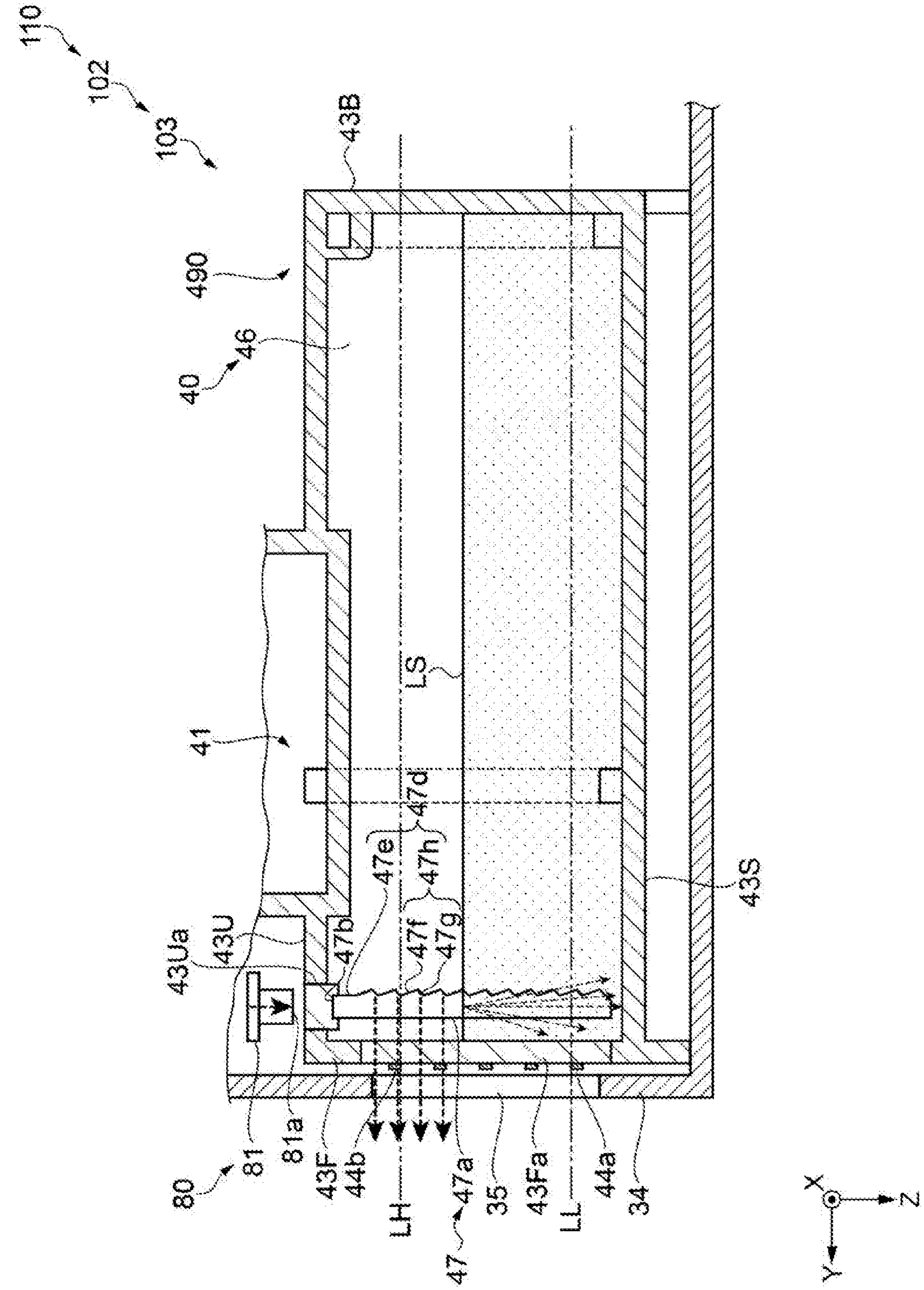
FIG. 23 is a main-part cross-sectional view of a liquid storage portion when a light emitting unit emits light.

Also, when as shown in FIG. 23 liquid is held in the liquid storage portion 46, of the light from the light emitting unit 81 that entered the light guide 47, the light incident on the reflection section 47*h* of the rear surface 47*d* in a region in the Z-axis direction at the same position as the liquid surface LS of liquid in the liquid storage portion 46 or on the −Z direction side of the liquid surface LS is reflected by the reflection section 47*h* and guided toward the front surface 47*a*. In FIG. 23, paths of light from the light emitting unit 81 that entered the light guide 47 from the light entry surface 47*b* are indicated by dashed arrows.

The light guided to the front surface 47*a* of the light guide 47 passes through the front surface 47*a*, passes through the window member 43Fa of the liquid storage portion 46, and reaches the +Y direction side of the liquid storage portion 46, which is outside the liquid storage portion 46. As a result, when the inside of the liquid storage portion 46 is viewed from the +Y direction side, which is from a direction facing the front surface 43F of the liquid storage portion 46, a region at the front surface 47*a* of the light guide 47 that is at the same position in the Z-axis direction as the liquid surface LS of the liquid in the liquid storage portion 46 or on the −Z direction side of the liquid surface LS appears bright as indicated by solid painting in FIG. 24.

On the other hand, as shown in FIG. 23, of the light from the light emitting unit 81 that entered the light guide 47, much of the light incident on the reflecting portion 47*h* of the rear surface 47*d* in a region in the Z-axis direction to the +Z direction side of the liquid surface LS of the liquid in the liquid storage portion 46 is not reflected by the reflection section 47*h*, but travels through the reflection section 47*h* and into the liquid to the −Y direction side of the Y-axis direction. In a region in the Z-axis direction on the +Z direction side of the liquid surface LS of the liquid in the liquid storage portion 46, of the light from the light emitting unit 81 that entered the light guide 47, much of the light incident on a side surface of the light guide 47 other than the rear surface 47*d* passes through the side surface without being reflected by the side surface, and travels in a direction different from the direction toward the front surface 43F, and into the liquid.

Figure 24:
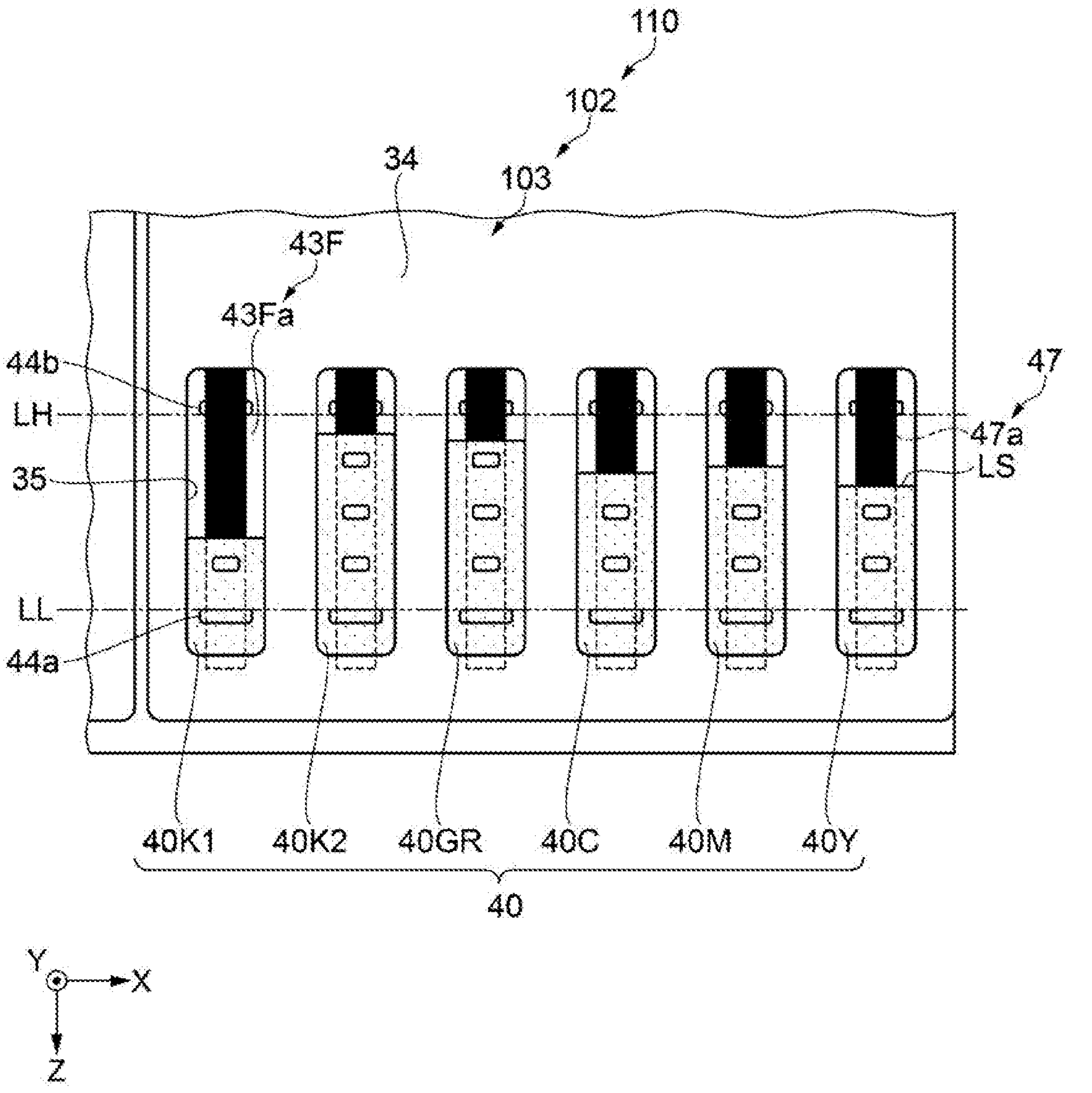
FIG. 24 is a side view of the inside of the liquid storage portion when the light emitting unit emits light, as viewed from a direction facing a visual check surface.

This is because the refractive index of the liquid is, as compared with the refractive index of the atmosphere, close to the refractive index of the light guide 47 and the critical angle is very small, or the refractive index of the liquid is larger than the refractive index of the light guide 47. As a result, when as shown in FIG. 24 the inside of the liquid storage portion 46 is viewed from the +Y direction side, which is from a direction facing the front surface 43F of the liquid storage portion 46, a region in the Z axis direction of the front surface 47*a* of the light guide 47 on the +Z direction side of the liquid surface LS of the liquid in the liquid storage portion 46 does not appear bright. In this case, for example, even if the liquid in the liquid storage portion 46 is a transparent liquid, the region in the Z axis direction on the +Z direction side of the liquid surface LS of the liquid in the liquid storage portion 46 does not appear bright.

According to this, in the recording apparatus 110 of the present embodiment, even when the liquid surface LS is difficult to see, the position of the liquid surface LS can be confirmed by seeing the region of the front surface 47*a* of the light guide 47 that appears bright, and thus the liquid amount in the liquid storage portion 46 is easier to confirm compared with a case where the light guide 47 is not provided in the liquid storage portion 46.

Figure 25:
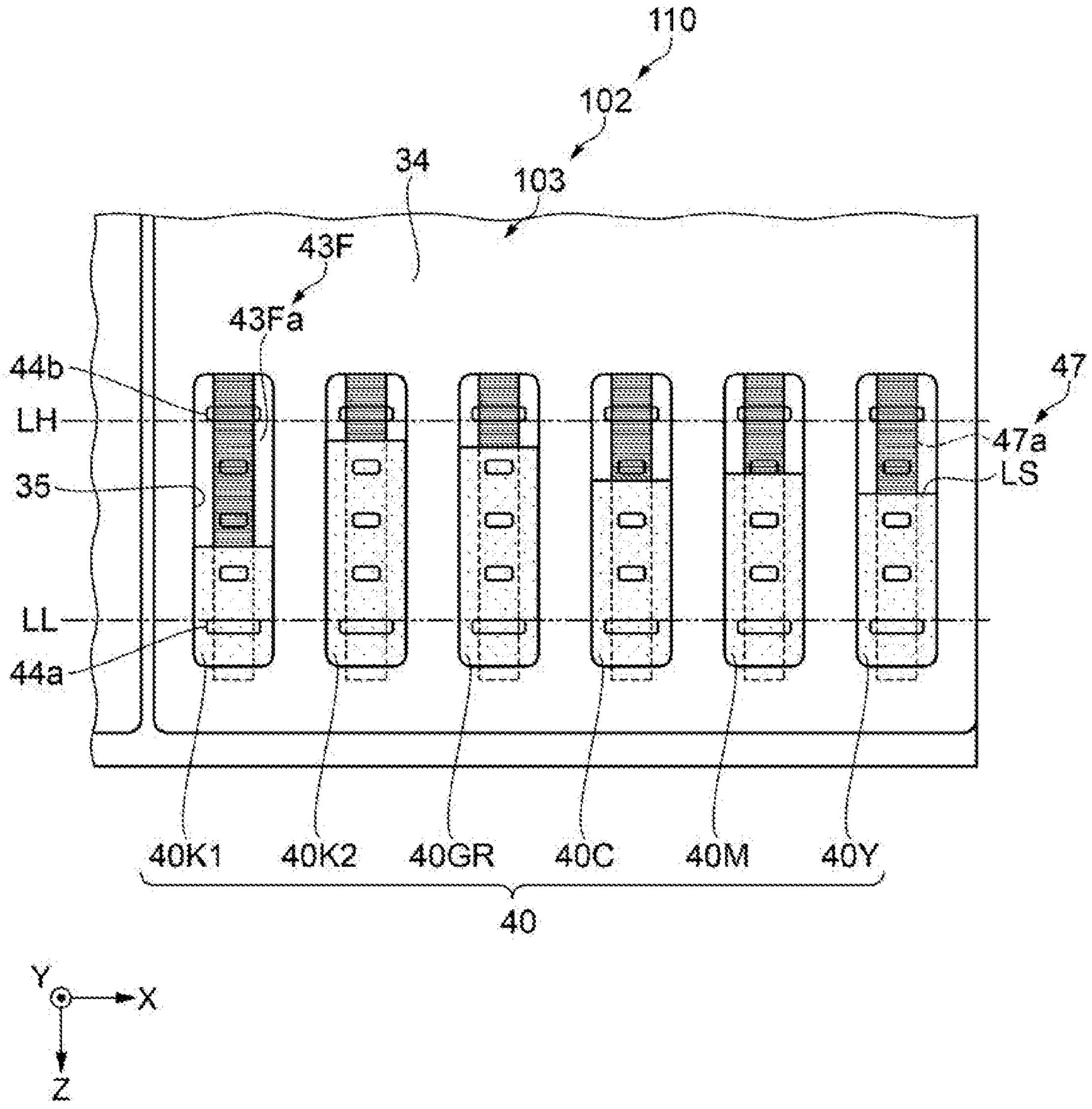
FIG. 25 is a side view of the inside of a liquid storage portion having a light guide according to another embodiment, as viewed from a direction facing the visual check surface.

Note that the inclination of each upper reflection surface 47*f*, the inclination of each lower reflection surface 47*g*, the projection amount of each reflection section 47*h*, and the interval in the Z-axis direction between the reflection sections 47 are adjusted so that the front surface 47*a* of the reflection section 47*h* in the light guide 47 described above appears to be uniformly bright. On the other hand, in the light guide 47, the appearance of the front surface 47*a* which luminates by receiving light from the light emitting unit 81 that entered from the light entry surface 47*b* can be changed by changing the reflection section 47*h* of the rear surface 47*d*. For example, by changing the inclination of the upper reflection surface 47*f*, the inclination of the lower reflection surface 47*g*, the intervals in the Z-axis direction of the plurality of reflection sections 47*h*, the uniform illumination of the front surface 47*a* shown in FIG. 24 may be changed to an illumination in which bright portions and dark portions extending linearly in the X-axis direction are alternately arranged in the Z-axis direction to appear as graduation marks as shown in FIG. 25. According to this, it is easy to grasp the amount of liquid in the liquid storage portion by visually checking the light guide 47 that appears as graduation marks.

Figure 26:
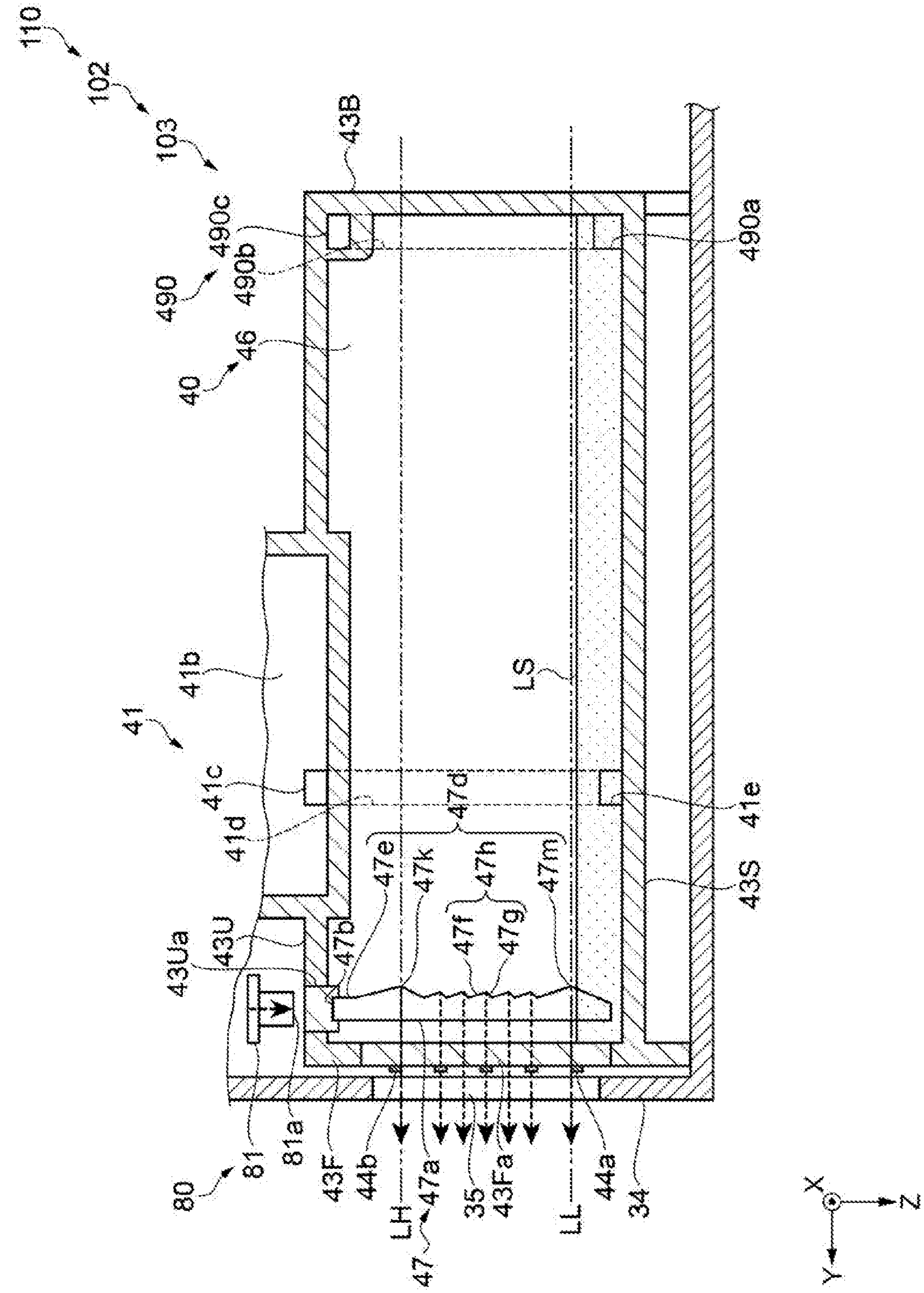
FIG. 26 is a main-part cross-sectional view of a liquid storage portion having a light guide according to another embodiment.

In addition, for example, as shown in FIG. 26, a plurality of reflection section 47*h*, 47*k*, 47*m* having different protrusion amounts may be provided in the rear surface 47*d*, assuming that the dimension at which the reflection section 47*d* protrudes as a convex portion from the flat surface 47*e* of the rear surface 47*d* in the −Y direction is the protrusion amount. The reflection section 47*k* has a larger protrusion amount than the reflection section 47*h*, and is provided such that the position in the Z-axis direction of the protruding end corresponds to the upper limit liquid level LH. The reflection section 47*m* has a larger protrusion amount than the reflection section 47*h*, and is provided such that the position in the Z-axis direction of the protruding end corresponds to the lower limit liquid level LL. According to this, by providing the reflection section 47*k* and the reflection section 47*m* having different protrusion amounts than the reflection section 47*h*, it is possible to provide in the front surface 47*a*, which appears luminous, regions that have different brightness than other regions and that correspond to the upper limit liquid level LH and the lower limit liquid level LL. By this, it is easy to grasp the amount of liquid in the liquid storage portion 46 by visually checking the region in the light guide 47 having brightness different from that of other regions.

Figure 27:
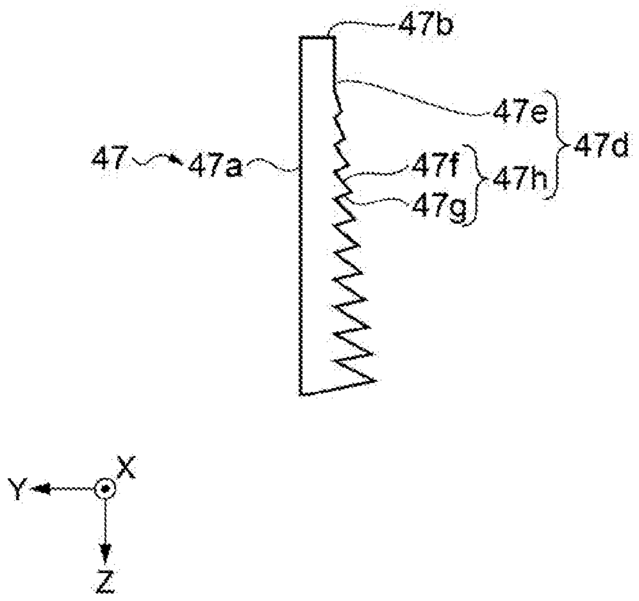
FIG. 27 is a side view of a light guide according to another embodiment.

The protrusion amount of the plurality of reflection sections 47*h* provided on the rear surface 47*d* of the light guide 47 may change in a continuous manner. For example, in the light guide 47 shown in FIG. 27, the plurality of reflection sections 47*h* are provided such that the projection amounts of the reflection sections 47*h* positioned toward the +Z direction side are larger than the projection amounts of the reflection sections 47*h* positioned toward the −Z direction side in the Z axis direction. Alternatively, the plurality of reflection sections 47*h* may be provided such that the projection amounts of the reflection sections 47*h* located toward the −Z direction side are larger than the projection amounts of the reflection sections 47*h* located toward the +Z direction side in the Z axis direction.

In other words, the plurality of reflection sections 47*h* are provided such that the projection amounts of the reflection sections 47*h* positioned toward one end side are larger than the projection amounts of the reflection sections 47*h* positioned toward the other end side in the Z-axis direction. According to this, it is possible to change in a continuous manner in the Z-axis direction the brightness of the front surface 47*a* that appears bright. Alternatively, the plurality of reflection sections 47*h* may be provided such that the closer in the Z-axis direction that a reflection section 47*h* is to an intermediate position between the reflection section 47*h* located on one end side and the reflection section 47*h* located on the other end side, the smaller protrusion amount. The intermediate position may be a position in the Z-axis direction at which the distance to the reflection section 47*h* positioned on the other end side is shorter than the distance to the reflection section 47*h* positioned on one end side, or may be a position at which the distance to the reflection section 47*h* positioned on the other end side is longer than the distance to the reflection section 47*h* positioned on the one end side. In addition, the intermediate position may be a position in the Z-axis direction at the center of the front surface 47*a*. For example, in a case where the intermediate position is a position in the Z-axis direction that is the center of the front surface 47*a*, the brightness of the front surface 47*a* that appears luminous can be continuously changed in the Z-axis direction from the center of the front surface 47*a*.

Figure 28:
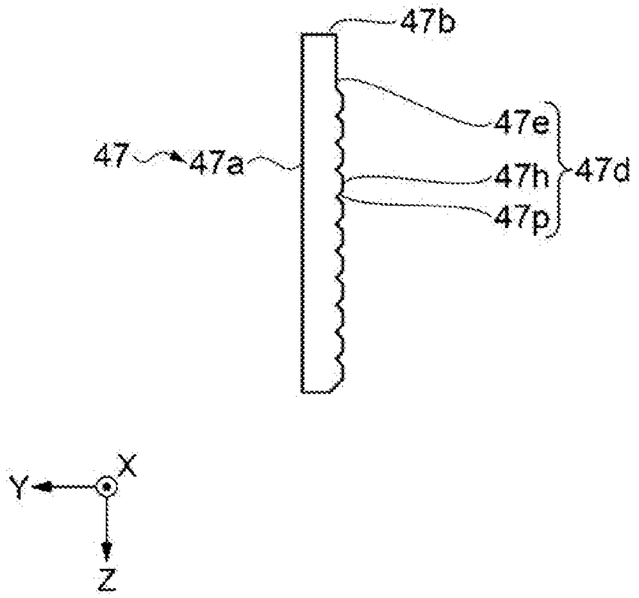
FIG. 28 is a side view of a light guide according to another embodiment.

In addition, for example, as shown in FIG. 28, the reflection section 47*h* may have a surface extending along the front surface 47*a* and an inclined surface 47*p* facing the +Y direction from the surface extending along the front surface 47*a*. As a result, as shown in FIG. 25, a bright portion and a dark portion linearly extending in the X-axis direction are alternately arranged in the Z-axis direction on the front surface 47*a*, which appears luminous, so that the manner of appearing luminous can be like a scale.

Figure 29:
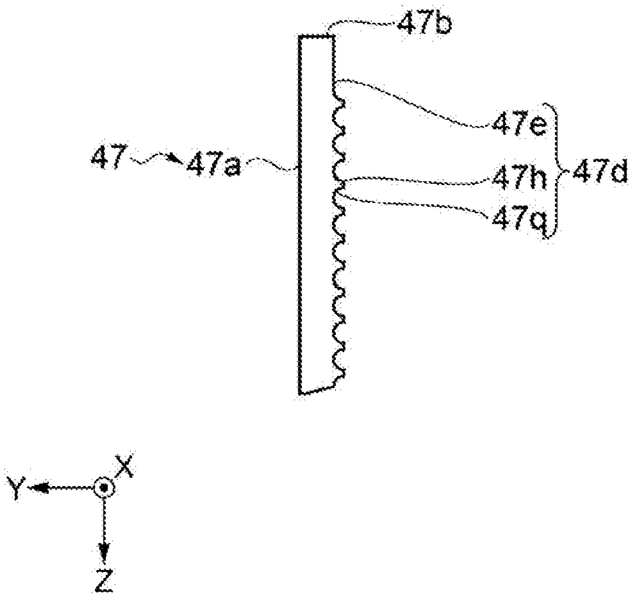
FIG. 29 is a side view of a light guide according to another embodiment.

In addition, for example, as shown in FIG. 29, the reflection section 47*h* may have a surface extending along the front surface 47*a* and a curved surface 47*q* directed in the +Y direction from the surface extending along the front surface 47*a*. As a result, as shown in FIG. 25, a bright portion and a dark portion linearly extending in the X-axis direction are alternately arranged in the Z-axis direction on the front surface 47*a*, which appears luminous, so that the manner of appearing luminous can be like a scale.

Figure 30:
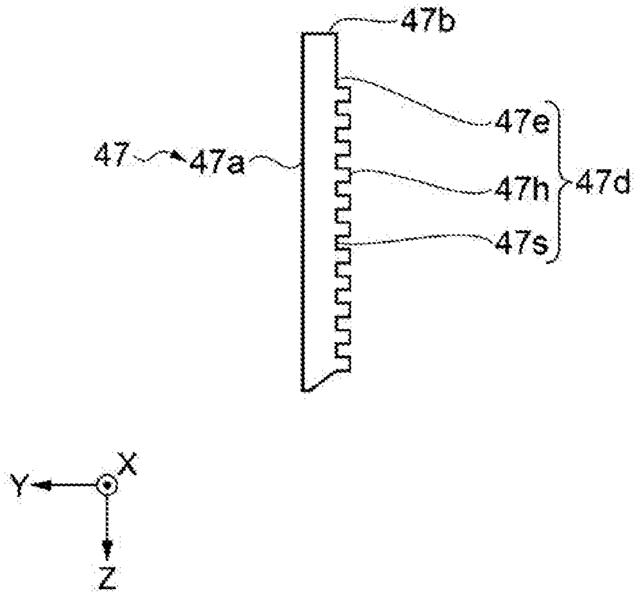
FIG. 30 is a side view of a light guide according to another embodiment.

In addition, for example, as shown in FIG. 30, the reflection section 47*h* may have a surface extending along the front surface 47*a* and a horizontal surface directed in the +Y direction from the surface extending along the front surface 47*a*. In this case, the rear surface 47*d* of the light guide 47 includes a flat surface 47*e*, a plurality of reflection sections 47*h* as convex portions, and a plurality of connection surfaces 47*s* arranged in the Z-axis direction for connecting the plurality of reflection sections 47*h*. The connection surface 47*s* extends along the front surface 47*a* and is located on the +Y direction side of a surface of the reflection section 47*h* extending along the front surface 47*a*. As a result, as shown in FIG. 25, a bright portion and a dark portion linearly extending in the X-axis direction are alternately arranged in the Z-axis direction on the front surface 47*a*, which appears luminous, so that the manner of appearing luminous can be like a scale.

Figure 18:
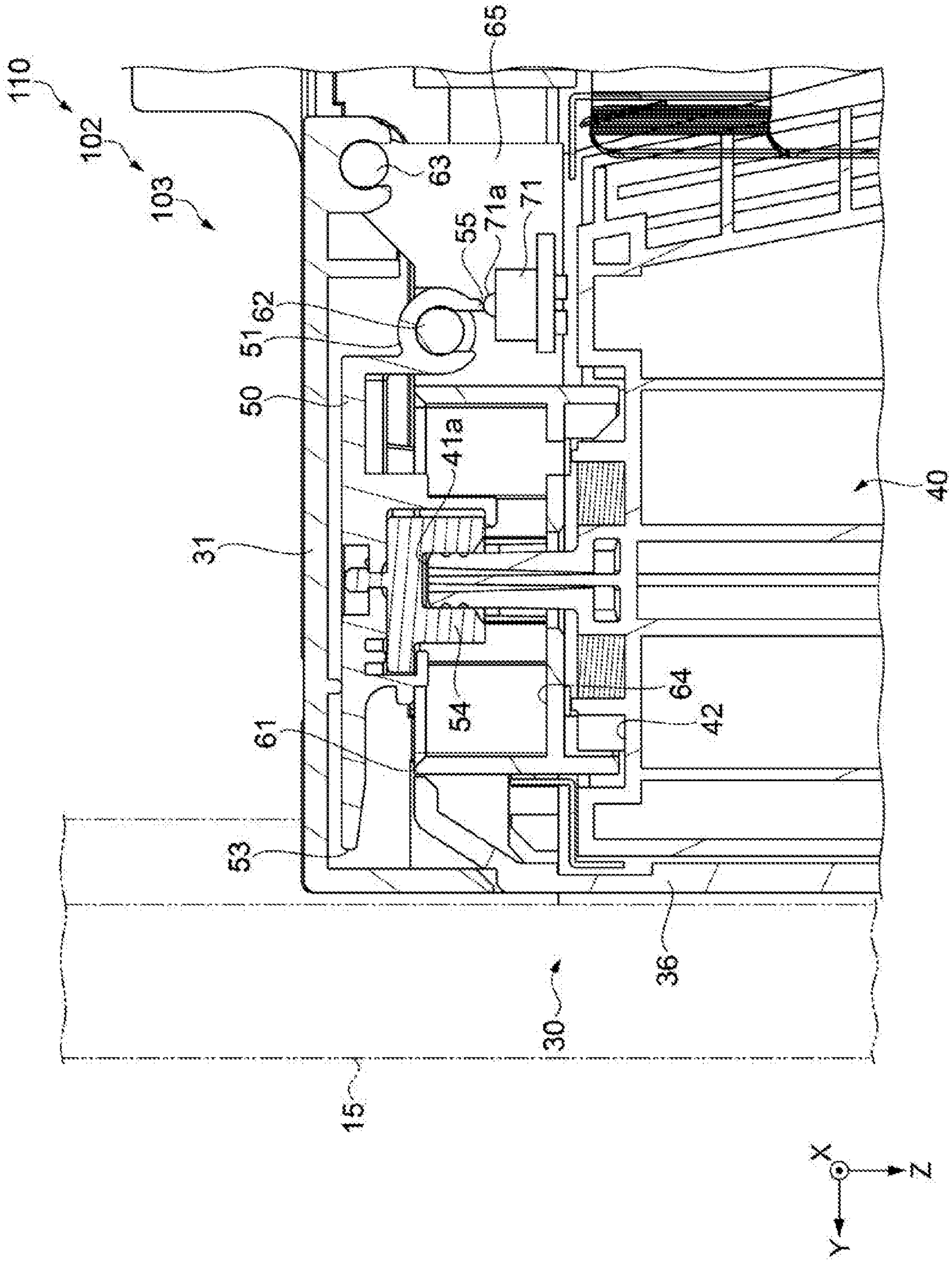
FIG. 18 is a main-part cross-sectional view showing a d8-d8 cross section of the liquid accommodation unit shown in FIG. 16, when the opening and closing cover and the cap lever are in a closed state.
Figure 19:
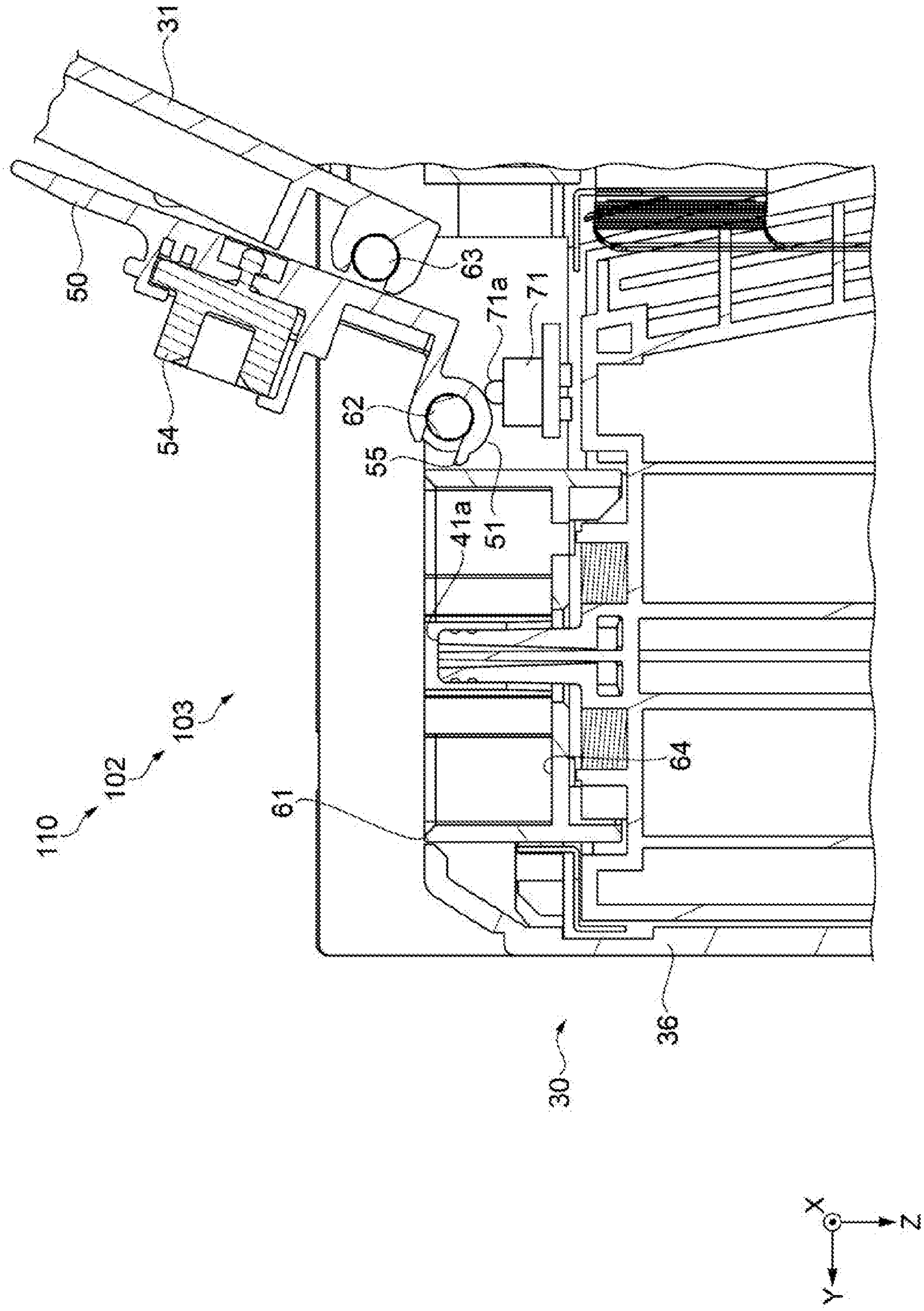
FIG. 19 is a main-part cross-sectional view showing a d8-d8 cross section of the liquid accommodation unit shown in FIG. 16, when the opening and closing cover and the cap lever are in an opened state.

When the storage amount of the liquid stored in the liquid storage portion 46 becomes small and the liquid is refilled from the refill container 90 to the liquid container 40, the user changes the opening and closing cover 31 from the closed state shown in FIG. 18 to the opened state shown in FIG. 19. Next, the user hooks his finger on the end 53 of the cap lever 50 to move the cap lever 50 from the closed state to the opened state, thereby changing the injection port 41*a* of the liquid container 40 from the sealed state to the opened state as shown in FIG. 19. Then, the user inserts the tip end of the refill container 90 into the injection port 41*a* of the liquid container 40, and refills liquid from the refill container 90 to the liquid storage portion 46 of the liquid container 40.

As described above, according to the recording apparatus 110 according to the sixth embodiment, the following effects can be obtained.

The recording apparatus 110 includes the liquid storage portion 46 capable of storing liquid, the recording head 22 for ejecting the liquid supplied from the liquid storage portion 46 to a medium, and the light emitting unit 81 that is provided outside the liquid storage portion 46 and that emits light. The liquid storage portion 46 has the front surface 43F enabling the amount of the liquid in the liquid storage portion 46 to be visually checked from outside of the liquid storage portion 46, and the light guide 47 that is provided in the liquid storage portion 46 and that guides the light from the light emitting unit 81 into the liquid storage portion 46. According to this, even in a case where the light emitting unit 81 is provided outside the liquid storage portion 46, since the light guide 47 is provided inside the liquid storage portion 46, it is easy to illuminate the inside of the liquid storage portion 46.

The light guide 47 is provided at a position in the Z-axis direction corresponding to the liquid surface LS when the amount of liquid in the liquid storage portion 46 reaches a predetermined amount. According to this, it is easy to grasp the liquid in the liquid storage portion 46 reached a predetermined amount by visually checking the light guide 47.

When the range inside the liquid storage portion 46 that can be seen from a direction facing the front surface 43F is considered as the visual check range, the light guide 47 is provided spanning across the visual check range in the Z-axis direction. According to this, it is easy to grasp the amount of liquid in the liquid storage portion 46 by visually checking the light guide 47.

The light guide 47 has the light entry surface 47*b* through which the light from the light emitting unit 81 enters the light guide 47, the front surface 43F that is a surface extending along the front surface 47*b* and that, when viewed from a direction facing the front surface 47*a*, appears luminous by transmitting the light that entered from the light entry surface 43F, and the rear surface 47*d* that is the surface opposite from the front surface 47*b* and that guides the light that entered from the light entry surface 47*a* toward the front surface 47*d*. According to this, it is easy to grasp the amount of liquid in the liquid storage portion 46 by visually checking the front surface 47*a*, which appears bright from the front surface 43F.

The rear surface 47*d* has the reflection section 47*h* protruding from the flat surface 47*e* of the rear surface 47*d*. According to this, it is possible to change how the inside of the liquid storage portion 46 is illuminated by the light guide 47 by providing unevenness on the rear surface 47*d*.

The rear surface 47*d* has a plurality of reflection sections 47*h* arranged in the Z-axis direction. According to this, the front surface 47*a* can be uniformly illuminated.

The rear surface 47*d* has a plurality of reflection sections 47*h*, 47*k*, 47*m* having different projection amounts, when the dimensions by which the reflection sections 47*h* project as projection portions from the flat surface 47*e* of the rear surface 47*d* are considered projection amounts. According to this configuration, it is possible to provide in the front surface 47*a*, which appears bright, a region having brightness different from that of other regions. It is easy to grasp the amount of liquid in the liquid storage portion 46 by visually checking the region in the light guide 47 having brightness different from that of other regions.

The plurality of reflection sections 47*h* are provided such that the projection amounts of the reflection sections 47*h* positioned toward one end side are larger than the projection amounts of the reflection sections 47*h* positioned toward the other end side in the Z-axis direction. According to this, it is possible to change in a continuous manner in the Z-axis direction the brightness of the front surface 47*a* that appears bright.

The plurality of reflection sections 47*h* are provided such that the closer in the Z-axis direction that a reflection section 47*h* is to an intermediate position between the reflection section 47*h* located on one end side and the reflection section 47*h* located on the other end side, the smaller protrusion amount. According to this, for example, in a case where the intermediate position is a position in the Z-axis direction that is the center of the front surface 47*a*, the brightness of the front surface 47*a* that appears luminous can be continuously changed in the Z-axis direction from the center of the front surface 47*a*.

The rear surface 47*d* includes a plurality of connection surfaces 47*s* that connect the plurality of reflection sections 47*h* arranged in the Z-axis direction. According to this, a bright portion and a dark portion linearly extending in the X-axis direction are alternately arranged in the Z-axis direction on the front surface 47*a*, which appears luminous, so that the manner of appearing luminous can be like a scale.

The reflection section 47*h* has a surface extending along the front surface 47*a*. According to this, a bright portion and a dark portion linearly extending in the X-axis direction are alternately arranged in the Z-axis direction on the front surface 47*a*, which appears luminous, so that the manner of appearing luminous can be like a scale.

The upper reflection surface 47*f* forming the reflection section 47*h* inclines downward further with proximity toward the tip end side of the reflection section 47*h*. According to this, when liquid adheres to the rear surface 47*d*, the liquid is less likely to remain on the upper reflection surface 47*f* of the reflection section 47*h*.

The recording apparatus 110 further includes the controller 111 for controlling the turning on and off of the light emitting unit 81. According to this, the controller 111 can change the light emission state of the light guide 47 and notify the user of the operation state of the recording apparatus 110 by controlling the turning on and off of the light emitting unit 81.

The recording apparatus 110 further includes the injection portion 41 that enables injection of the liquid into the liquid storage portion 46. According to this configuration, the liquid storage portion 46 can also be employed in the refill-type recording apparatus 110 that is used by refilling with liquid.

7. Seventh Embodiment

Next, the liquid accommodation unit 103 in a recording apparatus 110 of the seventh embodiment as an embodiment of present disclosure will be described. In the present embodiment, configurations different from those of the liquid accommodation unit 103 of the sixth embodiment will be mainly described, and description of common portions will be omitted. In addition, the description of actions and effects similar to those of the sixth embodiment will also be omitted.

Figure 31:
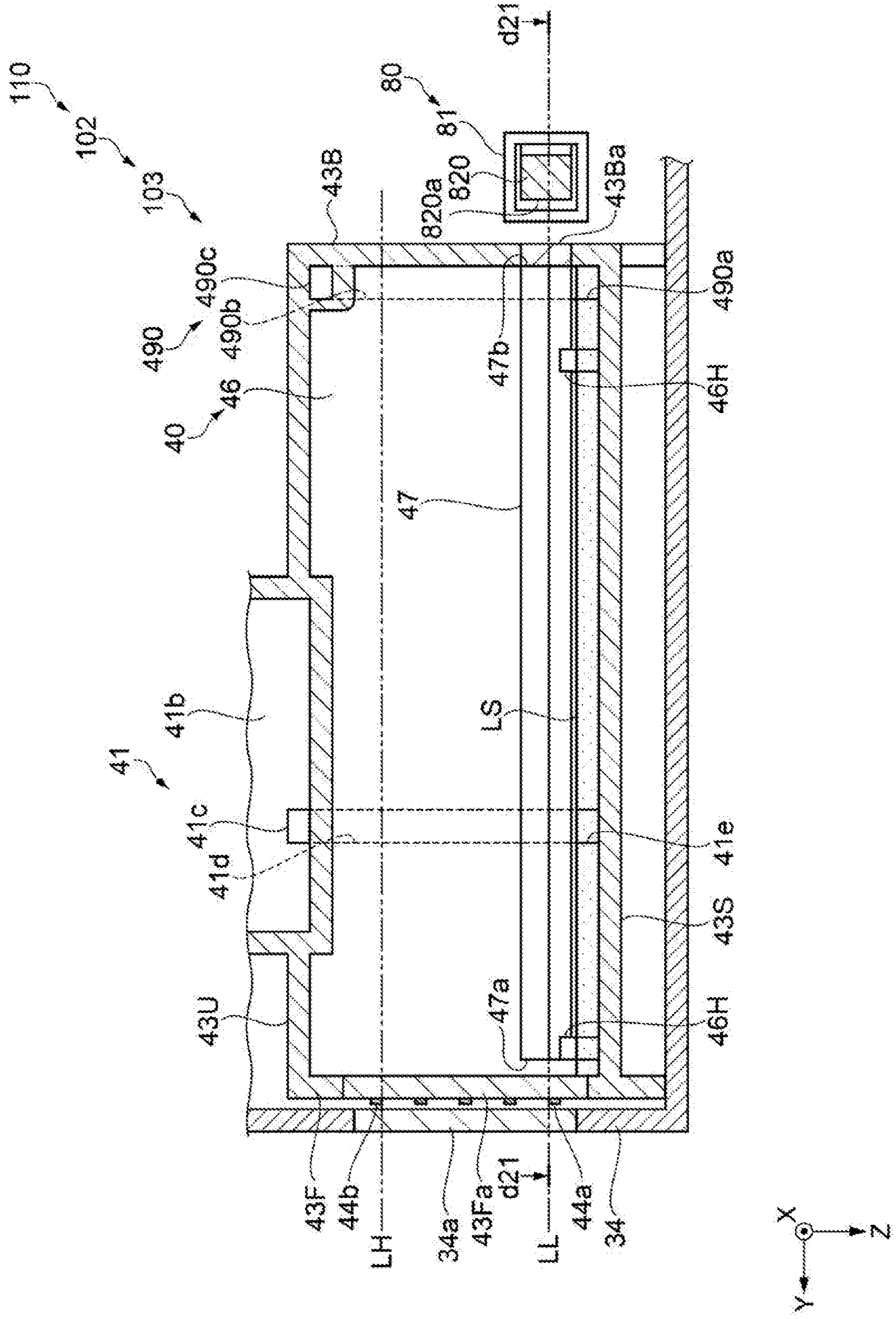
FIG. 31 is a main-part cross-sectional view of a liquid storage portion having a light guide according to a seventh embodiment.
Figure 32:
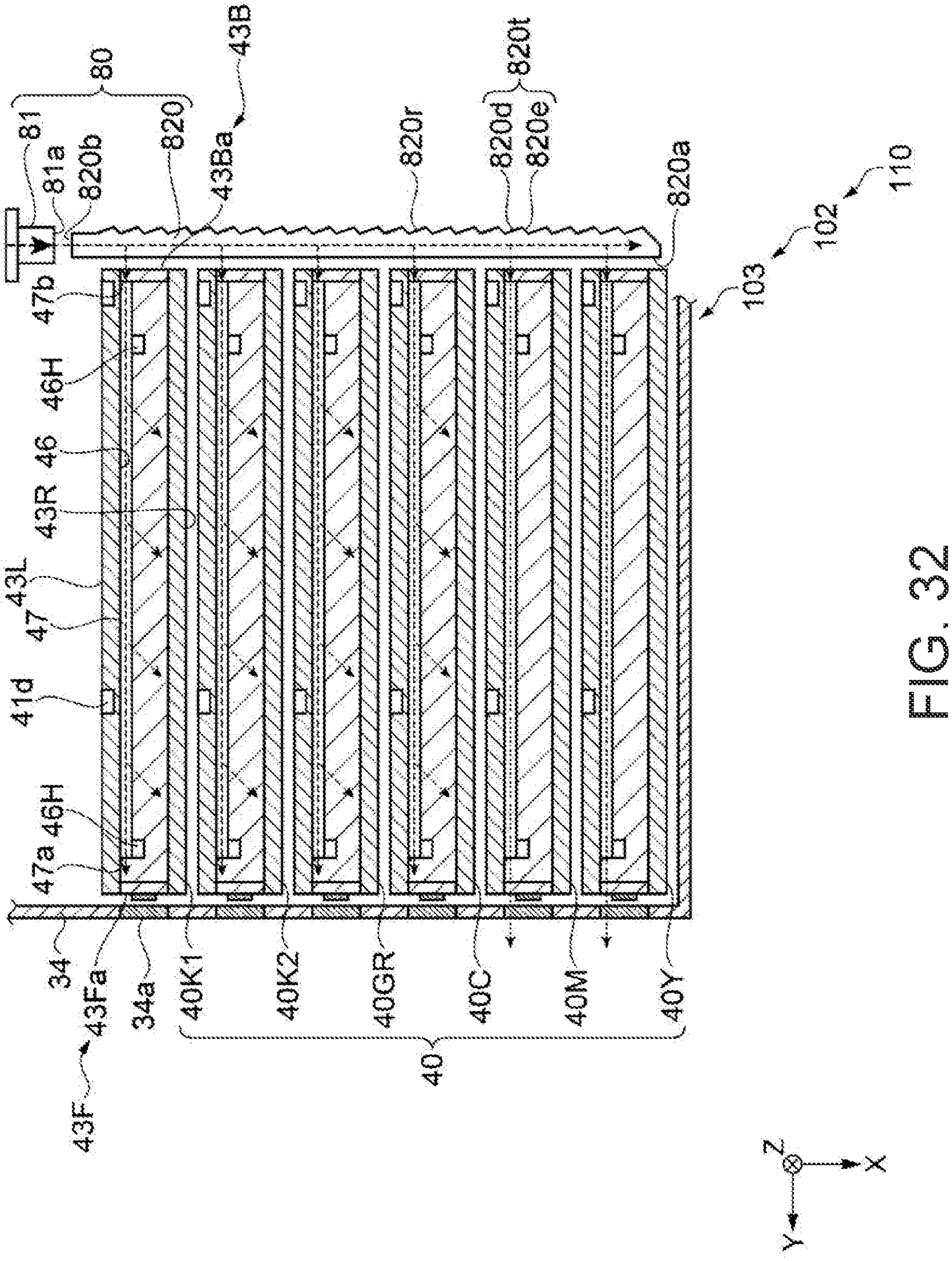
FIG. 32 is a main-part cross-sectional view showing a d21-*d*21 cross section of the liquid storage portion shown in FIG. 31.

As shown in FIGS. 31 and 32, the liquid accommodation unit 103 of the seventh embodiment is different from the liquid storage device 103 of the sixth embodiment in that the liquid storage portion 46 of the liquid container 40 includes a light guide support 46H and a window member 43Ba, does not include the window member 43Ua, the illumination unit 80 includes a common light guide 820, and there is one light emitting unit 81. The light emitting unit 81 is provided at a position to the −Y direction side of the six liquid containers 40 and at a position to the −X direction side of the rear surface 43B of the liquid storage portion 46 in the liquid container 40K1. The light emitting unit 81 of the present embodiment is provided so that light emitted from the front surface 81*a* is directed in the +X direction.

Figure 33:
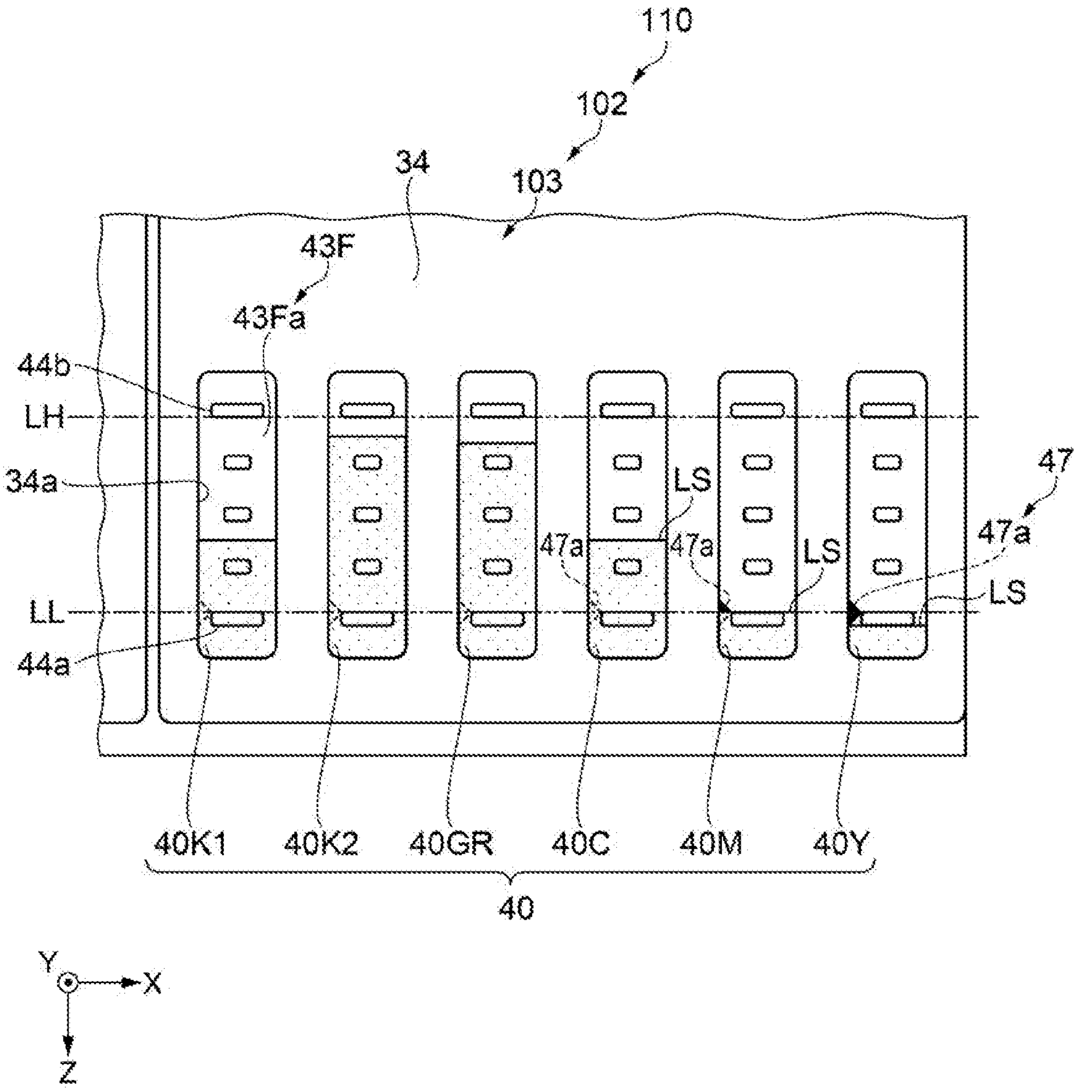
FIG. 33 is a side view of the inside of a liquid storage portion having a light guide according to the seventh embodiment, as viewed from a direction facing the visual check surface.

As shown in FIGS. 31 to 33, the light guide 47 of the present embodiment has a triangular shape when viewed from the Y-axis direction, and has a columnar shape extending in the Y-axis direction. The light guide 47 of the present embodiment is configured from similar material as that of the light guide 47 of the sixth embodiment. The light guide 47 is provided at the left side surface 43L side, which is the −X direction side from the center of the liquid storage portion 46 in the X axis direction. The light guide 47 of the present embodiment is provided in the liquid storage portion 46 such that the side surface on the −X direction side, which defines the outer shape of the light guide 47, extends along the left side surface 43L. The light guide 47 of the present embodiment can, for example, guide light entering from the light entry surface 47*b*, which is the side surface of the light guide 47 on the −Y direction side, to the front surface 47*a*, which is the side surface of the light guide 47 on the +Y direction side. The front surface 47*a* is a surface extending along the X-Z plane. In other words, the front surface 47*a* is a surface extending along the front surface 43F of the liquid storage portion 46. The front surface 47*a* is an example of a light emitting surface.

In this case, the three side surfaces that define the outer shape of the light guide 47 and that extend in the Y-axis direction can be referred to as light guide surfaces that guide light that entered from the light entry surface 47*b* toward the front surface 47*a*. The light guide 47 is attached to the light guide support 46H included in the liquid storage portion 46 such that the vertex in the +X direction among the three vertices included in the triangular front surface 47*a* and the triangular light entry surface 47*b* is located at the position of the lower limit liquid level LL of the liquid in the Z-axis direction. That is, the light guide 47 is provided at a position where the lower limit liquid level LL crosses the light guide 47 when the liquid amount of the liquid in the liquid storage portion 46 becomes the lower limit amount. In other words, the light guide 47 is provided at a position in the direction of gravity corresponding to the lower limit liquid level LL when the amount of the liquid in the liquid storage portion 46 becomes the lower limit amount.

In this case, when as shown in FIG. 33 the inside of the liquid storage portion 46 is viewed from the +Y direction side, which is from a direction facing the front surface 43F of the liquid storage portion 46, a region in the −Z direction from the lower limit liquid level LL can be seen in the front surface 47*a* of the light guide 47. Accordingly, in the recording apparatus 110 of the present embodiment, for example, even in a case where the lower limit liquid level LL of the liquid in the liquid storage portion 46 is difficult to see, the position of the lower limit liquid level LL of the liquid can be checked by visually checking the front surface 47*a* of the light guide 47 and thus the lower limit liquid level of the liquid in the liquid storage portion 46 is easy to check, compared to the case when no light guide 47 is provided in the liquid storage portion 46.

The common light guide 820 is made of a translucent or transparent material. As shown in FIGS. 31 and 32, the common light guide 820 includes a light entry surface 820*b*, an irradiation surface 820*a*, and a rear surface 820*r*. The common light guide 820 of the present embodiment is a light guide member that guides light entering from the light entry surface 820*b* toward the irradiation surface 820*a*. For example, if the material constituting the common light guide 820 is a resin material, polypropylene (PP), polyethylene (PE), polyamide (PA), acrylonitrile-butadiene-styrene (ABS), polycarbonate (PC), polyethylene terephthalate (PET), polymethylmethacrylate (PMMA), or the like can be adopted.

The light entry surface 820*b* is a side surface of the common light guide 820 on the −X direction side, and is provided at a position facing the front surface 81*a* of the light emitting unit 81. The light entry surface 820*b* is located on the −X direction side of the rear surface 43B of the liquid storage portion 46 in the liquid container 40K1.

The irradiation surface 820*a* is a side surface of the common light guide 820 on the +Y direction side. The irradiation surface 820*a* extends from a position on the −X direction side of the rear surface 43B of the liquid storage portion 46 in the liquid container 40K1 to a position on the +X direction side of the rear surface 43B of the liquid storage portion 46 in the liquid container 40Y. The irradiation surface 820*a* is provided at a position facing the light entry surface 47*b* of the light guide 47.

As a result, the window member 43Ba of the liquid storage portion 46 in the liquid containers 40K1, 40K2, 40GR, 40C, 40M, and 40Y is positioned, with respect to the Y-axis direction, in between the irradiation surface 820*a* and the light guides 47 of the liquid storage portion 46 in the liquid containers 40K1, 40K2, 40GR, 40C, 40M, and 40Y. Further, the irradiation surface 820*a* is provided in the Z-axis direction so as to correspond to the position of the lower limit liquid level LL of the liquid in the liquid storage portion 46. When the liquid storage portion 46 is formed of a translucent or transparent material, or when the window member 43Ba and the light guide 47 are integrally formed, the window member 43Ba may be omitted.

The rear surface 820*r* is a side surface of the common light guide 820 on the −Y direction side. The rear surface 820*r* extends from a position on the −X direction side of the rear surface 43B of the liquid storage portion 46 in the liquid container 40K1 to a position on the +X direction side of the rear surface 43B of the liquid storage portion 46 in the liquid container 40Y. The rear surface 820*r* is formed by arranging a plurality of reflection sections 820*t* in the X-axis direction, and has a serrated shape extending in the X-axis direction. The reflection section 820*t* has a convex shape formed by a reflection surface 820*d* and a reflection surface 820*e* arranged in the X-axis direction.

As shown in FIG. 32, light emitted from the front surface 81*a* of the light emitting unit 81 enters the common light guide 820 from the light entry surface 820*b* of the common light guide 820. In FIG. 32, a path of light emitted from the light emitting unit 81 is indicated by dashed arrows. The light from the light emitting unit 81 that entered the common light guide 820 from the light entry surface 820*b* is guided toward the irradiation surface 820*a* through the common light guide 820 by the plurality of reflection sections 820*t* constituting the rear surface 820*r*, the side surface on the +Z direction side, the side surface on the −Z direction side, and the side surface on the +X direction side of the common light guide 820.

The light from the light emitting unit 81 guided to the irradiation surface 820*a* enters the liquid storage portion 46 through the window member 43Ba and illuminates the inside of the six liquid storage portions 46, including the liquid and the light guides 47. In other words, the light emitting unit 81 is provided outside the liquid storage portion 46 and illuminates the inside of the six liquid storage portions 46, including the liquid and the light guides 47, via the common light guide 820. Further, in the recording apparatus 110 of the present embodiment, the light guides 47 in the plurality of liquid storage portions 46 are illuminated by one light emitting unit 81 via the common light guide 820.

Here, it will be assumed as shown in FIG. 33 in the liquid containers 40K1, 40K2, 40GR, and 40C, that the liquid surface LS of the liquid in the liquid storage portions 46 is positioned in the −Z direction with respect to the light guide 47 and that the side surfaces serving as light guide surfaces of the light guide 47 are within the liquid. In this case, as shown in FIG. 32, much of the light that enters the light guide 47 from the light entry surface 47*b* via the common light guide 820 and falls incident on the side surface of the light guide 47 is not reflected by the side surface, but passes through the side surface and travels in the liquid in a direction different from the direction which extends along the Y-axis toward the front surface 43F. As a result, when the inside of the liquid storage portion 46 is viewed from the +Y direction side, which is from a direction facing the front surface 43F of the liquid storage portion 46, the front surface 47*a* of the light guide 47 does not appear bright.

On the other hand, it will be assumed that, as per the liquid containers 40M and 40Y, the liquid surface LS of the liquid in the liquid storage portion 46 is in the vicinity of the lower limit liquid level LL and is located in the +Z direction from the uppermost portion of the light guide 47. That is, it will be assumed that least a part of the side surface as the light guide surface of the light guide 47 is in contact with the atmosphere. In this case, as shown in FIG. 32, the light entering the light guide 47 from the light entry surface 47*b* via the common light guide 820 is guided in the light guide 47 toward the front surface 47*a*. As a result, when the inside of the liquid storage portion 46 is viewed from the +Y direction side, which is from a direction facing the front surface 43F of the liquid storage portion 46, as indicated in FIG. 33, a region on the −Z direction side of the liquid surface LS of the liquid in the front surface 47*a* of the light guide 47 in the Z axis direction appears bright.

By this, for example, the position of the liquid surface LS of the liquid can be checked by viewing the luminous region of the front surface 47*a* of the light guide 47, even if the lower limit liquid level LL of the liquid is difficult to see when the amount of liquid in the liquid storage portion 46 is the lower limit amount. Therefore, compared to a case when no light guide 47 is provided in the liquid storage portion 46, the recording apparatus 110 of the present embodiment facilitates a check of the amount of liquid in the liquid storage portion 46.

Note that in the light guide 47 of the liquid storage portion 46 in the liquid container 40M, there is a region in the side surface of the light guide 47 that is to the +Z direction from the liquid surface LS. In this case, much of the light that enters the light guide 47 from the light entry surface 47*b* and falls incident on this region is not reflected by the side surface, but passes through the side surface and travels in the liquid in a direction different from the direction toward the front surface 43F, which extends along the Y-axis. For this reason, when the inside of the liquid storage portion 46 is viewed from the +Y direction side, which is from a direction facing the front surface 43F of the liquid storage portion 46, the front surface 47*a* of the light guide 47 appears luminous darker than the front surface 47*a* of the light guide 47 in a case where the liquid surface LS is positioned in the +Z direction from the light guide 47, as in the liquid container 40Y.

As described above, according to the recording apparatus 110 according to the seventh embodiment, the following effects can be obtained.

The recording apparatus 110 includes a plurality of liquid storage portions 46 and a common light guide 820 for guiding light from one light emitting unit 81 to light guides 47 in the plurality of liquid storage portions 46. According to this, it is possible to illuminate each light guide 47 in the plurality of liquid storage portions 46 with one light emitting unit.

Although the recording apparatus 110 and the liquid container 40 according to the above embodiment of the present disclosure basically have the above-described configuration, it is of course possible to change or omit the partial configuration within the scope not departing from the gist of the present disclosure. In addition, the above-described embodiments and other embodiments described below can be implemented in combination with each other within a range that does not technically conflict. Other embodiments will be described below.

In the embodiments described above, the housing 30 of the liquid accommodation unit 103 may not include the visual check portion 34 and the wall portion 36. In addition, for example, the liquid accommodation unit 103 may function as a mounting section that enables the housing 30 to detachably accommodate replaceable liquid containers 40. In this case, for example, the liquid container 40 of the sixth embodiment is mountable in the housing 30 of the recording apparatus 110, which includes the recording head 22 that ejects liquid, the light emitting unit 81 that emits light, and the housing 30. The liquid container 40 includes the liquid storage portion 46 capable of storing liquid. In a state in which the liquid container 40 is mounted in the housing 30, a region of the liquid storage portion 46 facing the light emitting unit 81 of the liquid container 40 is transparent or translucent. The liquid storage portion 46 has a front surface 43F, through which the amount of liquid in the liquid storage portion 46 can be visually checked from the outside of the liquid storage portion 46, and a light guide 47, which is provided in the liquid storage portion 46 for guiding the light from the light emitting unit 81 into the liquid storage portion 46. According to this, even in a case where the light emitting unit 81 is provided outside the liquid storage portion 46, since the light guide 47 is provided inside the liquid storage portion 46, it is easy to illuminate the inside of the liquid storage portion 46. In a case where the light emitting unit 81 is provided on the upper surface 43U of the liquid storage portion 46, the recording apparatus 110 may not include the light emitting unit 81.

In the above-described embodiments, the light guide 47 may be formed of a plurality of materials having different light transmittances. The light guide 47 may be formed of a plurality of materials having different colors. In this case, the light guide 47 may be integrally formed of a plurality of different resin materials. For example, in the reflection section 47*h* of the light guide 47 illustrated in FIG. 30, a surface extending along the front surface 47*a* may be formed of a material having lower light transmissivity than other portions. In this case, the material forming the surface extending along the front surface 47*a* may not be a resin material, and may be, for example, a metal such as stainless steel.

In the sixth embodiment described above, the light guide may have two or more types of different shaped reflection sections 47*h* from among the reflection sections 47*h* having different shapes shown in FIGS. 21 and 26 to 30. For example, the light guide 47 may have a rear surface 47*d* in which a plurality of reflection sections 47*h* shown in FIG. 21 and one reflection section 47*d* shown in FIG. 28 are arranged in the Z-axis direction. In this case, the rear surface 47*d* has one reflection section 47*h* having a surface extending along the front surface 47*a*. Further, at this time, the position in the Z-axis direction of the reflection section 47*h* having a surface extending along the front surface 47*a* may be provided so as to correspond to the lower limit liquid level LL. Alternatively, the light guide 47 may have a rear surface 47*d* in which a plurality of reflection sections 47*h* shown in FIG. 29 and two reflection sections 47*h* shown in FIG. 30 are arranged in the Z-axis direction. In this case, two reflection sections 47*h* shown in FIG. 30 may be provided so as to be continuous in the Z-axis direction, and a connection surface 47*s* may be provided therebetween. Further, at this time, the position of the connection surface 47*s* in the Z-axis direction may be provided so as to correspond to the lower limit liquid level LL. In this case, the rear surface 47*d* has a plurality of reflection sections 47*h* having surfaces extending along the front surface 47*a*, and has one connection surface 47*s* extending along the front surface 47*a*.

In the sixth embodiment, the light guide 47 may not have the protrusion-shaped reflection section 47*h* on the rear surface 47*d*. In this case, for example, a metallic film such as stainless steel or a coating film made of a color material may be provided on the rear surface 47*d* as a reflection surface. When the light guide 47 is formed of a resin material, it can also be said that the light guide 47 is formed of a plurality of materials having different light transmittances. Furthermore, a plurality of linear metallic films or coating films extending in the X-axis direction may be formed on the rear surface 47*d* at intervals in the Z-axis direction. As a result, as shown in FIG. 25, a bright portion and a dark portion linearly extending in the X-axis direction are alternately arranged in the Z-axis direction on the front surface 47*a*, which appears luminous, so that the manner of appearing luminous may be like a scale.

In the sixth embodiment described above, the light guide 47 may not have the protrusion shaped reflection section 47*h*, including the upper reflection surface 47*f* and the lower reflection surface 47*g*, on the rear surface 47*d*. In this case, for example, instead of the reflection section 47*h* shown in FIG. 21, a plurality of protrusions extending in the X-axis direction and having a half circle shape when viewed from the X-axis direction may be provided in the Z-axis direction on the rear surface 47*d*. Alternatively, a liquid-repellent treatment may be performed on the rear surface 47*d* of the light guide 47 so that the liquid clinging to the rear surface 47*d* pools into a plurality of protrusions so that regions having different light transmittances are formed on the rear surface 47*d*.

In the seventh embodiment, the light guide 47 may be provided in the liquid storage portion 46 such that the vertex in the +X direction among the three vertices included in the triangular front surface 47*a* and the triangular light entry surface 47*b* is located at the position of the upper limit liquid level LH of the liquid in the Z-axis direction. In other words, the light guide 47 may be provided at a position where the upper limit liquid level LH, which is when the liquid amount of the liquid in the liquid storage portion 46 becomes the upper limit amount, crosses the light guide 47. According to this, when the user refills the liquid container 40 with liquid, it is possible to notify the position of the liquid surface when the liquid amount in the liquid storage portion 46 is at the upper limit, by the controller 111 turning on or blinking the light emitting unit 81.

In the above-described embodiment, the shape of the light guide 47 is not particularly limited as long as it has the light entry surface 47*b* and the light emitting surface. For example, the side surface on the +Z direction side of the light guide 47 according to the sixth embodiment may be positioned in the −Z direction from the upper limit liquid level LH of the liquid in the liquid storage portion 46 in the Z axis direction. In addition, for example, the light guide 47 according to the seventh embodiment may have a cylindrical shape in which the front surface 47*a* has a circular shape, or may have a prismatic shape in which the front surface 47*a* has a quadrangular shape.

In the above-described embodiments, the color of the light emitted by the light emitting unit 81 may be changeable, and the color when the controller 111 turns on or blinks the light emitting unit 81 may be changed. For example, in the sixth embodiment, the controller 111 may light the light emitting unit 81 with a green light when the liquid amount in the liquid storage portion 46 is larger than the lower limit amount, and may blink the light emitting unit 81 with a yellow light when the liquid amount in the liquid storage portion 46 becomes the lower limit amount. In addition, for example, when the liquid amount of liquid in the liquid storage portion 46 becomes smaller than the lower limit amount, the controller 111 may cause the light emitting unit 81 to emit red light.

In the sixth embodiment described above, the color of the visible light emitted by each light emitting unit 81 included in the illumination unit 80 may be different depending on the corresponding liquid container 40.

In the embodiments described above, the colors of the light guides 47 in the plurality of liquid storage portions 46 may be different.

In the seventh embodiment described above, the liquid accommodation unit 103 may not include the light emitting unit 81. In this case, for example, the light emitting unit 81 may be provided at a position on the −Y direction side with respect to the liquid accommodation unit 103 in the apparatus main body 102, or may be provided at a position on the −X direction side with respect to the liquid accommodation unit 103.

In the embodiments described above, the recording head 22 and the liquid container 40 may not be coupled by the tube 23. In this case, the recording apparatus 110 may record a desired image on the medium by mounting the recording head 22 and the liquid container 40 on the carriage 21 and alternately repeating a liquid ejecting operation, in which the recording head 22 ejects liquid onto the medium while the carriage 21 moves in the width direction of the medium, and a transport operation, in which the medium is transported in the transport direction by the transport unit 25.

The recording apparatus includes the liquid storage portion capable of storing liquid, the recording head for ejecting the liquid supplied from the liquid storage portion to a medium, and the light emitting unit that is provided outside the liquid storage portion and that emits light. The liquid storage portion has the visual check surface enabling the amount of the liquid in the liquid storage portion to be visually checked from outside of the liquid storage portion 46, and the light guide that is provided in the liquid storage portion and that guides the light from the light emitting unit into the liquid storage portion.

According to this, even in a case where the light emitting unit is provided outside the liquid storage portion, since the light guide is provided inside the liquid storage portion, it is easy to illuminate the inside of the liquid storage portion.

Further, the light guide may be provided at a position in the gravity direction corresponding to the liquid surface when the amount of the liquid in the liquid storage portion becomes a predetermined amount.

According to this, it is easy to grasp that the liquid in the liquid storage portion reached the predetermined amount by visually checking the light guide.

Further, when the range inside the liquid storage portion that can be seen from a direction facing the visual check surface is considered as the visual check range, the light guide may be provided in the gravity direction spanning across the visual check range.

According to this, it is easy to grasp the amount of liquid in the liquid storage portion by visually checking the light guide.

Further, the light guide may have a light entry surface through which light from a light emitting unit enters the light guide, a light emitting surface that is a surface extending along the visual check surface and through which light that entered from the light entry surface is transmitted so that the light emitting surface appears luminous when viewed from a direction facing the visual check surface, and a light guide surface that is the opposite surface from the light emitting surface and that guides light entering from the light entry surface toward the light emitting surface.

According to this configuration, it is easy to grasp the amount of liquid in the liquid storage portion by visually checking the visual check surface, which appears luminous from the direction facing the visual check surface.

Further, the light guide surface may have a convex portion protruding away from another surface of the light guide surface.

According to this, it is possible to change how the inside of the liquid storage portion is illuminated by the light guide by providing unevenness on the rear surface.

Further, the light guide surface may have a plurality of convex portions arranged in the gravity direction.

According to this, the front surface can be uniformly illuminated.

Further, the light guide surface may have a plurality of protrusions having different protrusion amounts, the protrusion amount being considered a dimension by which the protrusions protrude from another surface of the light guide surface.

According to this configuration, it is possible to provide in the front surface, which appears bright, a region having brightness different from that of other regions. It is easy to grasp the amount of liquid in the liquid storage portion by visually checking the region in the light guide having brightness different from that of other regions.

Further, the plurality of convex portions may be provided such that the protrusion amounts of the convex portions positioned toward one end side are larger than the protrusion amounts of the convex portions positioned toward the other end side in the gravity direction.

According to this, it is possible to change in a continuous manner in the Z-axis direction the brightness of the front surface, which appears bright.

Further, the plurality of convex portions may be provided such that the closer that a convex portion is to an intermediate position between a convex portion positioned on one end side and a convex portion positioned on the other end side in the gravity direction, the smaller the protrusion amount.

According to this configuration, for example, in a case where the intermediate position is a position at the center of the front surface in the Z-axis direction, the brightness of the front surface, which appears luminous, can continuously change in the Z-axis direction from the center of the front surface.

Further, the light guide surface may include a connection surface connecting the plurality of convex portions.

According to this, a bright portion and a dark portion linearly extending in the X-axis direction are alternately arranged in the Z-axis direction on the front surface, which appears luminous, so that the manner of appearing luminous can be like a scale.

Further, the convex portion may have a surface extending along the light emitting surface.

According to this, a bright portion and a dark portion linearly extending in the X-axis direction are alternately arranged in the Z-axis direction on the front surface, which appears luminous, so that the manner of appearing luminous can be like a scale.

The upper surface forming the convex portion may be inclined further downward, with proximity toward the tip end of the convex portion.

According to this, when liquid adheres to the rear surface, the liquid is less likely to remain on the upper reflection surface of the reflection section.

The light guide may be formed of a plurality of materials having different light transmittances.

The light guide may be formed of a plurality of materials having different colors. In this case, the light guide may be integrally formed of a plurality of different resin materials. For example, a surface extending along the front surface may be formed of a material having a lower light transmittance than other portions. In this case, the material forming the surface extending along the front surface may not be a resin material, and may be, for example, a metal such as stainless steel.

Further, a plurality of liquid storage portions and a common light guide for guiding light from one light emitting unit to light guides in the plurality of liquid storage portions may be provided.

According to this, it is possible to illuminate each light guide in the plurality of liquid storage portions with one light emitting unit.

A controller for controlling the turning on and off of the light emitting unit may be provided.

According to this, the controller can change the light emission state of the light guide and notify the user of the operation state of the recording apparatus by controlling the turning on and off of the light emitting unit.

The recording apparatus may be further comprising an injection portion through which the liquid can be injected into the liquid storage portion.

According to this, the liquid storage portion can also be employed in a refill-type recording apparatus that is used by refilling with liquid.

A liquid accommodation body is mountable in the mounting section of a recording apparatus including a recording head that ejects ink, a light emitting unit that emits light, and the mounting section. The liquid accommodation body includes a liquid storage portion capable of storing liquid. In a state where the liquid accommodation body is mounted in the mounting section, a region of the liquid storage portion that faces the light emitting unit is transparent or translucent, and the liquid storage portion has a visual check surface, through which the amount of liquid in the liquid storage portion can be checked from outside of the liquid storage portion, and a light guide, which is provided inside the liquid storage portion and which guides light from the light emitting unit into the liquid storage portion.

What is claimed is:

1. A recording apparatus comprising:

a main body including a cover portion;

a liquid storage portion configured to store a liquid, and having a visual check surface through which the stored liquid is visually checkable from outside;

a recording head that ejects liquid supplied from the liquid storage portion onto a medium;

a carriage on which the liquid storage portion and the recording head are mounted, the carriage movable between a visual check position at which the liquid in the liquid storage portion is visually checkable through the visual check surface and a recording position at which the recording head ejects the liquid onto the medium; and a light emitting unit on a lower surface of the cover portion, wherein the light emitting unit is configured to illuminate an inside of the liquid storage portion at least when the carriage is positioned at the visual check position.

2. The recording apparatus according to claim 1, wherein the main body houses the carriage, the cover portion is configured to move between a closed state in which the cover portion covers the main body and an opened state in which an inside of the main body is exposed, and the light emitting unit is provided at a position vertically above the liquid storage portion when the carriage is positioned at the visual check position while the cover portion is in the closed state.

3. The recording apparatus according to claim 2, wherein the main body includes a visual check member at a position facing the visual check surface when the carriage is at the visual check position, and the visual check member is translucent or transparent.

4. The recording apparatus according to claim 2, further comprising:

a controller configured to control turning on and off of the light emitting unit in accordance with opening and closing of the cover portion.

5. The recording apparatus according to claim 1, further comprising:

a light guide unit configured to guide light from the light emitting unit toward the inside of the liquid storage portion.

6. The recording apparatus according to claim 5, wherein the light guide unit has a light entry surface that faces the light emitting unit and into which the light from the light emitting unit enters.

7. The recording apparatus according to claim 5, wherein the light guide unit has an irradiation surface that irradiates the light from the light emitting unit toward the inside of the liquid storage portion, and at least a part of the irradiation surface is located closer to the visual check surface than is the light emitting unit.

8. The recording apparatus according to claim 1, further comprising:

a controller configured to control turning on and off of the light emitting unit.

9. The recording apparatus according to claim 1, further comprising:

an injection portion configured to enable injection of liquid into the liquid storage portion.

10. A recording apparatus comprising:

a liquid storage portion configured to store a liquid, and having a visual check surface through which the stored liquid is visually checkable from outside;

a recording head that ejects liquid supplied from the liquid storage portion onto a medium;

a carriage on which the liquid storage portion and the recording head are mounted, the carriage being movable between a visual check position at which the liquid in the liquid storage portion is visually checkable through the visual check surface and a recording position at which the recording head ejects the liquid onto the medium;

a light emitting unit configured to illuminate an inside of the liquid storage portion when the carriage is positioned at the visual check position; and a maintenance unit that performs maintenance of the recording head, wherein the maintenance unit overlaps with a part of the visual check surface when seen in a vertical direction and come into contact with the recording head when the carriage is at the visual check position.

11. The recording apparatus according to claim 10, wherein the maintenance unit includes at least one of a cap capable of forming a capping space that includes the recording head, a pump capable of sucking liquid from the recording head through the capping space, a waste liquid tube which connects the pump to the cap; and a waste liquid tank that is connected to the waste liquid tube and that collects liquid discharged from the recording head.

* * * * *